United States Patent [19]

Chan et al.

[11] Patent Number: 5,388,267
[45] Date of Patent: Feb. 7, 1995

[54] METHOD AND APPARATUS FOR UPDATING AND RESTORING SYSTEM BIOS FUNCTIONS WHILE MAINTAINING BIOS INTEGRITY

[75] Inventors: Wai-Ming R. Chan; Eric W. Schieve; Charles P. Zeller; Gary W. Abbott, all of Austin, Tex.

[73] Assignee: Dell USA, L.P., Austin, Tex.

[21] Appl. No.: 707,121

[22] Filed: May 29, 1991

[51] Int. Cl.$^6$ .............................. G06F 9/06; G06F 9/24
[52] U.S. Cl. .................... 395/700; 371/11.1; 364/222.1; 364/266.3; 364/280.2; 364/280.3; 364/280.9
[58] Field of Search ............................ 371/19

[56] References Cited

U.S. PATENT DOCUMENTS

| | | |
|---|---|---|
| 5,022,077 | 6/1991 | Bealkowski et al. .............. 380/4 |
| 5,136,713 | 8/1992 | Bealkowski et al. .............. 395/700 |
| 5,210,875 | 5/1993 | Bealkowski et al. .............. 395/700 |

OTHER PUBLICATIONS

Glass, Brent; "The IBM PC BIOS"; *Byte*, 1989, Apr.; pp. 303–310.

Bingham, Douglas; "Achieving Flexable Firmware"; 1978 MIDCON Technical Papers; 20/3/pp.1–4, 1978.

*Primary Examiner*—Gareth D. Shaw
*Assistant Examiner*—J. Backenstose
*Attorney, Agent, or Firm*—James Hoffman; Jeff Hood

[57] ABSTRACT

A computer which carries its BIOS in a Flash EPROM. A UV-EPROM carries a redundant BIOS, which can be overlaid onto the BIOS address space by selection with a physical switch.

The BIOS contains a small core software program, at the BIOS entry point, which checks BIOS integrity, and provides for reloading the Flash EPROM's BIOS if needed (from a floppy disk, or by copying the entire contents of the UV-EPROM).

22 Claims, 2 Drawing Sheets

METHOD AND APPARATUS FOR UPDATING AND RESTORING SYSTEM BIOS FUNCTIONS WHILE MAINTAINING BIOS INTEGRITY

TABLE OF CONTENTS

BACKGROUND AND SUMMARY OF THE INVENTION
  Bootstrap Programs
  Basic System Software
  "Basic Input/Output System" Software (BIOS)
  Nonvolatile Memory Technologies
  Functions Performed by the Software Core
  Detecting Which Boot Memory is Active
  Hardware Protection of the Software Core Sector
  Floppy-Disk Handling
BRIEF DESCRIPTION OF THE DRAWING
DESCRIPTION OF THE PREFERRED EMBODIMENTS
  Preferred Hardware Context
  Preferred I/O Controller Chip ("SLOB")
  Use of Parallelled UVEPROM and Flash-EEPROM for BIOS
    Use of Sector-Protected Flash-EEPROM
  Hardware-Software Hybrid Switch
  Preferred Memory Controller Chip ("TRANE")
  Preferred Core Software Structure
  Procedure 8KBOOT_STRT
  Procedure BOOTUVPROM
  Procedure BOOTFLASH
  Other Procedures
  Further Modifications and Variations
CLAIMS
  1. A method for operating a computer system
  11. A method for operating a computer system
  16. A method for operating a computer system
APPENDICES

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTION

The present invention relates to computer systems.

Bootstrap Programs

Any computer system must have some way to begin program execution after a cold start. The hardware architecture of a CPU (processor) will normally provide for a "reset" operation, which places all of the hardware circuits in a known electrical state; but it is still necessary to start the CPU on execution of a desired program. For example, in the very early days of computing, some computer systems would be manually configured to read in a "bootstrap loader" program at startup. This bootstrap program was a simple program which loaded in, and started execution of, another sequence of instructions, which were the beginning of the desired program. Bootstrap programs are often referred to simply as "boot" software.

To give a more recent example, the Intel 80×86 microprocessors, after a hardware reset, will always attempt to begin program execution from a specific memory address.[1] Thus, if a branch (or conditional branch) instruction is found at this address, the microprocessor will continue its program execution from whatever address is specified.

[1] That is, the microprocessor will read the contents of that memory location, and will attempt to execute the bits it finds there as a microprocessor instruction. The specific memory location used by the 80×86 family is xxxFFFF0h, i.e. 16 bits below the top of the memory space. Other microprocessors may use a different starting address, but similar principles apply.

Thus, this initial target address is the entry point for every session of use. This address is normally used to enter execution of programs which must be run every time the computer is used.

Basic System Software

Whatever hardware is used will have its own procedures to return to a known state when a reset occurs. However, at some point these procedures end, and the CPU is ready to begin execution of instructions.

At this point the system performs various overhead tasks under software control. These may include surveying the system configuration, sanity checks, etc.

Basic Input/Output System Software (BIOS)

In modern personal computers, the initial target address is normally used as the entry point to a "basic input/output system" (BIOS) program. The BIOS program contains frequently-used routines for interfacing to key peripherals, for interrupt handling, and so forth.[2] In addition to these basic input/output routines, the "BIOS" software also includes some key pieces of overhead software, such as configuration update and the power-on-self-test (POST) routines.[3] The BIOS software will also launch the machine into the operating system software.[4] (Thus, the term "BIOS" has become somewhat broader nowadays, and normally refers to this whole collection of basic system routines.)

[2] Thus, the BIOS software provides some degree of machine-independence. However, in PC-class computers, this independence is not fully exploited by the available commercial software. Many programs bypass the BIOS software, and directly access the underlying hardware addresses or devices. See generally Glass, "The IBM PC BIOS," Byte, April 1989, pp. 303ff.
[3] The POST routines provide an extensive check for hardware integrity.
[4] Depending on how the system has been set up, the BIOS software may direct program execution into DOS, Unix, PS/2, a DOS variant, or another operating system. However, the choice of operating system is not particularly relevant to the inventions described in the present application.

If the BIOS software were to become corrupted, the computer could become unusable. Thus, the BIOS software has conventionally been stored in read-only memory (ROM). When the microprocessor attempts to access the initial target address, it reads out software from the BIOS ROM.

In 1980 there was only one source for IBM-compatible BIOS software, and that was from IBM. However, during the 1980s, as IBM-compatible personal computers became more popular, modified versions of IBM-compatible BIOS ROMs were developed, and IBM-compatible BIOS ROMs were offered by multiple vendors. As of 1991, BIOS software is often modified to implement system-dependent features, especially in low-power systems.

Improvements in BIOS software means that sometimes it will be desirable to implement a BIOS upgrade. Dedicated users have successfully pried out and replaced ROM chips, but most users would not want this degree of hands-on contact.

Some attempts have been made in the past to provide capability for updating the basic system software. See, e.g., Bingham, D. B., "Achieving flexible firmware,+ 1978 MIDCON Technical Papers at 20/3/1–4 (1978), which is hereby incorporated by reference.

It is believed that some vendors may have offered upgradable-BIOS systems. However, insofar as is known to the inventors, no such system has offered the protection against corruption while updating BIOS, which is provided by the disclosed innovations.

Nonvolatile Memory Technologies

Without boot software, a computer could not run any program at all. Thus, corruption of the boot software can make a computer totally unusable. Thus, for security against such corruption, personal computers have commonly been manufactured with their BIOS software in nonvolatile memory chips. However, for rapid system development and upgrading, it is desirable to be able to rapidly provide new BIOS chips, or even to upgrade existing BIOS chips. Over the years, a variety of developments in semiconductor device technology have been used to reconcile these needs.

One of the simplest nonvolatile memories is the mask ROM. By custom-patterning one level of a chip, a complex pattern of data can be permanently encoded.[5] With this technology, a new mask must be prepared whenever any bit of data is changed. In high volume, mask ROMs are reasonably cheap, but they are not suited for rapid upgrading.

[5]For example, an array with polysilicon row lines accessed by row decoders, and metal column lines accessed by column decoders, can have contact holes selectively etched, so that one bit of data is encoded at each row/column intersection. Alternatively, polysilicon row lines can be selectively linked to diffused column lines by metal shorting straps.

A "programmable read-only-memory," or PROM, can be electrically written.[6] However, once the data has been written it is permanent.

[6]PROMs are typically built using solid-state fuses (or antifuses), which will become open (or shorted) whenever a high current is driven through them. Thus, programmation of a conventional PROM requires application of a high voltage (e.g. 10 or 15 V) to achieve the high currents needed.

An "electrically programmable read-only-memory," or EPROM, can be electrically written, and can be erased by ultraviolet light.[7] EPROMs are very commonly used, since they are cheap and their timing standards are familiar. EPROMs are also referred to as UVPROMs.

[7]EPROMs are typically built using a floating-gate avalanche MOS device. This is a MOS transistor with an additional isolated thin film area (the floating gate) interposed between the MOS control gate and the channel. By pumping charge into the floating gate, the effective threshold voltage of the MOS transistor can be changed, and this threshold voltage change is detected by a sense amplifier.

To write a cell, the channel is typically driven hard, with a high voltage on the control gate. Secondary carrier multiplication in the channel creates hot electrons, which are attracted into the floating gate. Thus, programmation of a conventional EPROM requires application of a high voltage (e.g. 10 or 15 V) to achieve the high currents needed. Moreover, programmation is typically quite slow, e.g. several milliseconds per bit.

To erase a cell, it is exposed to ultraviolet light. The energetic photons excite energetic carriers, which can pass through the dielectric layer to neutralized the charge on the floating gate. Thus, EPROMs normally need a package with a quartz window.

An "electrically erasable programmable read-only-memory," or EEPROM or E²PROM, can be electrically written and electrically erased.[8] EEPROMs are less commonly used than EPROMs, since they tend to be more expensive and to require even higher voltages.

[8]EEPROMs, like EPROMs, are typically floating-gate devices. However, in an EEPROM the write and erase operations typically use tunnelling. Thus, programmation of a conventional EEPROM requires application of a high voltage (e.g. 15 or 20 V). Programmation and erasure are typically quite slow, e.g. several milliseconds per bit.

A more recent modification of the EPROM is the "Flash EPROM." This device, like the EEPROM, is electrically erasable, but only in blocks. Although this device does not have the bit-by-bit programmability of the EEPROM, it is still useful in many applications.

A wide variety of rewritable nonvolatile memory technologies have been proposed, and doubtless others will continue to be proposed. For example, the computers of the 1950s and early 1960s used "core" memory technology, which is, to some extent, nonvolatile and rewritable. The disclosed innovations are not limited to Flash EPROMs, but can be adapted to use with other memory technologies.

Safe In-Situ Upgrades for Boot ROM

The disclosed computer system contains several innovative features which permit the boot software to be easily upgraded, and also protect against any corruption of the boot software.

Redundant Boot Memories

The disclosed system uses a rewriteable nonvolatile memory as the primary boot memory. For further security against corruption of the boot software, the preferred system uses TWO boot memories. By selection with a hardware switch, either one can be connected as the boot source.

Overlaid Addressing

Since either of the two boot memories may need to be the target, both boot memories are mappable to the same address. Note that this causes some difficulty in writing to the volatile boot memory: if the volatile boot memory is not in the memory map, it cannot be written to.

In the presently preferred embodiment, this difficulty is avoided by mapping the core software out to RAM, and then commanding an address configuration change to access the other boot memory. If one boot memory is being copied onto the other, then the contents of the source memory must also be copied out.

As noted above, the default mapping of the boot memory address, at initial power-up, is controlled by a physical switch. However, thereafter, a peripheral memory controller chip controls the mapping of the boot memory address. Thus, by issuing a command to this peripheral chip, the core software can change this mapping.

Thus, to write to the boot memory, the core software copies itself out to a RAM location, and commands the microprocessor to branch into the RAM address. The bit to select the boot memory is then toggled, so that writes to the boot memory addresses are now directed to the other boot memory (i.e. to the boot memory which was not the source of the code being executed).

The desired data can then be written into the target boot memory. Note that, if the source of the data is in the active boot memory, that code must be written out into RAM before the boot memory address toggle is switched.

Pre-POST Software Core

The starting address in the boot software is occupied by a small (and strongly protected) software core, which performs sanity checks, and also provides the needed supervisory functions for boot software upgrading and replacement.

Thus, the disclosed innovations solve the problem of performing BIOS restoration/upgrades in-situ (i.e. without removing the FLASH boot memory ROM from the system). The end-user (or a service technician) can program BIOS code into the FLASH without any specialized external hardware or software ROM-programming tools.

Functions Performed by the Software Core

After any hard reset of the system, the core software detects whether the boot software is corrupted, and whether the user has entered a request for upgrade. If these conditions have occurred, the core software performs the FLASH programming from the appropriate data source.

In the presently preferred embodiment, the core software provides for the following three classes of cases. These cases together provide coverage for all conceivable field conditions:

1. Case: While executing reset code from the FLASH, the system BIOS and/or video BIOS are found to have a bad checksum. In this case, power-on-self-test and booting is impossible, therefore, the boot code prompts the use[9] to insert a diskette containing system and video BIOS code and reprograms the FLASH. When the system and video BIOS programming is successfully completed, the user is prompted (via SmartVu) to reset the system. Normal POST and boot should follow.

[9]In the presently preferred embodiment, this is done by a small 4-character diagnostic display which is mounted directly on the system chassis. This display is referred to as SmartVu ™.

2. Case: While executing reset code from the FLASH, the boot code detects a CMOS[10] flag setting indicating a user requested upgrade. The boot code then prompts the user (via SmartVu) to insert a diskette containing the upgrade system and video BIOS code. When the system and video BIOS programming is successfully completed, the user is prompted (via SmartVu) to reset the system. Normal POST and boot should follow.

[10]Personal computers normally contain a battery-backed CMOS memory which stores configuration parameters. In system discussions, this memory is often referred to merely as the "CMOS." However, of course, other nonvolatile or nonvolatized configuration memories can be used instead.

3. Case: While executing reset code from the UV-PROM, the boot code detects that a FLASH is present and that its protected 8 k boot sector is jumpered for programming. Since the UVPROM is intended as a secondary ROM device, this condition is understood as a request for FLASH programming and the entire contents of the UV-PROM, including the boot code in the upper 8 k sector is copied into the FLASH. When the entire FLASH is successfully programmed, the user is prompted to reset the system. If the FLASH is selected as the primary ROM device, normal POST and boot should occur from the FLASH.

Detecting Which Boot Memory is Active

Note that the foregoing steps may require the CPU to ascertain, while it is running boot code, which memory is the source of the code. This is accomplished, in the presently preferred embodiment, by letting the CPU read a register in a peripheral chip.

Hardware Protection of the Software Core Sector

The preferred rewritable boot memory is a sector-protected Flash-EPROM. The sector which contains the software core is actually protected by a jumper, which must be physically moved before the software core can be overwritten. This provides additional robustness.

Floppy-Disk Handling

Because the core software may have to read from floppy disk, it includes the necessary overhead routines to perform this. These routines are generally similar to the BIOS functions under INT13h.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Preferred Hardware Context

The preferred embodiment is an 80486-based EISA-bus PC system. General features of the EISA bus are described in Glass, "Inside EISA," Byte magazine November 1989, pp. 417ff, which is hereby incorporated by reference, and in the EISA specification, which is hereby incorporated by reference. General features of the Intel 80486 are described in Sartore, "The 80486: A Hardware Perspective," Byte magazine IBM Special Edition, Fall 1989, pp. 67ff, which is hereby incorporated by reference. Further detailed background on the 80486 may be found in the "80486 Programmer's Reference" and the "80486 Hardware Reference Manual," both available from Intel and both hereby incorporated by reference.

Many of the architectural features of this system are conventional in modern PC systems. However, several unusual features are used. One of these is the provision for dual boot memories, with hardware and software switching between them. Another notable feature is the use of the "SLOB" controller chip described below.

Preferred I/O Controller Chip ("SLOB")

In the presently preferred embodiment, the system motherboard includes a custom chip, referred to herein as the "SLOB" chip, which performs a variety of useful functions. These include reset control, X-bus transceive[11] control, and control of the boot memories and CMOS nonvolatile memory.

[11] The "X-bus," or "extension bus," is an extension of the system bus, but is not directly connected to it. Instead, data is selectably transferred from the S-bus to the system bus, or vice versa, by bidirectional transceivers. The X-bus is commonly used, in PC architectures, to provide easier loading requirements for a variety of devices on the motherboard.

Use of Parallelled UVEPROM and Flash-EEPROM for BIOS

The software core, in the presently preferred embodiment, resides in the protected 8 k boot sector of a FLASH ROM or in the upper 8 k of a 128 k UVPROM. Selection of the primary ROM device is accomplished via a physical switch.

Figure 2:
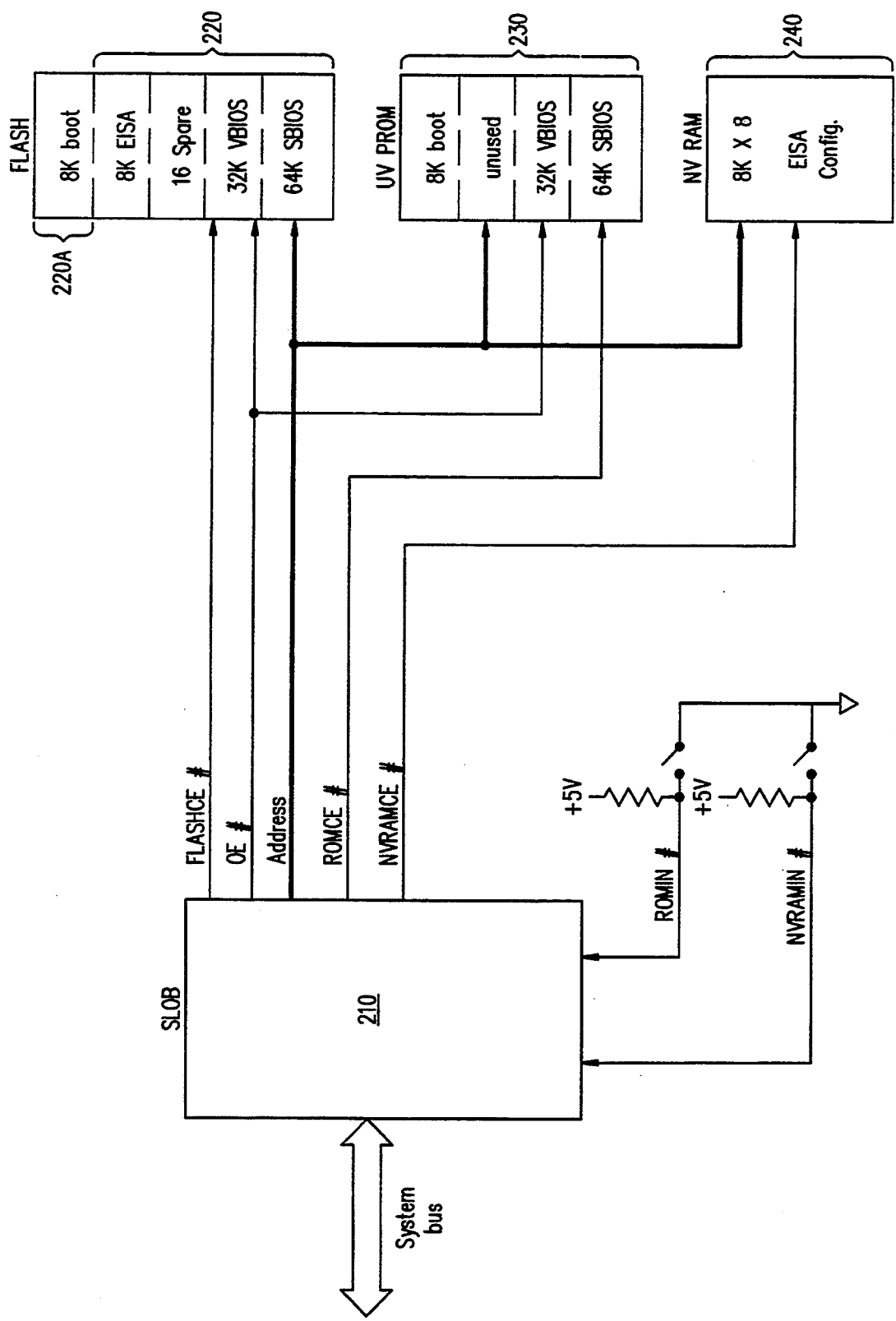
FIG. 2 shows the hardware configuration which permits switching between alternative boot memories, in the computer system of the presently preferred embodiment.

FIG. 2 shows more detail of how this is implemented. The SLOB chip supplies chip enable (CE \) signals separately to the FLASH EPROM 220 and to the UVEPROM 230 (and also to the NVRAM 240). An output enable line OE\ is connected to both boot ROMs, and address lines are also provided to both. A hardware switch provides a line ROMIN \ to the SLOB chip, to define which boot memory is the initial default target.

Use of Sector-Protected Flash-EEPROM

In the presently preferred embodiment, the FLASH EPROM has sector-by-sector protection. (This feature is not available in most FLASH EPROMs, but is available in the newly introduced 28F001B from Intel, which is used in the presently preferred embodiment.)

In the presently preferred embodiment, one sector 220A, of only 8K bytes, is dedicated to the core software. This sector is protected by a hardware jumper, so corruption of the core software is unlikely.

Hardware-Software Hybrid Switch

To achieve automatic programming of the Flash memory from a plug-in ROM, the hardware must provide a switching mechanism that allows software to boot from one source and then toggle between sources. This switchability is also required to access EISA configuration from Flash if running BIOS out of a plug-in ROM.

A user settable hardware switch determines which boot memory the boot code will be fetched at power-up or cold boot. This switch sets the polarity of a bit called ROMIN# which is decoded by the hardware control logic to enable the selected boot source. This bit is readable from an I/O port, so that software can determine the source of the boot code, i.e. ROM (bit=0) or Flash (bit=1). Software then has the ability to toggle between accessing ROM or Flash by setting a bit that assumes the opposite state of ROMIN# after a cold boot. This bit is called ROMEN and enables Flash when 0 and ROM when 1. This bit is readable as well as writable via an I/O port. This mechanism allows hardware to boot from ROM then gives software the ability to determine the presence of Flash memory and program Flash automatically by transferring the contents of the BIOS in ROM to the Flash.

Preferred Memory. Controller Chip ("TRANE")

The chip referred to herein as the TRANE chip is a custom memory controller. Besides performing normal DRAM management functions, this chip also provides selection, by memory domains, of which memory areas will be cached or not.

Preferred Core Software Structure

The actual implementation of the core software will now be described in great detail. However, it must be understood that this specific implementation is merely illustrative, and is subject to change, and does not by any means delimit the scope of the inventions claimed.

Functionality

Figure 1:
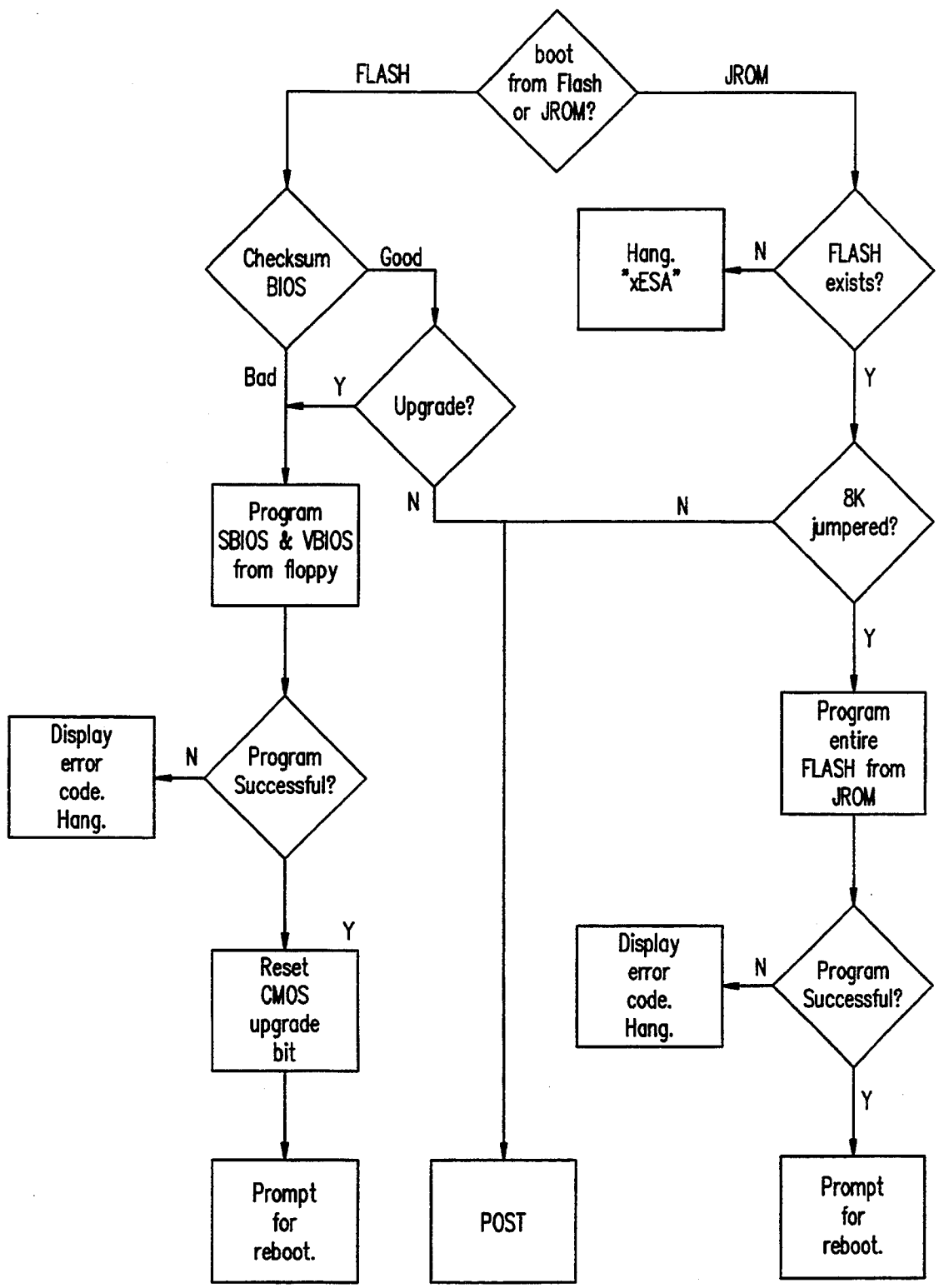
FIG. 1 is a flow chart which schematically shows key portions of the methods used in the computer system of the presently preferred embodiment.

FIG. 1 is a flow chart which schematically shows key portions of the methods used in the computer system of the presently preferred embodiment.

When the 80486 first comes out of reset, it comes up in real mode[12] (but the high address bits are held high, so that the processor can go to the top of the 4-Gigabyte (32-bit) memory space. The processor accesses address FFFFFFF0h.

[12] See generally Glass, "Protected Mode," Byte magazine December 1989, pp. 377ff, which is hereby incorporated by reference.

Preferred Assembly Language Implementation

The actual implementation of key portions of the core software, in the presently preferred embodiment, will now be given. The following listings in documented assembly language also contain a large number of informal comments. These comments do not necessarily define the scope of the invention, but will help to explain the motivation, structure, and workings of the presently preferred embodiment.

Some of the procedures actually used, in the presently preferred embodiment, will now be described in detail. Of course, it should be understood by those skilled in the art that the very specific implementation details given are not by any means necessary to the invention. The following wealth of detail is provided merely to assure compliance with the best mode requirements of U.S. patent laws.

Procedure 8KBOOT STRT

Procedure 8kboot_strtis the power-on-reset entry point into the 8 k boot sector code for a 128 k FLASH EPROM. This code along with a reset vector is located in the upper 8 k boot sector of a 128 k FLASH EPROM. The reset vector will be located at 1fff0h (physical ROM address), and the start of this routine will be located at 1e000h (start of the 8 k boot sector). The reset vector will contain a NEAR jmp to this code, so execution will start in processor real mode, ROM native mode, at logical address 0ffffe000h. This procedure implements most of the steps in the flow chart of FIG. 1. Specifically, this procedure:

Saves the state of EAX and DX for later use by POST.
Initializes a base address for the DRAM controller (the TRANE chip, in the presently preferred embodiment).
Disable interrupts (NMI and INTR).
If warm boot, jmp into POST SHUTDOWN routine.

Else, if power-on check to see if we're running out of a UVPROM or the FLASH.

If FLASH, jump to the "bootFLASH" procedure which programs the flash if tile BIOS is corrupted or if the user has requested an upgrade.

If UVPROM, jump to the "bootUVPROM" code which copies the UVPROM to the FLASH if a FLASH exists.

If either "bootFLASH" or "bootUVPROM" does not program the flash, control returns to "do_reboot" which displays a SmartVu message and halts. NOTE: Because of the redundancy between this code and early parts of POST, (RESET, SHUTDOWN) the BIOS is NOT dependent on this code. This means that a working BIOS can be built for a 64 k non-FLASH ROM architecture by simply removing this module from the build process. The original 64 k BIOS reset/initialization logic has been left untouched.

```
;----------------------------------------------------------
CODE8K   SEGMENT USE16 PUBLIC 'CODE'
         ASSUME cs:CODE8K, ds:CODE8K
         extrn int13h : near
         extrn initFd : near
         extrn dskprm : byte
fdcDOR   equ 3F2h      ;Digital output register.
                       ; bit7 = 0 Reserved.
                       ; bit6 = 0 Reserved.
                       ; bit5 = 1 Enable drive 1 motor.
                       ; bit4 = 1 Enable drive 0 motor.
                       ; bit3 = 0 Enable floppy interrupts and DMA.
                       ; bit2 = 0 Controller reset.
                       ; bit1 = 0 Reserved.
                       ; bit0 = 0 Select drive 0.
                       ;       = 1 Select drive 1.
         PUBLIC @8kboot_strt
@8kboot_strt:
; Save ax in high word of ebp, dx in high word of esp.
         mov    bp,ax
         shl    ebp,16
         mov    sp,dx
         shl    esp,16
; Disable primary and secondary caches. 486 cache comes up enobted so we want
; it OFF as fast as possible.
         DIS_486CACHE
; Grab a base IO address for TRANE. The first IO write address after
; power-on will be appropriated by TRANE for it's base address.
         mov    al,0            ;Valid TRANE index for warm boot case.
         out    TRANE_BASE,al   ;Dummy IO write to set TRANE base.
Flush secondary cache.
         mov    dx,slob_portXX
         in     al,dx
         or     al,slob_portXX_flushBit    ;Hold ext. cache in flush.
         out    dx,al
         and    al,NOT slob_portXX_flushBit  ;Reset ext. cache flush.
         out    dx,al
; Turn off interrupts and NMI.
         cli
         mov    al,NMIOFF+0Dh
         out    NMIMSK,at       ;Turn off NMI's
         WAFORIO
         in     al,NMIMSK+1
CPU in fastest possible mode
         mov    al,PITSL2+PITRLL+PITMD1
         out    XPITMD,al
         cld
; Warm or cold boot? If cold boot, we do the 8k code. If warm boot we
; bait into SBIOS reset logic.
         IN     AL,UPISTA       ;see if 8042 system bit on,
         TEST   AL,04H          ;bit 2 of 80-42 status port
         jz     SHORT is_cold_boot  ;If warm boot, haul assl
; shutdown code = CMOS shutdown byte
         MOV    AL,NMIOFF+CMSHUT
         OUT    CMOSAD,AL
         WAFORIO
         IN     AL,CMOSDT       ;get CMOS shutdown byte
         MOV    AH,AL
; This is a CPU reset, riot a bus reset. In this case we may assume RAM
; is initialized and therefore RSTFLG can be used to determine the sense
; of shutdown Os. If it's a shutdown 0 and RSTFLG == 1234h, then it's a
; warm boot, else it's a shutdown that wants to act Like a cold boot.
         cmp    ah,0            ;Shutdown 0
         jne    is_warm_boot    ;If not, warm boot.
         mov    bx,ROMDAT
         mov    ds,bx
         ASSUME DS:ROMDAT
         cmp    RSTFLG,1234h    ;CTRL-ALT-DEL ?
         ASSUME DS:CODE8K
         je     SHORT is_warm_boot  ;If so, warm boot.
```

-continued

```
; Switch to protected mode and do a FAR jmp to the 4G native mode BIOS
; to remain in the 8k boot code.
is_cold_boot:
        mov     sp,OFFSET pm_retptr
        jmp     pmode              ;Protected mode entry routine.
pm_retptr   DW OFFSET pm_ret
; If we're booting from FLASH, look for a corrupted BIOS or a user
; requested upgrade.
; If we're booting from UVPROM, program the FLASH if it exists.
pm_ret: mv     dx,slob_extRom     ;SLOB external ROM register.
        in      al,dx
        test    al,slob_extRom_romin   ;are we booting from UVPROM or FLASH?
        jz      bootUVPROM         ;booting frm UVPROM.
        jmp     bootFLASH          ;booting from FLASH.
        jc      do_reboot          ;Display error message.
; Return here from "bootUVPROM" or "bootFLASH" if FLASH programmed
; successfully. Issue SmartVu message to reboot and wait forever.
do_reboot:  mov esi,eax            ;Save SMARTVU message.
;Make sure the checksum is still good.
        mov     di,OFFSET cmosSum_ret2
        jmp     cmosSum            ;Checksums CMOS routine.
cmosSum_ret2:
;Beep and display error message.
        mov     cx,800h            ;Set frecquency.
        mov     di,OFFSET beep_ret
        jmp     beep
beep_ret:   mov eax,esi            ;Restore SMARTVU message.
        mov     cx,0               ;Delay forever.
        jmp     flash_msg          ;Display error message.
; Do a FAR jmp to the SBIOS reset logic at F000:E1FF. Restore the reset state
; prior to the jmp.
back2RM:    mov dx,slob_portXX     ;Access portXX.
        in      al,dx              ;Read in current value.
        waforio
        and     al,not slob_portXX_flhPrg;Disable FLASH program/erase.
        out     dx,al              ;Write out the new value.
        PAR_RESET                  ;Reset parity flop at port 61h.
;Make sure the checksum is still good.
        mov     di,OFFSET cmosSum_ret
        jmp     cmosSum            ;Checksums CMOS routine.
cmosSum_ret:    OPSIZE
        lidt    FWORD PTR cs:real_idt   ;Interrupts from vector table 2 @ 0.
; Set 64k limits for ati selectors.
        mov     ax, GDTD_8KBOOT
        mov     ds,ax
        mov     es,ax
        mov     ss,ax
        mov     ss,ax
        mov     fs,ax
        mov     gs,ax
        mov     eax,cr0
        and     al,NOT 1
        mov     cr0,eax            ;Real mode
; Set segments regs back to CPU reset defaults.
        xor     ax,ax
        mov     ds,ax
        mov     es,ax
        mov     ss,ax
        mov     fs,ax
        mov     gs,ax
is_warm_boot:
;Restore ax and dx to their reset values.
        shr     esp,16
        shr     ebp,16
        mov     dx,sp              ;Restore reset value of DX.
        mov     ax,bp              ;Restore reset value of AX.
        DB      0eah               ;FAR jmp to SBIOS reset entry point.
        DW      0E1FFH
        DW      0f000h
```

Procedure BOOTUVPROM

Procedure bootUVPROM contains the 8 k power-on logic executed when a UVPROM is installed. When cold-booting from a UVPROM, this code is executed to look for a FLASH ROM and if present, attempts to copy the entire UVPROM contents into the FLASH. If FLASH programming is unsuccessful for any number of reasons, e.g., FLASH is not present, 8 k boot sector is not jumpered for erase/programming, etc., then this routine just bails back into POST.

```
;-------------------------------------------------
                PUBLIC bootUVPROM
```

-continued

```
bootUVPROM  PROC    NEAR
        mov     sp,OFFSET $106_retptr
        jmp     $init_vl106
$106_retptr    DW    OFFSET $106_ret
$106_ret:   MOV    eax,'RAMi'
        mov     dx,SKARTVU
        out     dx,eax
;Initialize RAM.
        mov     bp,OFFSET RAMinit_ret   ;Point sp to near return address.
        jmp     RAM_init        ;Initialize Trane.
;Map in the first available SIMM at 0-2Mb.
RAMinit_ret:    mov     al,CMSMTPL+NNIOFF
        out     CMOSAD,al
        in      al,CMOSDT       ;Get SIM map from CMOS.
        max     bx,al                   ;Save SIMM configuration in bx.
        mov     dh,al
        mov     ax,GDTD_4G      ;4G data seg ...
        mov     ds,ax           ;Into ds.
        mov     es,ax           ;into es.
findSIMM:   bsf bp,bx                   ;Find first installed SIMM position.
        jnz     SHORT mapSIMM
        mov     ax,GDTD_8KBOOT
        mov     ss,ax
        jmp     JROM2post       ;If none, do POST.
mapSIMM:    mov dx,bp
        TRANE_OUT_IX    TRANE_RCROM,dl  ;Progrm 1st SIMM at 0 as a 256kbit part.
; Copy 8k boot from ROM to RAM at 11e000h (1M + 128k - 8k).
        mov     eax,' x8K'
        mov     dx,SMARTVU
        out     dx,eax
        mov     ecx,2000h SHR 2         ;8kb == 2k DWORDs.
        mov     edi,11e000h     ;Destination in RAM above 1M.
        mov     esi,0ffffe000h          ;Source in 4G ROM.
        cld             ;Forward MOVSD.
        ADSIZE
        rep movsd               ;move 8k boot from 4G ROM to RAM above 1M.
; Check the RAM code against the ROM to verify the copy..(and validate RAM)
        mov     eax,'8Kck'
        out     dx,eax
        mov     ecx,2000h SHR 2         ;8kb == 2k DWORDS.
        mov     edi,11e000h     ;Destination string in RAM above 1M.
        mov     esi,0ffffe000h          ;Source string in 4G ROM.
        ADSIZE
        repe        cmpsd               ;Search for non-matching DWORD.
        je      SHORT jmp2RAM           ;If RAM/ROM match then jump to the RAM code.
; If the 8k boot in RAM is corrupted then assume that SIMM is bad and mark
; it out in CMOS. Go back and took for the next good SIMM.
        btr     bx,bp           ;Reset the current SIMM bit in the map.
        mov     al,CMSMTPL+NMIOFF
        out     CMOSAD,al
        mov     al,bl
        out     CMOSDT,at       ;Disable the SINN in the CMOS map.
        jmp     findSIMM        ;Look for the next good SIMM.
;Jump into the 8k boot code that has been copied to RAM.
jmp2RAM:    JMPP    GDTC_1M_RAM     ;Load cs with selector for 1M RAM code.
;Relocate the GDT.
        OPSIZE
        lgdt            FWORD PTR cs:ram_gdt_ptr
; Set up sow stack.
        mov     ax,GDTD_STACK
        mov     ss,ax
        mov     sp,8000h
; initialize timer and calibrate speed.
        pusha
        push    da
        call    init_timer
        call    calb_spd
        pop     ds
        popa
; Disable the UVPROM and enable the FLASH.
        mov     dx,slob_extRom          ;FLASH/UVPROM enable register.
        in      al,dx
        and     al,NOT slob_extRom_romEn    ;Enable FLASH.
        out     dx;al
; Look for signature to determine FLASH presence.
        mov     BYTE PTR fs:[fLash_CP],flash_signature
        mov     al,fs:[flash_SIG_lo]                ;Lo byte of signature.
        cmp     al,FLASH_MAN_CODE       ;28F001B manuf. code?
        jne     SHORT no_flash          ;If not, FLASH not present, do POST.
        mov     al,fs:[flash_SIG_hi]                ;Hi byte of signature.
        cmp     al,FLASH_DEV_CODE0      ;28F001B device code?
        je      SHORT uvprom2ram        ;If so, go on.
```

-continued

```
        cmp     al,FLASH_DEV_CODE1      ;Alternate 28F001B device code?
        je      SHORT uvprom2ram        ;If so, flash present.
; Flash not present, so look for an EISA NVRAM. If none, then hang.
no_flash:   mov dx,slob_configA
        in      al,dx
        test    al,slo_configA          ;Is an NVRAM installed?
        jnz     SHORT no_EISA_cfg       ;If not, hang.
        mov     ax,GDTD_1M_RAM          ;Stack segment in current code.
        mov     ss,ax
        jmp     JROM2post               ;Got NVRAM for EISA, but no FLASH, so do POST.
no_EISA_cfg:    mov eax,'xESA'          ;EISA CMOS not present.
        jmp     do_reboot               ;Display error message.
; FLASH is present.
; Copy and verify the 128k UVPROM into RAM.
uvprom2ram: mov eax,'xBIO'
        mov     dx,SMARTVU
        out     dx,eax
        mov     dx,slob_extRom          ;FLASH/UVPROM enable register.
        in      al,dx
        or      al,slob_extRom_romEn    ;Enable UVPROM
        out     dx,al
        mov     ecx,18000h SHR 2
        mov     edi,100000h             ;Destination in RAM above 1M.
        mov     esi,0fffe0000h          ;Source in 4G ROM.
        mov     ax,GDTD_4G              ;46 data seg ...
        mov     ds,ax                   ;into ds.
        mov     es,ax
        cld                             ;Forward MOVSD.
        ADSIZE
        rep     movsd                   ;mw 128k UVPROM to RAM above 1M.
;Check the RAM code against the ROM to verify the copy.,(and validate RAM)
        mov     eax,'BIOc'
        mov     dx,SMARTVU
        out     dx,eax
        mov     ecx,18000h SHR 2
        mov     edi,100000h             ;Destination string in RAM above 1M.
        mov     esi,0fffe0000h          ;Source string in 4G ROM.
        ADSIZE
        repe    cmpsd                   ;Search for non-matching DWORD.
        je      SHORT erase_flash       ;If RAM/ROM match then erase all of flash.
; RAM failed ckaring the UVPROM copy.
        JNPP    GDTC_8KBOOT             ;Jump back to UVPROM.
        OPSIZE
        lgdt    FWORD PTR cs:gdt_ptr
; Mark out the current SIMM in CMOS and go back to look for the next
; good SIMM.
        btr     bx,bp                   ;Reset the current SIMM bit in the map.
        mov     al,CMSMTPL+NMIOFF
        out     CMOSAD,al
        mov     al,bl
        out     CMOSDT,al               ;Disable the SIMMM in the CMOS map.
        jmp     findSIMM                ;Look for the next good SIMM.
; Try to erase the 8k boot sector to see if it is jumpered for program/erase.
erase_flash:    mov eax,'E8K'
        mov     dx,SMARTVU
        out     dx,eax
        mov     dx,slob_extRom          ;FLASH/UVPROM enable register.
        in      al,dx
        and     al,NOT slob_extRom_romEn ;En&bLe FLASH.
        out     dx,al
        cal     enable_fProgram         ;Enable flash programming.
        mov     edi,flash_8kboot        ;Erase 8k boot sector.
        mov     eax,'fE8K'              ;failure erasing 8k boot sector.
        call    erase_sector
        jnc     eSVbios                 ;If not, erase S&V bios.
        mov     ax,GDTD_1M_RAM
        mov     ss,ax
        jmp     JROM2post               ;If none, do POST.
; Erase SBIOS & VBIOS.
eSVbios:    mov eax,'eBIO'
        mov     dx,SMARTVU
        out     dx,eax
        mov     edi,flash SBIOS         ;Erase SBIOS sector.
        mov     eax,'fESB'              ;failure erasing SBIOS.
        call    erase_sector
        jc      do_reboot               ;Display error message.
; Program the flash SBIOS and VBIOS.
        mov     eax,'pGIO'
        mov     dx,SMARTVU
        out     dx,eax
        mov     edi,flash_SBIOS         ;Destination (start address of FLASH).
        mov     esi,100000h             ;Source data in RAM @ 1 meg.
```

-continued

```
        mov     ecx,18000h              ;Progrm 64k SSIOS and 32k VBIOS.
        mov     eax,'fPSV'              ;failure Programming S & V BIOSes.
        call            program_sector
        jc      do_reboot       ;Display error message.
; Program the flash 8k boot.
        mov     eax,'p8K'
        mov     dx, SMARTVU
        out     dx,eax
        mov     edi,flash_8kboot                ;Destination (start address of 8k boot sector).
        mov     esi,11e000h             ;Source data in RAM @ 1 meg + 120k.
        mov     ecx,2000h               ;Progrm 8k boot sector.
        mov     eax,'fP8K'      ;failure Programing 8K boot.
        call    program-sector
        jc      do_reboot       ;Display error message.
; Flash programming successful. Cycle 'FLSH' and 'DONE' to the SmartVu
; on a 2 second cycle while waiting for a power-cycle.
        mov     ax,GDTD_1M_RAM
        mov     ss,ax           ;Point stack at code seg.
flash_prog_ok:  mov eax,'FLSH'
        mov     cx,2            ;2 second delay.
        mov     di,OFFSET fdone_msg
        jmp     flash_msg       ;Display 'FLSH' and wait for 2 seconds.
fdone_msg: mov eax,'DONE'  ;DONE message.
        mov     cx,2            ;2 second delay.
        mov     di,OFFSET flash_prog_ok
        jmp     flash_msg
JROM2post:      mov dx,slob_extRom              ;FLASH/UVPROM enable register.
        in      al,dx
        or      al,slob_extRom_romEn            ;Erobte UVPROM
        out     dx,al
        jmp     back2RM
bootUVPROM ENDP
```

Procedure BOOTFLASH

Procedure bootFlash contains the 8K power-on logic executed when the system boots from the Hash.

The steps are as follow:

Checksum the system anal video BIOS (96K).
If checksum is good, go to I.
If checksum is bad, go to II.
I. Does the user request a BIOS upgrade?
If upgrade is selected, go to II.
If upgrade is not selected, we are done with this routine and shall go to do regular POST.
II. Reset the upgrade option to prevent an endless loop.
Initialize a lot of stuff.
  Initialize 106 so that we have SmartVu.
  Slob initialization.
  Trane initialization and get at least 2 meg of DRAM.
  Initialize the refresh counter.
  Set refresh page to 0 through the DMA controller.
  Copy code to RAM and execute from RAM.
Set up stack.
Test and initialize timers.
Calibrate count before first call to DLY100.
Set up the DMA controllers.
Set up the interrupt descriptor table.
Set up the interrupt controllers.
Initialize the floppy subsystem.
Copy the BIOS from floppy.
If unsuccessful, display error message and halt.
Make sure we indeed have a valid BIOS in RAM.
Set the Flash up for programming.
Copy the BIOS from RAM to Flash.
If unsuccessful, display error message and halt.
Inputs:
  Native-mode, protected-mode, Trane has grabbed its I/O address.
Outputs:
  Either halts or go to do regular POST.

If the BIOS checksum is good and no upgrade is requested, this routine will jump to do regular POST.

If the BIOS checksum is bad or an upgrad is requested, then this routine will halt at the end.

```
;---------------------------------------- public bootFlash bootFlash proc  near

;Initialize the 106 so we can have SmartVu.
        mov sp,offset vl106_retptr
        jmp $init_vl106
vl106_retptr    dw      offset vl106_ret
vl106_ret:
        mov eax,'Dell'          ;Announce ourselves.
        mov dx,SMARTVU
        out dx,eax
;Checksum the system and video BIOS.
        mov ax,GDTD_4G          ;Flat addressing.
        mov ds,ax
        cmp dword ptr ds:[0FFFEE076h],'lleD'
        jne badChksum ;Do not do the byte checksum since we have the dword XOR.
if 0
        xor ecx,ecx
        mov cl,byte ptr ds:[0FFFF0002h];Video ROM size in 512-byte blocks.
        cmp cl,40h      ;Greater than 32k.
        ja badChksum    ;Jump if greater than 32k.
        or cl,cl        ;Check for 0.
        jz short badChksum      ;Jump if 0.
        shl ecx,9       ;Convert to bytes.
        add ecx,64*1024 ;Add the size of the system ROM.
        mov ah,0        ;Initialize checksum.
        mov esi,0FFFE0000h      ;Initialize pointer to (4G-128K).
        cld             ;Set to increment.
chkSumLoop:
        ADSIZE
        lodsb           ;al has value.
        add ah,al       ;Add value to ah.
        ADSIZE
        loop    chkSumLoop
```

```
        or ah,ah         ;BIOS checksum good?
        jnz short badChkSum   ;Jump if bad checkum.
     endif    ;0

Check the XOR of the 96K BIOS.
     mov ebx,dword ptr ds:[0FFFEE842h];Get the system BIOS
         version.
     mov cx,50h/4     ;Do 20 dwords.
     mov esi,0FFFE0000h
xorLoop1:
     ADSIZE
     lodsd
     xor ebx,eax
     loop    xorLoop1 mov cx,(96*1024/4)-22    ;Do 24K dwords - 22 dwords.
     mov esi,0FFFE0058h
xorLoop2:
     ADSIZE
     lodsd
     xor ebx,eax
     loop    xorLoop2 cmp ebx,dword ptr ds:[0FFFE0050h]
     jne short badChkSum    ;Jump if bad XOR.

goodChkSum:
     mov eax,'CMOS'
     mov dx,SMARTVU
     out dx,eax

;Now that the BIOS is not corrupted, check if the user requests a
     BIOS upgrade.
;First, make sure we have not lost battery power to the CMOS
     RAM.
     mov al,CMDST+NMIOFF    ;Read CMOS status register D.
     out CMOSAD,al
     waforio
     in al,CMOSDT
     test    al,80h      ;Did we loose battery power?
     jz      back2RM     ;Jump if we lost power.

;Second, make sure we have correct CMOS checksum.
     mov bx,2E10h+8080h    ;bh = first location not to checksum.
                           ;bl = first location to checksum.
     xor ax,ax            ;Contains the running sum.
     mov cx,ax            ;Temporary storage.
chkCMOSLoop:
     mov al,bl            ;Get location.
     out CMOSAD,al        ;Read from CMOS.
     waforio
     in   al,CMOSDT
     add cl,al            ;Tabulate word checksum.
     adc ch,0
     inc bl               ;Next location.
     cmp bl,bh            ;Done with checksum?
     jne short chkCMOSLoop   ;Jump if not done yet.

mov al,2Eh+NMIOFF    ;Read from high byte checksum.
     out CMOSAD,al
     waforio
     in al,CMOSDT
     cmp al,ch            ;Correct high byte checksum?
     jne back2RM          ;Jump if CMOS is corrupted.

mov al, 2Fh+NMIOFF   ;Read from low byte checksum.
     out CMOSAD, al
     waforio
     in   al,CMOSDT
     cmp al,cl            ;Correct low byte checksum?
     jne back2RM          ;Jump if CMOS is corrupted.

;Now, we are ready to inspect the "upgrade" indicators.
     mov al,CMUPGD+NMIOFF    ;Read "upgrade" indicators.
     out CMOSAD,al
     waforio
     in   al,CMOSDT
     cmp al,55h           ;Upgrade requested?
     jne back2RM          ;Jump if upgrade not requested.

Upgrade:

badChkSum:
;If you reach this point, that means you either have a corrupted
     BIOS or the
;user requests to upgrade the BIOS. In either case, the following
     code
;applies to both.

;Reset the "upgrade" indicators to prevent an endless loop.
     mov al,CMUPGD+NMIOFF    ;Reset "upgrade" indicators.
     out CMOSAD,al
     waforio
     mov al,0
     out CMOSDT,al ;Initialize Trane and grab at least 2M of DRAM, and also
     initialize Slob.
     mov sp,OFFSET initStuff_retptr;Point sp to near return
         address.
     jmp initStuff       ;Go and do the initialization.
initStuff_retptr dw OFFSET initStuff_ret ;Return address.

initStuff_ret:
;Set up a 32K stack at 080000h.
     mov eax,'zTAK'
     mov     dx,SMARTVU
     out dx,eax mov ax,GDTD_STACK
     mov ss,ax
     mov sp,8000h ;Set up the interrupt descriptor table.
     OPSIZE
     lidt    fword ptr cs:idt_ptr
;    db      2Eh,0Fh,01h,1Eh
;    dw      (OFFSET idt_ptr)+0E000h ;Go to real mode to do the floppy stuff.
getreal:
     mov eax,'rMod'
     mov dx,SMARTVU
     out dx,eax
     call    rMode ;Initialize timer and calibrate speed.
     call    init_timer
     call    calb_spd ;Set up the DMA controllers.
     mov eax,'iDMA'
     mov     dx,SMARTVU
     out dx,eax call    setupDMA
     jnc short setupDMA_ret mov eax,'xDMA'       ;DMA controller failure.
     jmp do_reboot setupDMA_ret:
;Set up the Interrupt controllers.
     mov eax,'iPIC'
     mov     dx,SMARTVU
     out dx,eax call    setupPIC setupPIC_ret:
;Initialize the floppy subsystem.
     mov dx,slob_portYY     ;Read portYY.
     in al,dx               ;Read it.
     waforio
     or al,slob_portYY_floppyEn ;Turn on on-board floppy.
     out dx,al
     waforio mov eax,'iFDC'
     mov     dx,SMARTVU
     out dx,eax call    initFd         ;Do the floppy initialization.
     jnc short doCopy
```

-continued
```
    mov eax,'xFDC'      ;Floppy drive controller failure.
    jmp do_reboot ;Copy the new BIOS from floppy.
doCopy:
    call    copy        ;Copy the BIOS from the floppy.
    jnc short getProtected ;Jump if no error in copying.

mov eax,'xfCP'      ;Floppy copy error.
    jmp do_reboot

;Go to real mode to do the floppy stuff.
getProtected:
    mov eax,'pMod'
    mov dx,SMARTVU
    out dx,eax
    call    pMode2

;Check if we indeed have a semi-legitimate BIOS.
    mov eax,'SANE'
    mov dx,SMARTVU
    out dx,eax call    sanityCheck
    jnc programIt mov eax,'xSAN'      ;We do not have a legi BIOS.
    jmp do_reboot ;Program the Flash with the new BIOS.
programIt:
    call    program     ;Go and program the Flash.
    jc      short bootFlashError mov cx,800h         ;Set frequency.
    mov di,offset beep_ret2
    jmp beep
beep_ret2:

mov ax,GDTD_64K_RAM ;Set ss = cs.
    mov ss,ax
    jmp flash_prog_ok   ;Display 'END' message.

bootFlashError:
    mov eax,'xPRG'
    jmp do_reboot bootFlash endp
```

Other Procedures

The actual assembly language realization used contains numerous other procedures, which will now be detailed. Most of these procedures are completely conventional. However, any of these procedures which have any particular relevance to the claimed inventions are actually listed below.

INITSTUFF

This procedure initializes the "SLOB" and "TRANE" chips.

```
;----------------------------------------
    public initStuff
initstuff proc near
;---- Initialize SLOB.----
    mov eax, 'iSLB'
    mov dx,SMARTVU
    out dx,eax
;
;Initiatize slob_configA (OCA2h).
;   bit0:3 → CPUtype.
;   bit4 → 8742 installed.
;   bit5 → NVRAM installed.
;   bit6 → Password.
;   bit7 → Lower bay installed. (ignore for
          proto BIOSz
          and desktop)
;
    mov dx,sLob_configA ;Read configA.
    in at,dx
    and al,slob_configA_nvRamIn+slob_configA_8742in;
    Isolate the bits.
    out dx,al           ;bit0:3 and bit7 Is read-only.
                        ;bits is written with a 0,
                        ; this should not affect the state
                        ; of the password.
                        ;bit4 - 8742 installed.
                        ; If read is 0, 8742 is installed,
                        ;   then write 0 to tell the 106
                        ;   to dis&ble its own kyb cntrl.
                        ; if read is 1, 8742 not installed,
                        ;   then write 1 to tell the 106
                        ;   to enabled its own kyb cntrl.
                        ;bit5 - NVRAN installed.
                        ; If read is 0, NVRAM is installed,
                        ;   then write 0 to tell SLOB to
                        ;   disable FLASH.
                        ; If read is 1, NVRM not installed,
                        ;   then write 1 to tetl SLOB to
                        ;   enable FLASH.
;
; initatize slob_portYY (OCA5h).
; ON RESET:
;   bit0 = 0 → Floppy disabled.
;   bit1 = 0 → IDE interrupt disabled.
;   bit2 = 1 → Primry hd cntrl.
;   bit3 = 0 → Mono.
;   bit4 = 1 → Gate A20 set.
;   bit5 = 1 → Kyb command enabled, no intercept.
;   bit6 = 1 → BIOS resent on.
;   bit7 = 0 → Relay off. (Ignore for desktop)
;
    mov dx,slob_protYY  ;Read portYY.
    in al,dx
    and al,not (slob_portYY_gateA20+
    slob_portYY_kA20cmdEn+slob_portYY_biosRstDrv)
                        ;Reset A20.
                        ;Enable kyb command intercept.
                        ;BIOS reset off.
    out dx,al
;
; Initialize slob_portXX (OCA6h).
; ON RESET:
;   bit0 = 1 → RSTNMI inactive (read-only).
;   bit1:2 = 0 → Speaker off.
;   bit3 = 0 → FLASH program/erase disabled.
;   bit4 = 1 → Native mode.
;   bit5 = 0 → SMVU reset enabled.
;   bit6 = 0 → Mouse IRQ enabled.
;   bit7 = 0 → Flush disabled.
;
    mov dx,slob_portXX  ;Write portXX.
    mov al,01010111b    ;bit7 = disable flush.
    out dx,al           ;bit6 = mouse IRQ disabled.
                        ;bit5 = smVu reset enabled.
                        ;bit4 = native mode.
                        ;bit3 = flash erase/program disabled.
                        ;bit2:1 = speaker on HIGH.
                        ;bit0 read only (RSTNMI).
;
; Initialize slob_portZZ (OCA7h).
; ON RESET:
;   bit0 = 0 → VGA disabled.
;   bit1 = 0 → VGA reset on.
;   bit2 = 0 → VGA IRQ9 disabled.
;   bit3 = 0 → IDE SLVACT masked.
;   bit4 = 1 → don't cares (read-only).
    mov dx,slob_portZZ  ;Write portZZ.
    mov al,11110001b    ;VGA enabled.
    out dx,al
    mov al, 11110011b   ;VGA reset off.
    out dx,al
;
;Don't need to initiatize cpu types; POST will (OCA2h and
OCA3h).
;
```

```
; Initialize the phantom counter control register, slob_pccr
(OCA0h).
;
;wrc???
;
; Initiatize slob_power_good_mask (OCA1h).
;This register does not need initiatization; defaults to
; 3Fh. This register sets the time for stabling power output
for a tower system when the relay to the lower drive bay kicks in.
;
;
; Initialize slob_configB (OCA3h).
; This register does not need initiatization.
;
;
; Initialize slob_extRom (OCA4h).
; This register does not need initiatization.
;
;---- Initialize RAM ----
;
    mov eax,'iRAM'
    mov dx,SMARTVU
    out dx,eax
    mov bp,OFFSET initRAM_ret;Point sp to near return
                              address.
    jmp RAM_Init              ;Initialize Trane.
initRAM_ret:
;Map in the first available SIMM at 0-2 Mb.
    mov al,CMSMTPL+NMIOFF
    out CMOSAD,al
    in al,CMOSDT              ;Get SIMM map from CMOS.
    movzx bx,al               ;Save SIMM configuration in bx.
    mov bp,es
    shl ebp,16                ;ES into hi word of eax.
    mov bp,ds                 ;Save ds.
    mov ax,GDTD_4G            ;4G data seg ...
    mov ds,ax                 ;into ds.
    mov es,ax                 ;into es.
findSIMM2: bsf dx,bx          ;Find first installed SIMM position.
    jnz SHORT                 ;If a SIMM is found, map it in @ 0.
    mapSIMM2
    mov eax, 'fRAM'           ;Can't find any RAM.
    mov cx,0                  ;Delay forever.
    jmp flash_msg             ;Display error message.
mapSIMM2: TRANE_OUT_IX TRANE_RCROM,dl
;Program 1st SIMM at 0 as a 256kbit part.
; Copy 8k boot from ROM to RAm at 11e000h (1M +
128k - 8k).
    mov ecx,2000h SHR 2       ;8kb == 2k DWORDs.
    mov edi,10000h            ;Destination in RAM above 1M.
    mov esi,0ffffe000h        ;Source in 4G ROM.
    cld                       ;Forward MOVSD.
    ADSIZE
    rep movsd                 ;move 8k boot from 4G ROM to
                              RAM above 1M.
; Check the RAm code against ROM to verify the copy and
validate RAM
    mov ecx,2000h SHR 2       ;8kb , 2k DWORDS.
    mov edi,10000h            ;Destination string in RAM
                              above 1M.
    mov esi,0ffffe000h        ;Source string in 4G ROM.
    ADSIZE
    repe cmpsd                ;Search for non-matching
                              DWORD.
je SHORT jmp2RAM2 ;If RAM/ROM match then jump to the
RAM code.
; if the 8k boot in RAM is corrupted then assume that SIMM
is bad and
; mark it out in CMOS. Go back and look for the next good
SIMM.
    btr bx,dx                 ;Reset the current SIMM bit
                              in the map.
    mov al,CMSMTPL+
    NMIOFF
    out CMOSAD,al
    mov al,bl
    out CMOSDT,al             ;Disable the SIMM in the
                              CMOS map.
    jmp findSIMM2             ;Look for the next good SIMM.
; jump into the 8k boot code that has been copied to RAM.
jmp2RAM2: mov ds,bp           ;Restore ds.
    shr ebp,16 mov es,bp
    JMPP                      ;Load cs with selector for
                              1M RAM code.
GDTC_64K_RAM
;Relocate the GDT.
    OPSIZE
    lgdt fword ptr cs:ram64_gdt_ptr
initStuffDone:
    ret
initStuff endp
```

RAM_init

Procedure RAM_initperforms RAM initialization for the 8 k boot code, initializes TRANE, identifies memory, initializes it, turns on refresh and points RCR0 to a block from 0-2 Mb.

Inputs:

HSM_xx . . . Host state machine initialization tables.

FS . . . Must point to a 4 Gb data selector based @0. bp contains the return address. NOTE: It doesn't matter what type of SIMM we have identified. The presence test assumes that it's a 256 kbit chip and initializes the RCR accordingly. If it's actually a 1 Mbit or a 4 Mbit SIMM it should still behave ok if it's programmed as a 256 kbit. Since all we need is 128 kb of RAM for copying the UVPROM, who cares what size the SIMM really is?

Outputs:

SUCCESS . . . If successful, returns the following
All SIMMs identified as present or not and tabulated in CMSMTPL below. CMSMTPL . . . CMOS byte containing the SIMM map.
RCROM points to 2 Mb of DRAM. SIMMs for this RAS programmed as 256 kbit devices.
Refresh enabled.

FAILURE . . . If no RAM can be found, issues 'fRAM' to SmartVu and waits forever.

$INIT_VL106

Procedure $init_vl106 initializes the vl106. The VL106 is a chip which, among other functions, replaces the 8742 keyboard handler.)

PMODE

This procedure is a Protected mode entry routine.
Inputs:
DS . . . points to the segment containing "gdt_ptr" and NULL_IDT.

RMODE

This routine is created for the floppy code to run in real mode.
Inputs: none. Outputs: real mode.

PMODE2

This routine is created for the floppy code. This will switch the execution back to protected after the floppy code is executed. [Uses different IDT and GDT tables ub low RAM.]
Inputs: none. Outputs: protected mode.

CMOSSUM

This routine checksums the CMOS range 10 h thru 2 Dh.
Inputs:
DI . . . contains NEAR return offset.

Outputs: none.

FLASH_MSG

Procedure flash_msg displays the SMARTVU message in EAX, waits CX seconds and returns to the NEAR address in DI.
Inputs:
  SS . . . Writable segment pointing to code.
  DI . . . Contains the NEAR return address.
  CX . . . The number of seconds to delay after displaying the SMARTVU message.
  EAX . . . Contains the SmartVu message.

DELAY

Procedure delay waits for CX seconds. This procedure uses the RTC to implement a delay specified by the count in seconds in CX. If the RTC battery is bad, we just execute a fixed delay loop of DUMMY_DELAY iterations.
Inputs:
  cx . . . Countains the number of seconds to delay.

GET_SEC

This routine reads the seconds count from the RTC (real-time clock), and waits if a time update is in progress.
Inputs:
  SI . . . Contains the NEAR return address.
Outputs:
  AL . . . Contains the RTC seconds count.

BEEP

This routine beeps!
Inputs:
  cx=frequency.
  di=near return address.
Outputs:
  none.

INIT_TIMER

This routine tests and initializes the timers.

SETUPDMA

Procedure setupDMA will set up the DMA controllers just like the regular POST. The code are identical so as not to introduce any problem with the INT13H routine.
Inputs:
  Native mode, protected mode.
Outputs:
  If error, let regular POST reports the error.
  If no error, DMA controllers are now ready for the INT13H routine.

SETUPPIC

Procedure setupPIC will set up the PICs just like the regular POST. The code is identical to that used in the POST, so as not to introduce any problem with the INT13H routine.
Inputs:
  Native mode, protected mode.
Outputs:
  The PICs are now ready for the INT13H routine.

COPY

Procedure copy copies the new BIOS from the floppy to RAM. The steps are as follow:

Find out if file exists. The file has to be on a 1.2M floppy in the root directory with a filename of "DELLBIOS.BIN".
Inputs:
  none.
Outputs:
  Carry flag set if error.

```
;----------------------------------------- public  copy
copy    proc    near mov eax,'ROOT'
        mov dx,SMARTVU
        out dx,eax call    fileExist       ;Find out if file exists?
        jnc short gotRoot       ;Jump if file exists.

mov dx,fdcDOR           ;Access fdcDOR.
        mov al,0Ch              ;Turn off motor, disabled interrupts
                                ; and DMA.
        out dx,al mov eax,'xROM'
        jmp do_reboot gotRoot:
        push    eax
        push    dx
        mov eax,'COPY'
        mov dx,SMARTVU
        out dx, eax
        pop dx
        pop eax call    copyFile        ;Go and try to copy file.
                                ; Return with carry set if error.
        mov dx,fdcDOR           ;Access fdcDOR.
        mov al,0Ch              ;Turn off motor, disabled interrupts
                                ; and DMA.
        out dx,al
        jnc short exitt         ;Exit if no error from copyFile?

mov eax,'xCPY'
        jmp do_reboot exitt:
        ret copy    endp
```

FILEEXIST

Procedure fileExist reads in the root directory, and searches to see whether file "DELLBIOS.BIN" is in the directory.
Inputs:
  None.
Outputs:
  Carry clear if file exists.
  ax has the first disk cluster if file exists.
  bx:dx has file size.

SETTYPE

Procedure setTypedetermines the type of floppy drive and sets the drive parameters accordingly.
Inputs:
  none.
Outputs:
  Parameters are initialized.

COPYFILE

Procedure copyFile copies the desired file from drive 0 to RAM.
The steps are as follow:
Make sure the file size is what we expected.
Read the FAT table.
Copy the file to DRAM.
Inputs:
  ax has the first disk cluster of the file.
  bx:dx has file size.
  es=GDTD_BUFFER.
Outputs:
  Carry flag set if error.

SANITYCHECK

Procedure sanityCheck will try to verify that the BIOS copied is a legitimate Dell BIOS.
Inputs:
  BIOS (112K) spans from 5000:0000 thru 6000:C000.
Outputs:
  Carry set if we do not have a legi BIOS.

```
;--------------------------------------------------
   pubic sanityCheck sanityCheck proc near push    ds
   push    eax
   push    ebx
   push    ecx
   push    esi ;Check the Dell signature.
   cmp dword ptr ds:[05E076h],'lleD'
   jne illegitimate ;Do not byte checksum the BIOS since we have dword XOR.
if 0
;Checksum the system and video BIOS.
   xor ecx,ecx
   mov cl,byte ptr ds:[060002h] ;Video ROM size in 512-byte blocks.
   shl ecx,9        ;Convert to bytes.
   add ecx,64*1024  ;Add the size of the system ROM.
   mov ah,0         ;Initialize checksum.
   mov esi,050000h  ;Initialize pointer.
   cld              ;Set to increment.
saniLoop:
   ADSIZE
   lodsb            ;al has value.
   add ah,al        ;Add value to ah.
   ADSIZE
   loop    saniLoop or ah,ah         ;BIOS checksum good?
   jnz short illegitimate   ;Jump if bad checkum.
endif   ;0

;Check the XOR of the 96K BIOS.
   mov ebx,dword ptr ds:[05E842h];Get the system BIOS version.
   mov cx,50h/4     ;Do 20 dwords.
   mov esi,050000h
saniLoop1:
   ADSIZE
   lodsd
   xor ebx,eax
   loop    saniLoop1 mov cx,(96*1024/4)-22    ;Do 24K dwords - 22 dwords.
   mov esi,050058h
saniLoop2:
   ADSIZE
   lodsd
   xor ebx,eax
   loop    saniLoop2 cmp ebx,dword ptr ds:[050050h]
   jne short illegitimate   ;Jump if bad XOR.

saniExit:
   pop esi
   pop ecx
   pop ebx
   pop eax
   pop ds ret illegitimate:
   stc
   jmp short saniExit sanityCheck endp
```

NEXT

Procedure next gets the next link from a 12-bit FAT.
Input
  ax=current entry number.
Output:
  ax=next element in the chain.

REL2ABS

Procedure rel2abs converts the relative sector number to the absolute sector location.
Input
  ax=relative sector number.
Output:
  ch=track number.
  cl=sector number.
  dh=head number.
  dl=0=drive number.

GETFAT

Procedure getFat reads in the FAT table.
Inputs:
  es=GDTD_BUFFER.
Outputs:
  Carry set if error.
  If successful, FAT resides from 4000:0000 thru 4000:0E00.

PROGRAM

Procedure program writes data into the flash ROM.
Inputs:
  none.
Outputs:
  Carry set if error.

```
;--------------------------------------------------
   public program program proc    near push    ds
   push    es mov ax,GDTD_4G       ;Flat address.
   mov ds,ax
   mov es,ax ;  call    enable_fProgram  ;Enable flash programming.
;call   setNCA           ;Set up one NCA descriptor.

;Do the 112k BIOS and video sector.
   mov esi,50000h       ;Offset of buffer.
   mov edi,0FFFE0000h   ;Start of sector
   mov ecx,1C000h       ;112k.
```

-continued
```
        push    eax
        mov     eax,'ERAZ'
        mov     dx,SMARTVU
        out     dx,eax
        pop     eax call    erase_sector
        jc      short bad_flash push    eax
        mov     eax,'PROG'
        mov     dx,SMARTVU
        out     dx,eax
        pop     eax call    program_sector
        jc      short bad_flash call    disable_fProgram    ;Disable flash programming.
        clc flash_done:
        pop     es
        pop     ds ret bad_flash:
```

-continued
```
        call    disable_fProgram    ;Disable flash programming.
        stc
        jmp     short flash_done program endp
```

ERASE_SECTOR

Procedure erase_sectorperforms the following steps:
  Clear the status register.
  Set the FLASH to read status mode.
  Set the FLASH for erase.
  Do the erase.
  Verify the erase is successful by reading the status register.
  Set the carry flag if erase unsuccessful.
  Clear the status register.
  Set the FLASH to read array mode.
Inputs:
  es:edi=address of sector to be erased.
  FLASH program/erase better be enabled before calling this routine.
Outputs:
  If successful, carry flag cleared.

```
;
;WARNING!!!--The FLASH program jumper must be set for program/erase.
;
;------------------------------------------------- public  erase_sector erase_sector proc near push    esi         ;Save esi.
        push    edi         ;Save edi.
        push    ecx         ;Save cx.
        push    ax          ;Save ax.
        push    dx          ;Save dx.

call    clr_Flash_status push    ecx
        mov     cx,300
        call    usecWait
        pop     ecx mov     byte ptr es:[edi],flash_erase_setup ;Get ready to erase.

push    ecx
        mov     cx,300
        call    usecWait
        pop     ecx mov     byte ptr es:[edi],flash_erase_go ;Do the erase.

push    ecx
        mov     cx,300
        call    usecWait
        pop     ecx mov     ecx,0       ;Software timeout.
erase_sector_wait:
        call    read_Flash_status   ;Put status in al.
        test    al,flash_status_wsm_busy;Erase finish yet?
;       jz      erase_sector_wait
        loopz   erase_sector_wait   ;Jump if not done.

jz      short erase_sector_err ;Jump if times out.

test    al,flash_status_erase_fail+flash_status_vpp_low;Erase fail?
        jnz     short erase_sector_err ;Jump if erase fail.

clear_erase_sector_status:
        call    clr—Flesh_status
        mov     byte ptr es:[edi],flash_read;Set the FLASH to read array mode.
```

-continued
```
        clc erase_sector_done:
        pop     dx              ;Restore dx.
        pop     ax              ;Restore ax.
        pop     ecx             ;Restore cx.
        pop     edi             ;Restore edi.
        pop     esi             ;Restore esi.

ret erase_sector_err:
        call    clr_Flash_status
        mov     byte ptr es:[edi],flash_read;Set the FLASH to read array mode.

stc
        jmp short erase_sector_done erase_sector endp
```

PROGRAM_SECTOR

Procedure program_sector writes a sector of the flash ROM.
Inputs:
  ecx=number of bytes to program.
  ds:esi points to beginning of data.
  es:edi points to beginning of sector.
The steps are as follow:
Clear the status register.
Set the FLASH to read status mode.
Go and program the sector.
Abort if error with the carry flag set.
Clear the status register.
Set the FLASH to read array mode.
Outputs:
  If successful, carry flag cleared.

```
;
;WARNING!!! -- The FLASH program jumper must be
set for program/erase.
;
;----------------------------------------
        public program_sector
program_sector proc near
        push    eax             ;Save ax.
        push    ecx             ;Save cx.
        push    esi             ;Save esi.
        push    edi             ;Save edi.
        call    clr_Flash_status
        cld
from_esi:
;ecx = byte counts.
        mov     byte ptr es:[edi],flash_program_setup;Get ready to program.
        mov     al,byte ptr ds:[esi]
        mov     byte ptr es:[edi],al
        push    ecx
        mov     cx,5
        call    usecWait
        pop     ecx
        inc     esi
        inc     edi
        ADSIZE
        loop    from_esi
        mov     ecx,0           ;Software timeout.
program_new_wait:
        call    read_flash_status       ;Put status in al.
        test    al,flash_status_wsm_busy;Program finish yet?
;       jz short program_new_wait
        Loopz   program_new_wait        ;Jump if not done.
        jz short program_sector_err ;   JUMP if times out.
        test    al,flash_status_prog_fail+flash_status_vpp_low;-
                Program fail?
        jnz short program_sector_err ;Jump if program fail.
program_sector_ok:
```

-continued
```
        call    clr_Flash_status
        mov     byte ptr es:[edi],flash_read;Set the FLASH to read
                array mode.
        clc
program_sector_done:
        pop     edi             ;Restore edi.
        pop     esi             ;Restore esi.
        pop     ecx             ;Restore cx.
        pop     eax             ;Restore ax.
        ret
program_sector_err:
        call    clr_Flash_status
        mov     byte ptr es:[edi],flash_read;Set the FIASH to read
                array mode.
        stc
        jmp short program_sector_done
program_sector endp
```

ENABLE_fPROGRAM

Procedure enable_fProgram enables program/erase operations on the FLASH ROM.
Inputs: none. Outputs:
  FLASH is ready to be programmed or erased.

```
;----------------------------------------
enable_fprogram proc near
        push    ax              ;Save ax.
        push    dx              ;Save dx.
        mov     dx,slob_portXX  ;Access portXX.
        in      al,dx           ;Read in current value.
        waforio
        or      al,slob_portXX_flhPrg   ;Enable FLASH program/erase.
        out     dx,al           ;Write out the new value.
        pop     dx              ;Restore dx.
        pop     ax              ;Restore ax.
        ret
enable_fProgram endp
```

DISABLE_fPROGRAM

Procedure disable_fProgram disables FLASH program/erase.
Inputs: none. Outputs: FLASH cannot be programmed or erased.

```
;----------------------------------------
disable_fProgram proc near
        push    ax              ;Save ax.
        push    dx              ;Save dx.
        mov     dx,slob_portXX          ;Access portXX.
```

```
    in al,dx        ;Read in current value.
    waforio
    and al,not slob_portXX_flhPrg;Disable FLASH program/erase.
    out dx,al       ;Write out the new value.
    pop dx          ;Restore dx.
    pop ax          ;Restore ax.
    ret
disable_fProgran endp
```

USECWAIT

Procedure usecWait creates cx microseconds of delay.
Inputs:
  cx=number of usec.
Outputs:
  cx destroyed.

CLR_FLASH_STATUS

Procedure clr_Flash_status clears the FLASH status register. This routine was created because the new spec requires the address to be at 00000h of the Flash.
Inputs: none. Outputs: Flash status register cleared.

```
;--------------------------------------------
clr_Flash_status proc near
;NOTE: Do not need to save the entry mode.
It will always be native mode.
    push    ax
    push    ds
    push    ecx
    mov     ax,GDTD_4G    ;4Gb descriptor.
    mov     ds,ax
    mov     byte ptr ds:[0FFFFE000h],flash_clear_status
    mov     cx,15
    call    usecwait
    pop     ecx
    pop     ds
    pop     ax
    ret
clr_Flash_status endp
```

READ_FLASH_STATUS

Procedure read_Flash_statusreads the FLASH status register at 00000 h of the Flash.
Inputs: none. Outputs: Flash status register read in al.

```
;--------------------------------------------
read_Flash_status proc near
;NOTE: Do not need to save the entry mode.
It will always be native mode.
    push    ecx
    push    ds
    mov     ax,GDTD_4G    ;4Gb descriptor.
    mov     ds,ax
;   FLUSH_CACHE
    mov     byte ptr ds:[0FFFE0000h],flash_status
    mov     cx,15
    call    usecWait
    mov     al,byte ptr ds:[0FFFE0000h]
    mv      cx,15
    call    usecWait
    pop     ds
    pop     ecx
    ret
read_Flash_status endp
```

NMI_ISR

Procedure NMI_ISR is a dummy interrupt handler, which swallows any NMMI interrupt.

DMATST

This routine tests the DMA address and word count registers.
Input
  CX=#ff of ports to test
  DX=first port to test
  SI=increment between ports
Output: flags ?
  AL=?
  AH=?
  CX=0

CALB_SPD

Procedure CALB_SPD ("calibrate speed") sets DLLY_CNT with count for 100 us

FDISR

Procedure fdISR is the floppy drive controller interrupt handler. The steps are as follow:
  Send EOI to master PIC.
  Set interrupt bit in DRVSTAT to indicate an interrupt has occurred.

INT13H

Procedure int13h determines and executes the desired int13h procedure functions.

RESETFLOP

Procedure resetFlopresets the floppy system. This is part of the INT13H procedure.
Inputs:
  ah=0
  dl=drive number (0–3), bit7=0 for floppy.
Outputs:
  Carry flag set if error.
  ah=status/error code.
  ds:ERRSTAT(FDATA)=ah.

READSECTOR

Procedure readSectorreads al sectors from the floppy.
Inputs:
  ah=02h.
  al=number of sectors.
  ch=track number.
  cl=sector number.
  dh=head number.
  dl=drive number.
  es:bx=address of buffer.
Outputs:
  Carry flag set if error.
  al=number of sectors transferred, ah=status=ERRSTAT.

SETCARRY

Procedure setCarrysets the carry flag on the stack. This is part of the INT13H procedure.

CLRCARRY

Procedure clrCarry clears the carry flag on the stack. This is part of the INT13H procedure.
Inputs: none.
Outputs:
  Carry flag in the flag register on the stack is cleared.
  Interrupt flag also set.

DSKRESET

Procedure dskReset resets the floppy system. This is part of the INT13H procedure.
The steps are as follow:
Disable interrupts.
Clear DRVSTAT and ERRSTAT.
Get floppy motor status.
Issue reset command.
Turn off reset command.
Enable interrupts and wait for reset result interrupt.
Check result.
Inputs:
  dl=drive number (0-3), bit7=0 for floppy.
Outputs:
  Carry flag set if error.
  ds:ERRSTAT(FDATA)=ah=error code if error, else 0.

WAITINT

Procedure waitInt waits for a FDC interrupt. This is part of the INT13H procedure. This routine uses a regular wait instead of int15h.
Inputs: none.
Outputs:
  Carry flag set if timeout error, else not.
  ERRSTAT bit7=1 if timeout.

FDCRDY

Procedure fdcRdy waits for the floppy controller to be ready. This is part of the INT13H procedure.
Inputs: none.
Outputs:
  Carry flag set if timeout.

SISSTAT

Procedure sisStat senses the interrupt status. This is part of the INT13H procedure.
Inputs: none.
Outputs:
  Carry flag set if error, ERRSTAT set, ah=FDC status, else Carry flag clear and al=present cylinder.

WRTCMD/WRTCMDA

Procedures wrtCmd and wrtCmdA write commands to the FDC, and are part of the INT13H procedure.
Inputs:
  al=command.
  ds points to FDATA.
Outputs:
  Carry flag and ERRSTAT set if error.
  ah, dx destroyed.

RSLTRD7/RSLTRD

Procedure rsltRd7 reads 7 result bytes from the FDC. Procedure rsltRd reads cx result bytes from the FDC. These are part of the INT13H procedure.
Inputs:
  cx=number of result bytes to read.
  ds points to FDATA.
Outputs:
  al=FDC status.
  ah=FDC ST0, only valid if no carry.
  ERRSTAT bit 7=1, carry set on timeout.
  ERRSTAT bit 5=1, carry set if FDC results cannot be flushed.
  Carry set if less results available than expected.
  DSKST=FDC ST0, only valid if no carry.

dx non-zero.

I82077EXIST

Procedure i82077exist determines if a i82077 FDC is installed.
This is part of the INT13H procedure.
Inputs: none
Outputs:
  Carry flag set if i82077 installed and the FIFO enabled.
  stk_tmp bit0=1 if i82077 installed and bit1=1 if FIFO enabled.

MLTCMD2/MLTCMD

Procedure mltCmd2 writes 2 commands to the FDC. Procedure mltCmd writes cx commands to the FDC. These are part of the INT13H procedure.
Inputs:
  cx=number of bytes to write (mltCmd).
  bx=starting table offset.
Outputs:
  es:si=disk parameter block.
  ERRSTAT bit7=1 on timeout, bit5=1 on controller error.
  Carry flag set on timeout or controller error, else not set.

DPBADR

Procedure dpbAdr puts the address of the disk parameter block into es:di. This is part of the INT13H procedure.
Inputs: none.
Outputs: es:si points to disk parameter block.

CONFIGURE

Procedure configure issues the configure command to enable the FIFO in the i82077 FDC. This is part of the INT13H procedure.
Inputs:
  ah=byte 2 of configure command.
Outputs:
  Carry flag set if FDC error, else cleared.

DSKMOT

Procedure dskMot turns the floppy drive motor on. This is part of the INT13H procedure.
Inputs:
  dl=drive number.
Outputs: none.

CHKCHG Procedure chkChg checks the change line on the floppy drive. This is part of the INT13H procedure.
Inputs: none.
Outputs: Carry flag set if error.

GETDRVINFO

Procedure getDrvInfo gets drive information from HDCFLG. This is part of the INT13H procedure.
Inputs: none.
Outputs:
  Low 3 bits of al=drive information.

CLRCHG

Procedure clrChg tests and clear the change line. This is part of the INT13H procedure.
Inputs:
  dl=drive number.

Outputs:
Carry flag set if timeout.
ERRSTAT=timeout or change line error.

DOSEEK/DOSEEK2

Procedures doSeek and doSeek2 will seek to track specified by ch. This is part of the INT13H procedure.
Inputs:
ch=track to seek.
Outputs:
Carry flag and ERRSTAT set if error.

DRIHEDSEL

Procedure driHedSel loads the head (HDS) and the drive (DS1, DS0) parameters to the FDC. This is part of the INT13H procedure.
Inputs: none.
Outputs: none.

INITDMA

Procedure initDMA will initialize the DMA controller for floppy operations. This is part of the INT13H procedure.
Inputs: none.
Outputs:
Carry flag and ERRSTAT set if error.

HEADSETTLE

Procedure headSettle conditionally waits for the head to settle. This is part of the INT13H procedure.
Inputs:
dx non-zero if head settle wait needed.
Outputs:
es:si points to DPB.

SPINUP

Procedure spinup conditionally waits for the floppy to spinup. This is part of the INT13H procedure.

CHKTYP

Procedure chkTyp checks the media type. This routine is called prior to read/write operation to verify and update, if necessary, FDMED. Returns with the carry flag set if no remaining valid FDMEDs to try. This is part of the INT13H procedure.
Inputs:
FDMED, ERRSTAT (if non-zero, it is a retry).
bx=drive.
Outputs:
FDMED updated:
ERRSTAT=carry flag=0 if any more valid rate/-step combos.
FDMED restored:
FDOPER=0.
ERRSTAT and carry flag set if no more valid rate/-step combos.;

FDTYPIF

Procedure fdTypIf gets floppy disk type from CMOS if CMOS is valid. This is part of the INT13H procedure.
Inputs: none
Outputs:
Carry flag set if CMOS invalid, else
al=drive type, zero flag set if no drive or type unknown,
top of ah non-zero if another drive.

FDTYPE

Procedure fdType gets floppy disk type from CMOS. This is part of the FDTYPIF routine, and part of the INT13H procedure.
Inputs: none.
Outputs:
al=drive type, zero flag set if no drive or type unknown,
top of ah non-zero if another drive.

SETRATE

Procedure setRate sets the transfer rate. This is part of the INT13H procedure.
Inputs:
bx=drive number.
Outputs:
Rate control port updated.

CHKRES

Procedure chkRes reads and checks the results from the FDC. This is part of the INT13H procedure.
Inputs: none.
Outputs:
Carry flag set if error.
al=number of sectors transferred.

AFTERTRY

Procedure afterTrysets the zero flag if there is still more retry after an unsuccessful operation. This is part of the INT13H procedure.
Inputs: none.
Outputs:
Zero flag set if there is still more retry.

RESTYP

Procedure resTyp forces FDMED[bx] media known and restores compatible low bits. This is part of the INT13H procedure.
Inputs:
ah=top three bits of FDMED[bx].
Outputs:
FDMED[bx] bit4=1.

STODRVINFO

Procedure stoDrvInfo puts the drive information in al into HDCFLG. This is part of the INT13H procedure.
Inputs:
al=drive information.
bx=drive number.
Outputs:
Drive information in [bx] half of HDCFLG.

INITFD

Procedure initFD will initialize the floppy subsystem and all the variables used by the INT13H routine. This is part of the INT13H routine.
Inputs: none.
Outputs:
DRVSTAT, FMOTS, FDTIMO, ERRSTAT, DSKST, HDCFLG, FDMED, FDOPER, WTACTF, FDRATE, are all initialized.

DSKTEST

Procedure dskTest will test and determine drive type.
Inputs:
ss:bp points to stack frame for disk driver.

stk_dl[bp]=drive number.
Outputs:
FDMED[drive#], HDCFLG initialized.
Carry flag set if no drive.

SDRVST

Procedure sDrvSt senses the drive status.
Inputs: none.
Outputs:
Carry flag set, ERRSTAT set if error.
Carry flag clear, ah=FDC's ST0 if no error.
Zero flag set if track 0 reached.

CKFDCFG

Procedure ckFdCfg checks the floppy configuration data against the actual installed hardware.
Inputs:
byte ptr stk_dl[bp]=drive number.
si points to the media type for that drive number.
Outputs:
Carry set if different configuration.

CMREAD

Procedure CMREAD is a Subroutine to Read a CMOS register.
Input
AL=CMOS register address to read
Output:
AL=CMOS register value
Interrupt Flag cleared
Carry Flag cleared
Zero Flag cleared.

CMWRT

This is a Subroutine to Write a CMOS register.
Input
AH=CMOS register address to write, Bit 7=0 enables NMI
AL=Value to write to CMOS register
Output:
Interrupt Flag cleared
Carry Flag cleared
Zero Flag cleared.

DLY100

This procedure will delay for 100 us. The loop count for the delay function is taken from DLY_CNT. DLY_CNT is set during ATPOST, and whenever turbo speed is changed by the routine CALB_SPD. It takes no inputs and gives no outputs.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

In particular, the disclosed innovations are not by any means limited to DOS systems, nor to systems using 80×86 microprocessors, nor to systems using a single microprocessor as the CPU. The disclosed innovations provide generally applicable architectural techniques, which can be applied to a wide variety of computer systems, including high-performance systems and multiprocessing systems.

It should also be noted that the source for the user-supplied BIOS code does not have to be a floppy drive. For example, a tape cartridge or a dial-in telephone interface could be used instead.

In addition, although the Flash EPROM is the preferred device technology for the second nonvolatile boot memory, it should be recognized that other nonvolatile storage technologies can be used if they become practical. Thus, many of the innovative features of the presently preferred embodiment can be directly adapted to a system using EEPROMs, battery-backed SRAM chips, ferroelectric RAMs, or future technologies.

It should also be noted that BOTH of the boot memories can be rewriteable nonvolatile memories if desired. Even though this arrangement provides slightly less robustness than the preferred embodiment, it still provides a large added margin of safety over the use of a single rewriteable nonvolatile boot memory.

As will be recognized by those skilled in the art, the innovative concepts described in the present application can be modified and varied over a tremendous range of applications, and accordingly the scope of patented subject matter is not limited by any of the specific exemplary teachings given.

APPENDICES

Additional details of the presently preferred embodiment are set forth below, to ensure the fullest possible compliance with the best mode requirements of US patent law.

Appendix A is a Product Specification for the computer system of the presently preferred embodiment. This computer system is internally referred to as "Hammerhead." short summary of the most recent changes to Appendix B is a specification for the "SLOB" chip referred to in the foregoing specification. This chip performs a variety of control functions.

Appendix C is a specification for the "TRANE" memory controller chip referred to in the foregoing specification.

Although these detailed specifications are the most current available as of the filing date of the present application, it must be noted that these are actual engineering documents prepared for internal use, and may contain errors or omissions. Thus, users are warned that the these examples are not definitive and not necessarily complete, and should be used only with caution.

APPENDIX A

Table Of Contents

| Topic | Page |
|---|---|
| 1. REVISION HISTORY | 4 |
| 2 MAJOR INCOMPLETE TOPICS | 4 |
| 3 SCOPE | 4 |
|    3.1 PURPOSE | 4 |
|    3.2 GENERAL PRODUCT PHILOSOPHY | 5 |
|    3.3 DOCUMENT STRUCTURE | 5 |
| 4 APPLICABLE DOCUMENTS | 7 |
|    4.1 SPECIFICATION HIERARCHY | 7 |
|    4.2 ORDER OF PRECEDENCE | 7 |
|    4.3 ISSUES OF DOCUMENTS | 7 |
|    4.4 INTERNAL DOCUMENTS | 7 |
|    4.5 EXTERNAL DOCUMENTS | 8 |
| 5 OVERVIEW | 8 |
|    5.1 SYSTEM FEATURE OVERVIEW | 8 |
|    5.2 SYSTEM 433E AND HAMMERHEAD FEATURE DELTA | 10 |
|    5.3 PRODUCT NAME | 11 |
| 6 ELECTRICAL SPECIFICATION | 11 |
|    6.1 POWER SUPPLY | 11 |
|    6.2 SYSTEM CLOCKS | 11 |
|    6.3 PROCESSOR SUBSYSTEM | 12 |
|    6.4 MEMORY SUBSYSTEM | 15 |
|    6.5 I/O SUBSYSTEM | 17 |
| 7 SOFTWARE SPECIFICATION | 23 |
|    7.1 GENERAL | 23 |
|    7.2 KEYBOARD PASSWORD PROTECTION | 23 |
|    7.3 SETUP UTILITY | 23 |
|    7.4 SPEED SWITCHING | 23 |
|    7.5 DIAGNOSTICS | 23 |
|    7.6 EISA CONFIGURATION UTILITY | 23 |
|    7.7 SOFTWARE DRIVERS | 24 |
| 8 MECHANICAL SPECIFICATION | 25 |
|    8.1 PHYSICAL DIMENSIONS | 25 |
|    8.2 CHASSIS LOCK | 25 |
|    8.3 EXTERNALLY ACCESSIBLE DRIVE BAY | 25 |
|    8.4 INTERNALLY ACCESSIBLE DRIVE LOCATIONS | 25 |
|    8.5 I/O INTERFACES | 25 |
| 9 COMPATIBILITY SPECIFICATION | 26 |
|    9.1 GENERAL | 26 |
|    9.2 OPERATING SYSTEMS | 26 |
|    9.3 STORAGE DEVICES | 28 |
|    9.4 ADDITIONAL SYSTEM OPTIONS | 29 |
|    9.5 VERIFICATION TESTING SPECIFICATION | 31 |
| 10 PERFORMANCE | 31 |
| 11 DOCUMENTATION SPECIFICATION | 32 |
|    11.1 DOCUMENTATION SET | 32 |
|    11.2 DIAGNOSTICS DISPLAY SUPPORT | 33 |
| 12 SERVICEABILITY | 34 |
|    12.1 CHASSIS DISASSEMBLY | 34 |
|    12.2 LOCATION OF USER SERVICEABLE COMPONENTS | 35 |
|    12.3 HARDWARE SWITCH LOCATIONS | 35 |

| | | | |
|---|---|---|---|
| 13 | ENVIRONMENTAL SPECIFICATION | | 36 |
| | 13.1 | GENERAL ENVIRONMENT | 36 |
| | 13.2 | PRODUCT SPECIFIC ENVIRONMENT | 36 |
| 14 | DOMESTIC REGULATORY SPECIFICATION | | 36 |
| | 14.1 | FCC CLASS B | 36 |
| | 14.2 | UL | 36 |
| 15 | INTERNATIONAL SPECIFICATION | | 36 |
| APPENDIX A | | | 37 |

1. REVISION HISTORY

| DATE | VERSION | DISTRIBUTION | CONTENTS |
   |------|---------|--------------|----------|
   | 8/30/90 | 0.1 | Project Team | First Draft (Review). |
   | 10/19/90 | 0.2 | Marketing | Revised First Draft, including recommendations from kick-off meeting. Pinouts and jumpers detailed. |
   | 10/23/90 | 0.3 | Adv. Sys | More refinements, tables. |
   | 10/23/90 | 0.4 | Team | Still more refinements and corrections. |
   | 1/17/91 | 1.0 | Team | Final copy |

2 MAJOR INCOMPLETE TOPICS

O  A new section specifying Diagnostics for Hammerhead needs to be added at Section 7.5.;

O  In Section 7.7, the exact software drivers to be included needs to be determined.

O  Benchmarks for performance need to be determined for all Hammerhead variants.

O  In Section 11.2, the proper Unix code needs to be supplied for the SmartVu functions.

O  The features of the Slob chip need to be listed.

O  All the deviations from the Standard Setup Specification need to be listed in Section 7.3.

3 SCOPE

3.1 PURPOSE

This document defines the specific functional design specification for an EISA compatible 486 System with various plug-in processor cards running at 20, 33, 50 or 60 MHz, housed in a desktop chassis.

3.2 GENERAL PRODUCT PHILOSOPHY

HAMMERHEAD (referred to in this document as "the System") is a desktop system intended as the upper-end of the Advanced Systems (EISA) product line, and is intended as the replacement system for the 425E and 433E. The core of the System is a plug-in processor card containing the Intel 80486 processor operating at 20, 33, 50 or 60Mhz, implemented into EISA technology.

> Hammerhead is a product which is intended for careful development, test, and qualification cycles. Time to market, while extremely important, is secondary to building a viable, long-term replacement for Systems 425E and 433E. The HAMMERHEAD series is intended to set new standards in performance, quality and reliability, > The chassis has high commonalty with the existing desktop chassis currently being used for the 333D and 325D (Panther).

3.3 DOCUMENT STRUCTURE

> This specification document describes the "important" customer visible features of the HAMMERHEAD system. Important is defined as the features that should be implemented as described and verified as a shipment criteria. Specific implementation, but not necessarily customer-visible characteristics are described in other referenced specifications (e.g. Design Specification).

> This specification is divided into the following major sub-sections:

> Overview This section is not part of the formal specifications. However, it contains key pervasive guiding philosophies as well as the general target market overview.

> Electrical Specification This section describes topics such as system architecture, system memory, storage devices etc. which are required customer visible criteria.

> Software Specification This section describes the software required to support the System, including BIOS, Setup, and Software Support.

> Mechanical Specification This section describes topics such as system size, weight, interconnections, etc. which are required customer visible criteria.

> Compatibility Specification This sections summarizes the major market compatibility requirements for the System.

> Performance This section summarizes major end-user oriented performance characteristics. Several industry standard benchmark performance guidelines are provided.

> Documentation Specification This section summarizes the user documentation to support the System.

> Serviceability This section summarizes key serviceability requirements including topics such as diagnostic strategy, smallest field replaceable unit (SRU) definition, fault isolation criteria, etc.

> Environmental Specification This section summarizes the operating environmental characteristics of the System such as temperature ranges, etc.

> Domestic Regulatory Specification This section summarizes the intended Regulatory requirements of the System such as FCC and UL standards, etc.

International Support The above sections describe the product as specified for marketing in the United States. This section summarizes the changes and additions required for marketing by the international Ibus.

4  APPLICABLE DOCUMENTS

All documents referred to by this Specification are considered a part of this Specification, and apply in full, except where noted otherwise. Any divergence from such referenced documents is called out in detail in these Specifications.

4.1  SPECIFICATION HIERARCHY

This document is the highest level in a hierarchy of specifications, as follows:

| 1. | Product Specification |
| 2. | Design Specification |
| 3. | Environmental Specifications |
| 4. | Compatibility Specifications |
| 5. | Testability Specifications |
| 6. | Manufacturability Specifications |
| 7. | Other Applicable Specifications |

Table 1: Document Hierarchy

The Hammerhead product must meet or exceed all requirements of these specifications.

4.2  ORDER OF PRECEDENCE

In the event of conflict between the specifications set forth in this document and the documents cited herein, the requirements of this document will prevail. The order of precedence is:

1. This document

2. Referenced internal documents

3. Referenced external documents 4.3  ISSUES OF DOCUMENTS

The issues of documents in effect at the time of this document release shall constitute the requirements herein.

4.4  INTERNAL DOCUMENTS

The following documents are produced for internal use by Dell Computer Corporation; archive copies of the current release are available from Document Control. Only the latest revision to these documents apply here, except where specifically noted otherwise in this text.

- Dell Standard Environmental Specifications

- Dell Standard International Specifications

- Dell Mid-size Desktop Chassis Specification

- Dell PWB Fabrication Specification, Dwg. No. 10207

- Dell 220W Power Supply Specification, Dwg. No. 42187

- Dell Standard Setup Utility Specification, Part No. 13521
- Dell OS/2 Specifications Draft Version 1.2
- Dell Unix V5.32 & V5.4 Specifications
- Dell Standard Systems Standardization Memos

4.5 EXTERNAL DOCUMENTS

Only the latest obtainable revision to the following documents apply here, except where specifically noted otherwise in this text.

- IBM AT Technical Reference Manual
- BCPR Eisa bus Architecture Specification, Version ???
- EIA-232-D (RS-232) Serial Communications Specification

5 OVERVIEW

5.1 SYSTEM FEATURE OVERVIEW

The following is an overview of the major system features:

- Mid-size Desktop Chassis
- Various upgradeable plug-in processor cards containing i486 microprocessors:
    - 33 Mhz with 128 KB High-Speed SRAM cache
    - 33 Mhz without cache
    - P23 20Mhz without cache
    - 50 and 60Mhz with 128 KB High-Speed SRAM cache
- Dell-designed ASIC to control memory functions (codename TRANE)
- Dell-designed ASIC to control I/O interface (codename SLOB)
- 4 MB minimum, 80 MB maximum RAM on the planar.
- SmartVu™ Diagnostics Display
- External Reset
- VGA on system board (with feature connector support), including 1024 x 768 x 16 bit resolution
- Weitek 4167 Coprocessor Support at 33 Mhz.
- Simulated Processor Speed mode of 8Mhz

- ✓ Thirty-two bit EISA Card Support (6 slots total, one being half-card)
- ✓ EISA Bus Speed consistent with specified standard
- ✓ AT-compatible nine-Pin Serial Port (qty 2)
- ✓ Twenty-five-pin AT-compatible parallel port
- ✓ PS/2-compatible Synchronous Mouse Port
- ✓ PS/2-compatible Keyboard Interface
- ✓ IDE host adaptor (2 drive support)
- ✓ Floppy controller (2 drive support)
- ✓ Internal 40 MB tape drive support
- ✓ Three half-height, 5.25" drive bays with external access
- ✓ Two 3.5" form factor drive bays, internal access only
- ✓ 220W Power Supply (115V/230V)

5.2  SYSTEM 333D, 433E AND 433DE+ (HAMMERHEAD) FEATURE DELTA

Listed below is an overview of the major functional differences between the Systems 333D (Panther), 433E (SHARK) and 433DE (HAMMERHEAD) system:

| FUNCTION | 333D | 433E | 433DE+ |
|---|---|---|---|
| Microprocessor | 80386DX | i486 | i486 |
| Processor Speed | 33/8MHz | 33/8Mhz | 33/8MHz |
| Memory Support | 16 MB | 16 MB | 48 MB |
| SRAM Cache | 64 KB ext. | 8 KB int. | 8 KB int. |
| | | | 128 KB ext. |
| Number of SIMMs | 4 (x36) | 8 (x36) | 6 (x36) |
| Maximum SIMM Size | 4 MB | 8 MB | 16 MB |
| Hdwr. LIM 4.0 Support | Yes | No | No |
| Hard-disk Controller | Integrated (IDE) | Add In | Integrated (IDE) |
| Floppy Controller | Integrated | Add In | Integrated |
| VGA Controller | Integrated | Add In | Integrated |
| VGA Feature Connector | Integrated | Add In | Integrated |
| Tape drive hookup | Diskette cable | Add In | Diskette cable |
| I/O Slots | 8 ISA | 6 EISA | 6 EISA[1] |
| | | 2 ISA | |
| Drive Bays | 3 Ext. 5.25 HH | 3 Ext. 5.25 HH | 3 Ext. 5.25 HH |
| | 2 Int. 3.5" | 2 Int. 3.5" | 2 Int 3.5" |
| | form factor | form factor | form factor |

*Table 2 (Continued): Feature Delta between Systems 333D, 433E and 433DE.*

[1] The sixth EISA slot is available for a half-size card only.

5.3  PRODUCT NAME

The System is marketed under the name of "DELL System 4XXDE" ("D" for desktop chassis, "E" for EISA bus), where the "XX" is replaced with the processor speed in MHz for that particular processor card which is shipped with that particular system. For example, a 33 MHz processor card in a Hammerhead system will be named "DELL System 433DE".

This name is used in all customer visible documents including, but not limited to:

- Sales brochures/catalogs
- Technical Reference documents
- Technical bulletins
- Product announcements

6  ELECTRICAL SPECIFICATION

6.1  POWER SUPPLY

6.1.1  Output Power Requirements

The power supply is capable of supplying a continuous 220W of power. The maximum values for the supply currents at the various supply voltages are as follows:

| 5v | -5v | 12v | -12v |
|----|-----|-----|------|
| 27A | .3A | 7A | 0.3A |

The power supply is capable of switching (via a hardware switch on the power supply, accessible from the rear of the unit with the cover on) between 115V or 230V input AC voltage at a frequency of 50 or 60 Hertz.

A detachable power cable utilizing a 3-prong (IEC-320) type connector is provided.

6.1.2  Distribution Wiring and Connectors

Power Supply distribution wiring and connectors shall be as called out in the DELL 200W Power Supply Specification, Dwg. #42187.

6.1.3  AC POWER SWITCH

The AC power switch is a rocker switch, located on the front of the chassis assembly. The switch is turned "ON" with the right half of the rocker depressed.

6.1.4  POWER-ON INDICATOR

The System has a green power-on indicator located on the front of the chassis assembly directly above the power switch.

6.2  SYSTEM CLOCKS

6.2.1 EISA BUS CLOCK

The System EISA Bus clock is compatible with the best Engineering estimates of compliance with the EISA standard, utilizing in-house experience with design of EISA Systems and testing of common EISA expansion cards. Consideration has also been given to test results for other vendors' EISA systems.

There is no "speed switching" of the EISA bus clock operating frequency.

6.2.2 PROCESSOR CLOCK

The primary processor operating speed, depending upon the processor card, is 20, 33, 50 or 60MHz. In any configuration, the System is capable of switching to effective processor operating speed of approximately 8Mhz.

Reference the Dell Standard Setup Utility Specification for user interface.

6.2.3 COPROCESSOR CLOCK

The coprocessor, if present, runs at the same clock speed as the processor.

6.3 PROCESSOR SUBSYSTEM

6.3.1 PROCESSOR TYPE

The processor (CPU) is an Intel i486, rated to operate at clock frequencies outlined in the Processor Clock section of this Specification.

6.3.2 Planar

The Hammerhead Planar contains all memory and I/O components for the System. The planar uses a mixture of SMT and through-hole technology, with as much SMT as possible. This allows the PWB to have only six layers (refer to the Standard PWB Specification for details).
The planar has a form factor extremely similar to that of Panther, with the following notable changes:

- The inside corner of the PWB nearest the IDE header is cut with a radius rather than a right-angle to improve structural strength and manufacturability.

- The SmartVu header has been relocated slightly to allow the cable to hang more straight.

- The number of setup jumpers has been reduced (more of this functionality has been moved to the Setup Utility).

- Two more SIMM sockets have been added.

- The processor card connector has been added.

- The traditional socketed DIP BIOS IC has been replaced with a Flash EPROM (an auxiliary 28-pin socket and Flash EPROM bypassing circuitry is nonetheless provided).

❖ A non-volatile RAM socket is provided for use with the above auxiliary BIOS.

While the various processor cards all run at the clock speed(s) designated in their designs, the planar runs at 8, 25 or 33 MHz only. This is a design limitation consciously imposed because of the frequency-response limitations of the planar's integrated circuitry, as well as for EMI considerations. *For example, the 50 MHz processor card has a 50MHz clock and runs at that speed, but all signal exchange with the Planar, including memory reads/writes, is done at an effective 25 MHz.*

6.3.3 Processor Card

The processor is located on a removable card. There are several different processor cards, one for each of the maximum processor operating speeds. The card contains, in addition to the processor itself, the cache (if any), the math coprocessor socket (if any), and clock/oscillator, plus any circuitry specific to those devices. All other features, including the memory, memory controller, I/O, video, BIOS, etc. reside on the planar.

The card plugs into the planar via a 192-pin keyed connector, which utilizes gold-plated pins arranged in a 4 x 48 matrix. The connector is located toward the front of the planar approximately in line with the sixth EISA connector, the one nearest the power supply. The connector itself is made up of several smaller units which fit together to function as one unit.

The length dimension of the processor card is limited because it contends for space with a card occupying the sixth EISA slot. The processor card was designed so that a half-size EISA card is able to fit into the EISA connector with the processor card plugged in. A half-size EISA card is defined as an EISA card having the same maximum length dimension as an XT half-card. The maximum height, with the card plugged into the planar, is the same as a standard EISA add-in card.

The processor card fits into a special slot in the plastic card guide at the front of the chassis, and is held in place by the clamp attached at the front of the chassis.

There are various types of processor cards, as follows:

| Processor Speed | PWB Layers | PWB Technology |
|---|---|---|
| 20 MHz | 4 | Thru-hole |
| 33 MHz | 6 | SMT/Thru-hole |
| 50 MHz | 6 | SMT/Thru-hole |
| 60 MHz | 6 | SMT/Thru-hole |

*Table 4: Processor Card Characteristics*

The Hammerhead base system is designed to accomodate other processor speeds in addition to those listed above.

6.3.4 External Cache

For the 33, 50 and 60 Mhz processor card, a static RAM cache external to the i486 is provided, as follows:

| Processor Speed | Cache Size |
|---|---|
| P23, 20 MHz | No cache |
| 33 MHz | 128 KB |
| 50 MHz | 128 KB |
| 60 MHz | 128 KB |

Table 5: Cache Sizes 6.3.5 COPROCESSOR SUPPORT

The System supports the installation of a WEITEK 4167 numeric coprocessor via a socket on the 33 MHz processor card. The coprocessor operates at 33 MHz, corresponding to the operating speed of the card in which it is installed.

There is no support for an external coprocessor on the 50 or 60MHz cards.

6.4 MEMORY SUBSYSTEM

6.4.1 NON-VOLATILE MEMORY

Sufficient Non-Volatile Memory (NVM) is provided in the Flash EPROM and real-time clock module to reduce the need for hardware configuration jumpers.

The Flash EPROM contains the EISA configuration, and the real-time clock module contains the rest of the configuration information.

The System reads the NVM upon initialization to configure the user configurable options.

6.4.2 MAIN RAM MEMORY

The System is capable of supporting, in six (6) SIMM sockets, up to 80 MB of system RAM, in the form of 1, 2, 4, 8 and 16 MB parity SIMM in a "by-36" memory organization.

The memory is expandable in pairs of SIMMs. Due to height considerations, use of the 16 MB SIMMs is restricted to the first four SIMM sockets nearest the drive cage. *Thus, for the 80 MB configuration, four 16 MB SIMMs are used, along with two 8 MB SIMMs.* A 96 MB configuration is not possible.

The 1, 2, 4 and 8 MB SIMMs used are those currently being shipped in the Systems 425E, 433E, 425TE and 433TE. The 16 MB SIMMs are made especially for systems utilizing the "Trane" ASIC (reference the 16MB SIMM specification).

Five SIMM types will be supported, all with 80ns $t_{RAC}$, 20ns $t_{CAC}$, Fast Page Mode parity, 72 pins:

| SIMM Size | Sides ChipUsedSize |
|---|---|
| 1 MB | 1 (256Kx36) |
| 2 MB | 2 (512Kx36) |
| 4 MB | 1 (1Mx36) |
| 8 MB | 2 (2Mx36) |
| 16 MB | 2 (4Mx36) |

*Table 6: SIMM Characteristics*

MEMORY CONFIGURATION

Hammerhead design allows different sized SIMMs to be mixed on the planar. For SIMMs less than 16 MB, they can be mixed in any order so long as they are used in pairs. This is a requirement of the memory controller necessary for interleaving. Due to height constraints imposed by the physical dimensions of the Processor Card the 16 MB SIMMs must be used in the four SIMM sockets closest to the drive cage, and may not be used in the two sockets closest to the processor card.

The minimum system configuration uses 1 pair of 2 MB SIMMs, or 4 MB of system memory. The system supports its maximum of 80 MB of memory using four `6MB SIMMs and two 8 MB SIMMs.

The allowed memory configurations are as shown in Table 3 below.

| 16 MB | 8 MB | 4 MB | 2 MB | 1 MB | TOTAL |
|---|---|---|---|---|---|
| 0 | 0 | 0 | 2 | 0 | 4 MB |
| 0 | 0 | 0 | 2 | 2 | 6 MB |
| 0 | 0 | 0 | 2 | 4 | 8 MB |
| 0 | 0 | 0 | 4 | 0 | 8 MB |
| 0 | 0 | 0 | 4 | 2 | 10 MB |
| 0 | 0 | 0 | 6 | 0 | 12 MB |
| 0 | 0 | 2 | 0 | 0 | 8 MB |
| 0 | 0 | 2 | 0 | 2 | 10 MB |
| 0 | 0 | 2 | 0 | 4 | 12 MB |
| 0 | 0 | 2 | 2 | 0 | 12 MB |
| 0 | 0 | 2 | 2 | 2 | 14 MB |
| 0 | 0 | 2 | 4 | 0 | 16 MB |
| 0 | 0 | 4 | 0 | 0 | 16 MB |
| 0 | 0 | 4 | 0 | 2 | 18 MB |
| 0 | 0 | 4 | 2 | 0 | 20 MB |
| 0 | 0 | 6 | 0 | 0 | 24 MB |
| 0 | 2 | 0 | 0 | 0 | 16 MB |
| 0 | 2 | 0 | 0 | 2 | 18 MB |
| 0 | 2 | 0 | 0 | 4 | 20 MB |
| 0 | 2 | 0 | 2 | 0 | 20 MB |
| 0 | 2 | 0 | 2 | 2 | 22 MB |
| 0 | 2 | 0 | 4 | 0 | 24 MB |
| 0 | 2 | 0 | 6 | 0 | 28 MB |
| 0 | 4 | 0 | 0 | 0 | 32 MB |
| 0 | 4 | 0 | 0 | 2 | 34 MB |
| 0 | 4 | 0 | 2 | 0 | 36 MB |
| 0 | 6 | 0 | 0 | 0 | 48 MB |
| 2 | 0 | 0 | 0 | 0 | 32 MB |
| 2 | 0 | 0 | 0 | 2 | 34 MB |
| 2 | 0 | 0 | 2 | 0 | 36 MB |
| 2 | 0 | 0 | 2 | 2 | 38 MB |
| 2 | 0 | 2 | 0 | 0 | 40 MB |
| 2 | 0 | 2 | 0 | 2 | 42 MB |
| 2 | 0 | 2 | 2 | 0 | 44 MB |
| 2 | 2 | 0 | 0 | 0 | 48 MB |
| 2 | 2 | 0 | 0 | 2 | 50 MB |
| 2 | 2 | 0 | 2 | 0 | 52 MB |
| 2 | 2 | 2 | 0 | 0 | 56 MB |
| 4 | 0 | 0 | 0 | 0 | 64 MB |
| 4 | 0 | 0 | 0 | 2 | 66 MB |
| 4 | 0 | 0 | 2 | 0 | 68 MB |
| 4 | 0 | 2 | 0 | 0 | 72 MB |
| 4 | 2 | 0 | 0 | 0 | 80 MB |

*Table 3: Allowed Memory Configurations*

6.4.3 Memory Controller

The System contains a 160-pin Application-Specific Integrated Circuit (ASIC), Dell part number 21748 (referred to as Trane), in a quad flat pack, which functions as a dynamic memory controller for the System. This controller, is designed by Dell to work with the 25, 33, 50 and 60 MHz Hammerhead systems.

The features of the memory controller are as follows:

o   Interfaces with the i486 processor to provide burst load from memory for cache line reload;

o   Provides an interface to the EISA bus with zero wait-state burst cycles and zero wait-state non-burst cycles;

- Provides an interface to the ISA bus with default one wait-state cycles;
- Controls up to 128 MB of dynamic RAM;
- Supports 1, 2, 4, 8, 16 and 32 MB SIMMs;
- Supports both single- and double-sided SIMMs;
- Supports up to 16 SIMM sides of RAM;
- Supports mixed SIMM sizes;
- Provides page-mode accesses matching the selected SIMM page size;
- Supports parity checking.

6.4.4 Support for Simulated Expanded Memory

There is no hardware support for EMS, however the system will support the LIM EMS 4.0 Specification via virtual 8086 mode in conjunction with an appropriate expended memory manager (EMM).

6.4.5 NON-CACHABILITY

Memory in Hammerhead is cacheable by default.

The minimum size for a non-cacheable region is 16 KB, with the theoretical maximum being the entire memory space for the system. In Hammerhead, up to eight separate memory areas can be defined as non-cacheable. A non-cacheable region can be increased or decreased only in increments of 16 KB. Note: this feature is used by BIOS and EISA configuration program.

In addition, BIOS ROM areas and video can be declared as cacheable or non-cacheable, independent of the above eight settings.

6.4.6 ROM BIOS Memory

The System's ROM BIOS, video BIOS, setup information and system POST routines are contained in a single 128 KB Flash ROM located on the Planar. The Flash EPROM allows the system BIOS to be reprogrammed via special software while the system is operating.

Control for this feature is provided by the I/O bus interface ASIC described below.

A standard 28-pin DIP socket has been provided on the planar for emergency situations where the Flash EPROM has lost its data, or for situations where a substitute BIOS must be installed. Installing a 128KB ROM in this socket automatically disables the ROM BIOS portion of the Flash EPROM.

6.5 I/O SUBSYSTEM

The System uses I/O circuitry which is updated for EISA compatibility integrated into the Planar circuitry. Included are controllers for two floppy disk drives, two IDE hard-disk drives, VGA display, two serial ports, a parallel port, keyboard, mouse and speaker.

6.5.1    I/O Bus Interface

The System contains a 100-pin Application-Specific Integrated Circuit (ASIC), in a quad flat pack, which integrates miscellaneous I/O control functions for the System. This device, designed by Dell, replaces several PALs and discrete devices and operates independent of processor speed. It is engineered to work with all the Hammerhead systems.

The I/O bus interface provides the following features:

- two testability modes:
    - Tri-state, all outputs
    - In-circuit test flow-thru, with inputs connected straight to outputs
- interface to the flash EPROM, including System BIOS/Video BIOS decode and EISA configuration;
- interface for an external plug-in ROM, with automatic override of the on-board ROM;
- transceiver control
- IDE IRQs
- diskette decode & DMA verify
- 82C106 RTC password block
- keyboard controller decode (including fast gate A20)
- Pxx register & miscellaneous decodes
- EISA ID
- Power OK/reset logic 6.5.2    HARD-DISK DRIVE INDICATOR The System has a green hard-disk activity indicator located front of the chassis assembly directly above the reset switch, to the left of the on-off switch. The indicator, a green LED, is illuminated when any hard-disk read\write activity occurs.

6.5.3    IDE HARD-DISK DRIVE INTERFACE

The System has an integrated IDE controller, accessed via a 40-pin header on the Planar, capable of supporting two (2) IDE hard-disk drives.

The System provides the ability to disable the on-board IDE control circuit to allow for external hard-disk drive controllers. The method for disabling the IDE control circuit is through the SETUP Menu options, EISA configuration utility, and/or automatically when a second disk controller is detected with a conflicting I/O address.

6.5.4 REAL TIME CLOCK & NON-VOLATILE MEMORY

An auxiliary real time clock (RTC) and non-volatile memory (NVM) is provided. The RTC is MC14618 compatible. Sufficient NVM is provided to maintain the clock and user settable configuration parameters when the main system power is removed.

The RTC *does not* contain an internal battery.

6.5.5 Battery

*[A description of the battery needs to be inserted here.]*

6.5.6 AUDIBLE ALARM CONTROL

The System has an AT-compatible audible alarm (speaker) and control circuit. The speaker is mechanically attached to the chassis by rubber grommet which retains the speaker magnet in an opening in the front panel.

The speaker is electronically connected to the planar via two wires and a non-keyed socket which plugs onto the two header pins on the planar.

The speaker is rated for a frequency range of approximately 250Hz - 20KHz.

6.5.7 KEYBOARD interface

The System has a PS/2-compatible keyboard interface. The keyboard interface connector is a 6-pin mini-DIN connector having a PS/2-compatible pinout, located at the rear of the chassis below the power supply.

Pinouts are as follows:

| Pin | Signal |
|---|---|
| 1 | Data |
| 2 | No connect |
| 3 | Signal ground |
| 4 | +5 volts, DC |
| 5 | Clock |
| 6 | No connect |
| SHELL | Frame ground |

*Table 4: Keyboard Interface Pinouts*

6.5.8 DISPLAY INTERFACE

The System has an integral video graphics array (VGA) video controller with 512 KB video memory, located on the planar. The controller supports all standard VGA modes and "Super VGA" (600 x 800) resolution, as well as a 16 color, 1024 x 768 resolution mode.

The on-board video display controller is automatically disabled when another video controller card is present on the EISA bus.

VGA monitor connection is via the AT-compatible high-density female 15 pin VGA connector, located at the rear of the chassis below the power supply.

The System supports the use of a 2x13, .1" center pin-header-type feature connector.

6.5.8.1 Alternative Video Daughter-card(s)

Pin-headers are also supplied for the connection of possible alternative video controllers which would be mounted on a daughter card lying parallel to the planar. Such a card would replace the on-board VGA circuitry, and would supply its own feature connector header.

There is no provision for automatically disabling the on-board circuitry upon use of such an alternative controller; therefore, if such a controller is to be used, the video control component locations on the motherboard will not be populated at the PWA vendor, and the daughter card will be inserted on the pin-header instead. The resolution and color specifications for any such daughter card are listed under a separate Specification.

The following table descirbes the supported video modes.

| RESOLUTION | COLORS | MODE | RESOLUTION | COLORS | MODE |
|---|---|---|---|---|---|
| GRAPHICS | | | ALPHA | | |
| 320X200 | 4 | 4 | 40x25 | MONO | |
| 320x200 | 4 | 5 | 40x25 | 16 | 1 |
| 320x200 | 256 | 13 | 80x25 | MONO | 2 |
| 640x200 | 2 | 6 | 80x25 | 16 | 3 |
| 320x200 | 16 | D | 80x25 | MONO | 7 |
| 640x200 | 16 | E | 132x25 | 2 | 57,19 |
| 640x350 | MONO | F | 132x25 | 16 | 55,23 |
| 640x350 | 4/16 | 10 | 132x43 | 2 | 56 |
| 640x400 | 256 | 13 | 132x43 | 2 | 56 |
| 640x480 | 2 | 11 | 132x43 | 16 | 54 |
| 640x480 | 16 | 12,25 | | | |
| 640x480 | 256 | 5F,2E | | | |
| 800X600 | 2 | 59 | | | |
| 800X600 | 16 | 58,29 | | | |
| 800x600 | 256 | 5C,30 | | | |
| 1024X768 | 2 | 5A | | | |
| 1024X768 | 16 | 5D,37 | | | |

*Table 9: Supported Video Modes*

Pinouts are as follows:

| Pin # | Signal |
|---|---|
| 1 | Red video |
| 2 | Green video |
| 3 | Blue video |
| 4 | No connect |
| 5-10 | Signal ground |
| 11 | No connect |
| 12 | No connect |
| 13 | Horizontal sync |
| 14 | Vertical sync |
| 15 | No connect |
| SHELL | Frame ground |

Table 10: Video Pinouts

6.5.9 SERIAL PORT

The System has two (2) 16450 (AT) compatible serial (COM) ports configured as DTE. The Setup utility allows the serial ports to be automatically re-mapped from COM1 and/or COM2 to COM3 and/or COM4. The System also provides a means to disable the serial ports (see the Dell Standard Setup Utility Specification).

A male, 9 pin D-SUB connector is provided for each port, located at the rear of the chassis below the power supply.

The pinouts are as follows:

| DB9S | DB25P | Signal Name | |
|---|---|---|---|
| 1 | 8 | DCD | (data carrier detect) |
| 2 | 3 | RX | (receive data) |
| 3 | 2 | TX | (transmit data) |
| 4 | 20 | DTR | (data terminal ready) |
| 5 | 7 | GND | (signal ground) |
| 6 | 6 | DSR | (data set ready) |
| 7 | 4 | RTS | (request to send) |
| 8 | 5 | CTS | (ring indicator) |

Table 11: Serial Pinouts

6.5.10 MOUSE PORT

The System has a single PS/2-compatible synchronous mouse port. The Setup utility allows the mouse port to be disabled. A female, 6-pin mini-DIN connector, utilizing PS/2-compatible pinouts is provided, located at the rear of the chassis below the power supply.

The pinouts are as follows:

| Pin | Signal |
|---|---|
| 1 | Data |
| 2 | No connect |
| 3 | Signal ground |
| 4 | +5 volts, DC |
| 5 | Clock |
| 6 | No connect |
| SHELL | Frame ground |

*Table 12: Mouse Port Pinouts*

6.5.11 PARALLEL PORT INTERFACE

The System has a single AT-compatible, bi-directional parallel (LPT) port.

The port is fully bidirectional. If bit 5 of the LPT Port Control (Register 2) is set ("1"), then the output buffers in the LPT port are disabled allowing data driven from external sources to be read from the LPT Port. Reads from the data ports return the last data that was written to the LPT port. When reset ("0"), the output buffers are enabled, forcing the LPT output to drive the LPT pins.

The parallel port is re-mappable above other installable parallel ports. A means is provided in Setup to disable the parallel port. A female, 25 pin D-SUB connector is provided for the port connection, located at the rear of the chassis below the power supply.

The pinouts are as follows:

| Pin | Signal |
|---|---|
| 1 | STROBE (strobe) |
| 2 | D0 (data 0) |
| 3 | D1 (data 1) |
| 4 | D2 (data 2) |
| 5 | D3 (data 3) |
| 6 | D4 (data 4) |
| 7 | D5 (data 5) |
| 8 | D6 (data 6) |
| 9 | D7 (data 7) |
| 10 | ACK (acknowledge) |
| 11 | BUSY (busy) |
| 12 | PE (paper end) |
| 13 | SLCT (select) |
| 14 | AUTOFD (auto feed) |
| 15 | ERROR (error) |
| 16 | INIT (initialize printer) |
| 17 | SLCT IN (select in) |
| 18-25 | GND (signal ground) |

*Table 13: Parallel Port Pinouts*

6.5.12 EISA CHANNEL

The System has six (6) total 32-bit EISA slots, five (5) full size slots and one half-card slot. The half-card slot will accept any ISA- or EISA-compatible card whose length dimension does not exceed that of an XT-type half-card.

6.5.13 DIAGNOSTICS DISPLAY PANEL

The System has a SmartVu diagnostics panel on the front of the chassis assembly. The diagnostics panel displays error messages and status information via a green four (4) character display. The display is capable of displaying 00H - 7FH ASCII character representations.

6.5.14 EXTERNAL RESET

The System has an externally accessible reset switch which allows a user to perform a hardware Power-On-Reset (POR) without powering down the System. The reset switch creates a non-maskable interrupt (NMI) to the System. If a time-out is not prevented by system software within 10ms an actual hardware reset function is performed.

7 SOFTWARE SPECIFICATION

7.1 GENERAL

The System uses the Phoenix EISA ROM BIOS Plus Version 1.00 and the ROM based Dell System Setup Utility as the foundation for the System BIOS.

7.2 KEYBOARD PASSWORD PROTECTION

A software password protection mechanism is provided to allow the user to "lock" the System from unauthorized access. If the password is enabled (via the Setup utility) then the password is required prior to boot. Additionally, the password can be activated while the System is operating to "lock-out" the keyboard until the correct password is entered.

7.3 SETUP UTILITY

A ROM resident setup utility allows the user to change the configuration settings of the System. The System will automatically execute the setup utility under any of the following conditions:

* The NVM data is corrupted

* The stored configuration does not match the actual system configuration.

* The <CTRL><ALT><ENTER> hot-key sequence is entered.

The contents and function of the setup utility are in accordance with the Dell Standard Setup Utility, version 1.0, P/N 13521, except as noted below:

*[A list of deviations from Setup Utility to be provided here]*

7.4 SPEED SWITCHING

The effective processor clock speed for the System is toggled using hot-key sequence <CTRL><ALT><\>. The processor clock speed can also be set from within Setup.

7.5 DIAGNOSTICS

*[We are working with System Support Software on a Diagnostics Spec to be referenced here.]*

7.6 EISA Configuration Utility

The EISA Configuration Utility comes on diskette, and can reside on either the EISA Configuration Utility Diskette or on the hard-disk. The hard-disk or diskette contains the utility itself, as well as configuration files for each board and card currently installed in the System. The Utility can be mouse-driven upon installation of two mouse-driver files.

Each time a new board or card is added to the System, its configuration file is copied to the hard-disk or diskette. The EISA Configuration Utility can then be used to do the following:

- View card configurations and current system settings;

- Automatically configure each new EISA card that is installed;

- Obtain information on how to manually configure each new ISA card that is installed;

- Flag potential systems resource conflicts when installing a new card;

- Correct configuration problems when prompted by a warning message;

- Set system options relating to installed hardware and operational characteristics (these are considered system board options, and can also be accessed through the system board configuration menu);

- Save and print the current configuration.

Note that any changes made through the System Setup program are read by the EISA Configuration Utility, but are not stored in the EISA-configuration chip until the next time that the EISA Configuration Utility is run.

7.7 SOFTWARE DRIVERS

The following software drivers and associated documentation files are supplied on the Software Support diskette

- Reset switch DOS driver (.SYS), which displays the following message:

Press again to reset the System.

If the reset is pressed again within five seconds, system reset occurs. If the reset is not pressed again within five seconds, system operation continues.

- SmartVu DOS driver (.SYS & .EXE or .COM), which can be customize the SmartVu to display:

- Time
    - Date
    - A message of the User's choice (scrolling)

- VGA drivers, which provide high resolution modes for the following software packages:

- AutoCAD (640x480, 800x600, 1024x768)
    - Cadvance (640x480, 800x600, 1024x768)
    - Framework
    - GEM

- ✓ 2.1 and 2.2 (800x600)
- ✓ 3.0/3.1 (800x600, 1024x768)
- ✓ Generic CADD Level 3 (800x600, 1024x768)
- ✓ Lotus 1-2-3
- ✓ Word perfect
- ✓ Versacad
- ✓ Windows ver.2 - 2 color driver (640x480, 800x600, 1024x768)
- ✓ Windows 3.0 driver (800x600, 1024x768, with support for Windows-compatible applications such as Excel and PageMaker.)
- ✓ WordStar 3.3 (with support for 132 columns)
- ✓ WordStar Release 5 (with support for page preview mode)

8 MECHANICAL SPECIFICATION

Please refer to the Dell Medium-size Desktop Chassis Specification for exact mechanical specifications.

8.1 PHYSICAL DIMENSIONS

Width: 16"

Height: 6"

Depth: 16"

Weight: appx. 25 lbs.

8.2 CHASSIS LOCK

An external mechanical chassis lock is provided at the top center of the rear panel of the chassis to prevent unauthorized access to the inside of the enclosure. The lock does NOT provide any electronic switching or disabling function.

There are fifty (50) lock combinations available, and all locks are master-keyed so that any Hammerhead system can be opened by an authorized service representative.

8.3 EXTERNALLY ACCESSIBLE DRIVE BAY

The System provides a removable drive bay module which supports up to three (3) of any combination of 5.25" half-height storage devices and/or 3.5" storage devices (in a 5.25" half-height form factor only). The specific devices are outlined in the compatibility section of this document.

8.4 INTERNALLY ACCESSIBLE DRIVE LOCATIONS

The System supports up to two (2) of any combination of 3.5" form-factor storage devices which do not require external access. These devices will be mounted in the area inside the chassis designated for internal devices. At this time, the only devices available that fit this form factor and do not require external access are hard-drives.

This area is just to the left of the power supply, when viewing the System from the front, and is not accessible with the hood on. There is no drive cage provided in this area, so any devices mounted there MUST be enclosed in special metal holders before installation by attachment to the chassis.

A hard-disk drive installed in the second of these locations renders the fifth and sixth EISA connector unusable. Thus, with two hard-disk drives installed in the internal drive locations, only four I/O expansion slots are available to the user.

The specific devices are outlined in the compatibility section of this document.

8.5 I/O INTERFACES

The following I/O connections will be provided:

- One (1) 6-pin Female Keyboard connection
- One (1) 6-pin Female Mouse connection
- Two (2) 9-pin Male Serial connection
- One (1) 25-pin Female Parallel connection
- One (1) 15-pin high-density Female VGA connection
- Six (6) EISA Expansion Slots

9 COMPATIBILITY SPECIFICATION

9.1 GENERAL

The System shall comply with the Dell compatibility philosophy. The software and devices listed herein constitute the devices specifically supported and/or sold by Dell for the System.

9.2 OPERATING SYSTEMS

The System supports all previous versions of operating systems appropriate to this category of machine, including the following:

9.2.1 DOS

The System operates properly with Dell Enhanced DOS 4.01a and Dell Enhanced DOS 3.3.

9.2.2 OS/2

The System operates properly with Dell OS/2 version 1.21 as specified in the OS/2 Specifications Version 1.21.

9.2.3 UNIX

The System operates properly with Dell UNIX versions V.4 and V.32.

9.2.4 NETWORK OPERATING SYSTEMS

The System operates properly with the following network operating systems:

- Novell NetWare
    - ELSI 2.12
    - ELSII 2.15
    - Advanced 2.15
    - SFT 2.15
    - 386 3.1
- 3Com
    - 3+Share 1.6
    - 3+Open 1.1
- Banyan Vines 4.0
- TOPS 3.0
- IBM PC Lan 1.3
- MS LAN Manager 2.0
- IBM LAN Server Program 1.2

9.2.5 NETWORK CERTIFICATION

The System is both Novell and Banyan Vines network certified (not required for FCS).

9.3 STORAGE DEVICES 9.3.1 DISKETTE DRIVES

The System supports a maximum of two (2) diskette drives and one (1) internal tape drive. All three devices can share the same cable, which has three connectors. The following is a list of supported diskette drives:

| Size  | Cap.      | Bezel |
|-------|-----------|-------|
| 3.5"  | 1.44 MB   | grey  |
| 5.25" | 1.2 MB[1] | grey  |
| 5.25" | 360K[2]   | grey  |

Table 14: Diskette Drive Characteristics

[1] The drive must support a dual data rate of 300 Kb/s and 500 Kb/s

[2] Configured as drive "B" ONLY)

Reference Appendix A, Configuration Options 9.3.2 HARD-DISK DRIVES AND CONTROLLERS The System supports a maximum of four hard-disks and 2 hard-disk controllers at the same time. The following tables show supported hard-disk drives and controllers:

IDE

| Mfgr.   | Cap.    | Access |
|---------|---------|--------|
| Seagate | 20 MB   | 40ms   |
| Seagate | 40 MB   | 29ms   |
| Conner  | 40 MB   | 25ms   |
| Conner  | 80 MB   | 25ms   |
| Conner  | 100 MB  | 25ms   |
| Quantum | 105 MB  | 17ms   |
| Maxtor  | 200 MB  | 15ms   |
| Maxtor  | 320 MB  | 17ms   |

Table 15: IDE Drive Characteristics

ESDI

| Mfgr. | Cap. | Xfer rate |
|---|---|---|
| Micropolis | 344 MB | 15 Mb/s |
| Micropolis | 650 MB | 15 Mb/s |

*Table 15: ESDI Drive Characteristics*

SCSI

| Mfgr. | Cap. |
|---|---|
| Micropolis | 330MB |
| Micropolis | 650MB |

*Table 16: SCSI Drive Characteristics*

ESDI Controller

UltraStor 12(F) ESDI Controller

SCSI Controller

Adaptec 1542B

Dell Drive Array

Reference Appendix A, Configuration options

9.3.3 TAPE BACKUP DEVICES

Internal Drive

CMS 40/120 MB Tape Backup
Wangtek 150 MB/250 MB Tape Backup
Wangtek 525 MB Tape Backup External Drive CMS 40/120 MB Tape Backup
Wangtek 525MB Tape Backup Tape Backup Controller Cards 40 MB Tape Backup Controller (external only)
150 MB/250 MB Tape Backup Controller

9.4 ADDITIONAL SYSTEM OPTIONS

9.4.1 Network Cards:

| | |
|---|---|
| Etherlink II | Pure Data Arcnet |
| Gateway Ethernet | Racal/Interlan Ethernet |
| IBM 16/4 Token Ring | SMC ArcNet |

IBM 4 MB Token Ring     TCC ArcNet

LANmaster Arcnet        Ungermann-Bass Ethernet

WD 8003 EB              Proteon Token Ring

WD 8013 EB

WD Tokencard 9.4.2 Mainframe Connectivity

IBM 3278/89

IBM 5250

9.4.3 Internal Modems

Hayes Smartmodem 1200

Hayes Smartmodem 1200B

Hayes Smartmodem 2400B

Omnitel 2400 Baud Modem 9.4.4 External Modems

Modem 1200

Hayes Smartmodem 1200

Hayes Smartmodem 2400

Hayes Smartmodem 2400B

Trailblazer 2400B 9.4.5 Memory Expansion Cards

Intel Above Board

Intel Above Board Plus 9.4.6 KEYBOARD

PS/2-compatible 6-pin connector 101- or 102-key keyboard 9.4.7 MOUSE

- IBM PS/2 Mouse

- Logitech PS/2 Mouse
- Mouse Systems PS/2 Mouse
- Microsoft PS/2 Mouse

9.4.8 DISPLAY

Supported Monitors:

- Dell VGA Monochrome
- Dell VGA Color Plus
- Dell Super VGA
- NEC 3D
- GPD-16C
- GPD-19C Supported VGA Video Adapters

- ISA Expansion VGA Controller
- Paradise PVC-4

Supported High-Resolution Video Adapters

- GPX (16 color)
- GPX (256 color)
- WD 8514/A
- Sigma Legend

9.5 VERIFICATION TESTING SPECIFICATION

Reference the Hammerhead Test Plan.

10 PERFORMANCE

This system is designed to provide a replacement for the Systems 425E and 433E. Therefore, the HAMMERHEAD performance meets or exceeds that for Systems 425E and 433E, and meets or exceeds the design goals set down for the HAMMERHEAD system with 50/60MHz processors. The HAMMERHEAD System design goals are shown below:

| BENCHMARK Goals | 425DE | 433DE | 450DE | 460DE |
|---|---|---|---|---|
| Unix Benchmarks | | | | |
|   SPEC TBD | TBD | TBD | TBD | |
|   Khornerstone | TBD | TBD | TBD | TBD |
|   AIM Benchmarks | TBD | TBD | TBD | TBD |
|   Dhrystones | TBD | TBD | TBD | TBD |
|   Whetstones | TBD | TBD | TBD | TBD |
| Novell Netware | | | | |
|   Common Benchmarks | TBD | TBD | TBD | TBD |
| Norton Utilities 4.5 | | | | |
|   Standard Edition | TBD | TBD | TBD | TBD |
|   Advanced Edition | TBD | TBD | TBD | TBD |
|   Landmark 1.12 | TBD | TBD | TBD | TBD |
| Power Meter 1.3 | | | | |
|   System: | TBD | TBD | TBD | TBD |
|     Agg. System | TBD | TBD | TBD | TBD |
|     Spreadsheet | TBD | TBD | TBD | TBD |
|     Word Proc. Sim. | TBD | TBD | TBD | TBD |
|     Database Sim. | TBD | TBD | TBD | TBD |
|     CAD/CAE Sim. | TBD | TBD | TBD | TBD |
|     Prog. Dev. Sim. | TBD | TBD | TBD | TBD |
|   CPU: | TBD | TBD | TBD | TBD |
|     Agg. CPU/Mem. | TBD | TBD | TBD | TBD |
|     NOP Test | TBD | TBD | TBD | TBD |
|     Sieve Test | TBD | TBD | TBD | TBD |
|     Whetstone Test | TBD | TBD | TBD | TBD |
|     MIPS | TBD | TBD | TBD | TBD |
|   Video: | TBD | TBD | TBD | TBD |
|     Agg. Video | TBD | TBD | TBD | TBD |
|     Char. Write | TBD | TBD | TBD | TBD |

Table 17: Benchmarks

Note: The performance numbers stated here are estimated performance numbers and should be used as guidelines for minimum performance goals for the System.

11 DOCUMENTATION SPECIFICATION

11.1 DOCUMENTATION SET

The documentation package consists of the following manuals, diskettes and labels:

11.1.1 MANUALS

The following manuals are shipped with the System:

- Dell System 420(33/50/60)DE Getting Started guide

- Dell System 420(33/50/60)DE User's Guide

- Dell System 420(33/50/60)DE Software Support Guide

- Diagnostics and Troubleshooting Guide

11.1.2 SYSTEM SUPPORT SOFTWARE DISKETTES

The following diskettes are shipped with the System:

- Dell System 420(33/50/60)DE Tutorial Diskette
- Dell Diagnostics Diskette
- Software Support Diskettes (2)
- EISA Configuration Utility Diskette
- EISA Library Diskette

11.1.3 LABELS

The following labels are shipped with the System:

- Tutorial diskette labels (1 for 3.5" and 1 for 5.25")
- Dell Diagnostics Diskette labels (1 for 3.5" and 1 for 5.25")
- Software Support Diskette labels (2 for 3.5" and 2 for 5.25")
- Interior information label
- Front bezel label (diamond cut)
- Regulatory labels (1 - 3.5" and 1 - 5.25")
- Service tag label
- I/O Channel label (same as Panther)
- Break-the-seal label

11.1.4 KIT STRUCTURE

The documentation & diskettes are packaged as follows:

- Text documents
- 5.25" diskettes
- 3.5" diskettes

The manuals are based on the System 325D/333D manuals, except for the *Diagnostics and Troubleshooting Guide*, which will be based on the appropriate current Dell diagnostics.

11.2 DIAGNOSTICS DISPLAY SUPPORT

The System provides DOS & OS/2 software drivers to display various status & fault messages. A minimum shall be provided:

- Time

- Date

- Processor Speed

- System Activity (e.g. Drive/Sector access)

- Customer provided message

The System provides a UNIX device driver to write to the display. With this driver, functions such as those associated with DOS and OS/2 are easily provided. For example:

*[while true
do
sleep 60 `date '+%H%M'> /dev/SmartVu`
done] [Charlie has threatened to provide the proper code here]* will provide time of day indication.

12 SERVICEABILITY

12.1 CHASSIS DISASSEMBLY

Disassembly is the same as for Panther:

- The hood can be removed by the loosening of six screws.

- With all cables unattached, the drive bay can be removed complete by unfastening two screws on the front of the chassis; it is not necessary to remove any drives to do so.

- With all cables unattached, the power supply can be removed by unfastening four screws.

- The processor card can be removed by unfastening the retainer plate at the front of the chassis.

- Once the processor card is removed, the SIMMs can be removed from or installed in the planar with the planar still in the chassis.

- Once the add-in cards are removed and the cables unattached, he planar can be removed by unfastening eight screws.

All cables are the same as for Panther, having adequate service loops to allow maintenance of system without detaching cables.

12.2 LOCATION OF USER-SERVICEABLE COMPONENTS

The jumpers and battery are accessible without removal of logic boards, diskette drives, hard-disk drive or power supply.

The ROM BIOS is contained in the Flash EPROM, and removal of the chip itself is not required in order to change the BIOS code, which can be done via diskette. In the event that the Flash EPROM should fail, a standard 28-pin BIOS socket is provided, and inserting a BIOS chip in this socket bypasses the Flash EPROM. This socket is accessible without removing boards, power supply or drives.

The keyboard controller is located under the power supply, and it is necessary to remove the power supply in order to change the keyboard controller.

The math coprocessor socket, if present, is located on the processor card.

The system memory is accessible only after the processor card has been removed.

12.3 HARDWARE JUMPER LOCATIONS

The System is designed to utilize a minimum number of user configuration jumpers. All switches are located in positions such that the logic boards, diskette drives, hard-disk drive or power supply does not have to be removed to change the switch settings. The location is such that the jumpers are in a clear line of sight when the chassis cover is removed.

The following is a listing of system jumpers and their function:

| Jumper | Setting | Function |
|---|---|---|
| EVGA1 | ON | Disables the on board VGA controller |
|  | OFF | Enables the on board VGA controller (default). |
| MSYC$^{1,2}$ | ON | Multisync monitor is being used. |
|  | OFF | Not using a multisync monitor (default). |
| EPWD | ON | Password option enabled (default). |
|  | OFF | Password option disabled. |
| AROM | ON | System boots off alternate 128K UV PROM |
|  | OFF | System operates normally (default). |

| | | |
|---|---|---|
| BOOT | ON | Flash 8k boot erase/program enable |
| | OFF | Disable, flash boot section protected, can't be erased |
| MNT | ON | System enters the Manufacturing Maintenance mode of operation |
| | OFF | System operates normally (default) |
| RSET | ON | Initiates a "cold" reboot of the System. |
| | OFF | System operates normally (default). |

*Table 18: System Jumpers*

1  *Jumpers MSYC and EVGA relate to the video display.*

2  *Multisync monitors are color only*

12.3.1 MAINTENANCE JUMPERS

The manufacturing maintenance jumper is located such that the jumper is easily accessible during the manufacturing assembly process.

12.3.2 MICROPROCESSOR CARD REPLACEMENT

The microprocessor card is socketed to allow for field replacement. Two screws must be loosened, and the retaining plate removed; the card can then be unplugged.

This is intended to supply an upgrade path for the future as well as field replacement of failed components.

13 ENVIRONMENTAL SPECIFICATION

13.1 GENERAL ENVIRONMENT

The System is designed and tested to the requirements set forth in the Dell Computer Corporation Environmental Specification, Revision 1.2.

13.2 PRODUCT SPECIFIC ENVIRONMENT

< NONE >

14 DOMESTIC REGULATORY SPECIFICATION

14.1 FCC CLASS B

The System meets and is tested to FCC Subpart J of Part 15 for a Class B computing device in accordance with FCC requirements.

14.2 UL

The System meets and is tested for UL compliance for EDP equipment.

15 INTERNATIONAL SPECIFICATION

The System is designed and tested for compliance with pertinent International Regulatory agencies' approvals. VDE compliance is a requirement for First Customer Ship, while CSA, BSI, TUV, SEMKO and LCIE testing is to be obtained in as short a time frame as is feasible.

The System shall be tested to be compatible with those International products specifically called out in the System Test Plan.

APPENDIX A

Configuration Options

The System chassis shall have three (3) half-height 5.25" diskette drive or tape bays accessible by the user. The System also has two (2) internal 3.5" form-factor drive positions accessible to the user only by removing the hood.

The matrices below show the devices that will be supported in each drive bay.

External Half-Height Drive Bays (any one, two or three of the following, in consecutive bays):

Diskette Drives

| Size  | Capacity |
|-------|----------|
| 3.5"  | 1.44 MB  |
| 5.25" | 1.2 MB   |
| 5.25" | 360 KB   |

*Table 19: Diskette Drive Configuration Matrix*

Hard-disk drives

| Capacity | Type |
|---|---|
| 40 MB | IDE |
| 80 MB | IDE |
| 100 MB | IDE |
| 190 MB | IDE |
| 344 MB | ESDI |
| 650 MB | ESDI |

*Table 20: Hard Disk Drive Configuration Matrix, External Drive Bays*

Backup Tape Drives

| Drive | Controller |
|---|---|
| 40/120 MB | No |
| 150/250 MB | Yes |

*Table 21: Backup Tape Drive Configuration Matrix*

Internal Half-Height Drive Bays (any one or two of the following):

Hard-disk drives

| Capacity | Type |
|---|---|
| 40 MB | IDE |
| 80 MB | IDE |
| 100 MB | IDE |
| 190 MB | IDE |

*Table 22: Hard Disk Drive Configuration Matrix, Internal Drive Bays*

APPENDIX B

ABSTRACT

SLOB is a combination chip for integration of the Hammerhead I/O section. It will be used in the Hammerhead desktop and Mako tower products. Time to market and functional correctness are the important considerations for this product. There are no major critical timing paths in SLOB. However, it must meet any restrictions with respect to the systems with which it interfaces.

The Goals of this project are:

1. To provide a fully functional first pass prototype of the SLOB chip by December 18.

2. To provide a full validation test suite for the SLOB chip, so that it can be verified the predictive and post-route stages in an efficient and correct manner.

3. To provide board level testability as documented herein.

4. To provide a Bring Up test plan and support the Bring Up effort.

1.0 FUNCTIONALITY

The main function of the SLOB Gate Array is to provide Reset Logic, FLASH/UVPROM/ NVRAM interfaces, X-Bus control logic, various chip selects and registers, and other miscellaneous functions for the Hammerhead I/O section.

1.1 FUNCTIONAL BLOCK DEFINITIONS

1.1.1 Memory Control Block

The SLOB Memory Control Block is designed to generate the addresses and control signals for UVPROM, NVRAM, and when available, FLASH Memory. The following memory configurations are supported:

1. Stand Alone 128K FLASH Memory
2. 128K FLASH Memory with an 8K NVRAM
3. 128K UVPROM, (ROM), with an 8K NVRAM The SLOB Memory Control Block generates the following control signals: FLHCE~, FLHWE~, FLHOE~, ROMCE~, and NVMCS~. This block also generates memory address FLHA[16:14] and FLHA[12:8]. These are the address pins to the ROM, NVRAM, and/or FLASH Memory. FLHA[13] and FLHA[7:0] are directly driven by SA[13], SA[7:3], and XA[2:0] respectively. *(All SLOB pins are described in the "SLOB Pin List Description," Section 3.1).*

Erasing and Programming FLASH memory requires setting the FLHPRG bit in Port XX. This is done by writing a '1' to bit XD[3] at address h0CA6, Port XX. *(See Section 1.2.3.9).* This directly drives the FLHPRG pin out of SLOB. When it is a '1', it enables the high voltage circuit to the FLASH. (Please refer to a FLASH Memory Spec. for erasing/programming procedures.)

The FLASH Memory is broken up into four separate sectors:

Sector 1:   64K System BIOS + 32K Video BIOS + 16K unused memory
    Sector 2:   4K EISA Configuration Lower or "0"
    Sector 3:   4K EISA Configuration Upper or "1"
    Sector 4:   8K BOOT Code These sectors are each independently programmed. The 8K BOOT Code is protected from erases and writes by a jumper on the planar. These sectors are address mapped in two different modes.

1.1.1.1 FLASH/ROM/NVRAM Memory Mapping Modes

The following sections will describe the different modes for memory mapping available using SLOB. To save I/O pins on the SLOB chip, not all 32 system address pins, SA[31:0], were used. The high addresses are decoded using the following:

1. LA31~ (latched and inverted SA[31])
2. ROMADR~ (from TRANE) where:
      $\overline{\text{ROMADR}\sim}$ = 1Mmap + 16Mmap + 4Gmap
        1Mmap = ROMEN * HM/IO# * ADDR(000Fxxxx)
        16Mmap = HM/IO# * ADDR(00FFxxxx)
        4Gmap = HM/IO# * ADDR(FFFE0000:FFFFFFFF)
3. VBIOS~ (from ISP and 90C11) where:
      VBIOS~ = $\overline{\text{GT1M\#}}$ + EBROM#

The actual address mapping is transparent with respect to the physical memory configuration implemented, (FLASH, ROM, and/or NVRAM). However, BIOS must determine the configuration and initialize SLOB so that it can generate the correct memory control signals. *(Please refer to the Memory Map Diagrams when reading the following descriptions).* *(For even more detail on the decoding, refer to the equations in Section 1.1.1.4).*

1.1.1.1.1 Native Mode

Native Mode is the default power-up mode. SLOB will always reset on RSTDRV to Native Mode. To set Native Mode during normal operation, write a '1' to bit XD[4] of the Port XX Register, address h0CA6. *(See section 1.2.3.9)*. The entire 128K of memory, all four sectors of FLASH, (when installed), are Readable and Writable in Native Mode. (The 8K Boot Sector is protected from writes by a jumper on the board. However, after removing the jumper, SLOB must be in Native Mode to write it.) The 8K Boot region appears at the top of memory, hFFFFE000-hFFFFFFFF. The next region down contains the two sectors of 4K EISA Configuration. Sector 1 is at hFFFFD000-hFFFFDFFF and sector 0 is at hFFFFC000-hFFFFCFFF. This region is also I/O mapped at addresses h0800-h08FF with the page defined by the 5 bit "EISA Configuration Page Register." The register is located at address h0C00. Only data bits XD[4:0] are implemented and correspond to physical addresses FLHA[12:8], during I/O cycles to h08xx. *(For more on the "EISA Configuration Page Register, see Section 1.2.3.2).*

NOTE: EISA Config. should never be directly accessed at hFFFFDFFF-hFFFFC000. In a system with an alternate NVRAM installed, the EISA Config. can only be accessed in I/O space at h000008FF-h00000800. Accesses to hFFFFDFFF-hFFFFC000 would be to UVPROM or FLASH and NOT the desired NVRAM.

Following the EISA Config. is the 16K unused memory area at hFFFF800-hFFFFBFFF. This unused memory can only be accessed at this location in memory and only in Native Mode.

The next region down the map is the 32K Video BIOS, (VBIOS), memory at hFFFFF000-hFFFF7FFF. The VBIOS region is also memory mapped at address space h000C0000-h000C7FFF. VBIOS can be read or written at either mapping.

The next region of memory is the System BIOS, (SBIOS), appearing from hFFFE000-hFFFEFFF. It also appears in two other areas in Native mode. For compatibility with AT mode software, (16M machine), the SBIOS will appear at h00FFFFFF-h00FF0000. For compatibility with XT mode software, (1M machine), the SBIOS also appears at h000FFFFF-h000F0000. SBIOS may be read or written at any of the three mappings. *(See Native Mode Memory Map, Figure 1).*

1.1.1.1.2 Non-Native Mode

Non-Native Mode is the normal operating mode of the system. This mode prevents all writes except to the two sectors of 4K EISA Config. This makes it more difficult for the general user to inadvertently overwrite his SBIOS or VBIOS. Non-Native Mode is set by writing a '0' to bit XD[4] of the Port XX register, address h0CA6. *(See section 1.2.3.9)*. Not all sectors or regions of memory can be accessed in this mode. The 8K Boot sector and the 16K unused region of sector 1 cannot be accessed at all in Non-Native Mode.

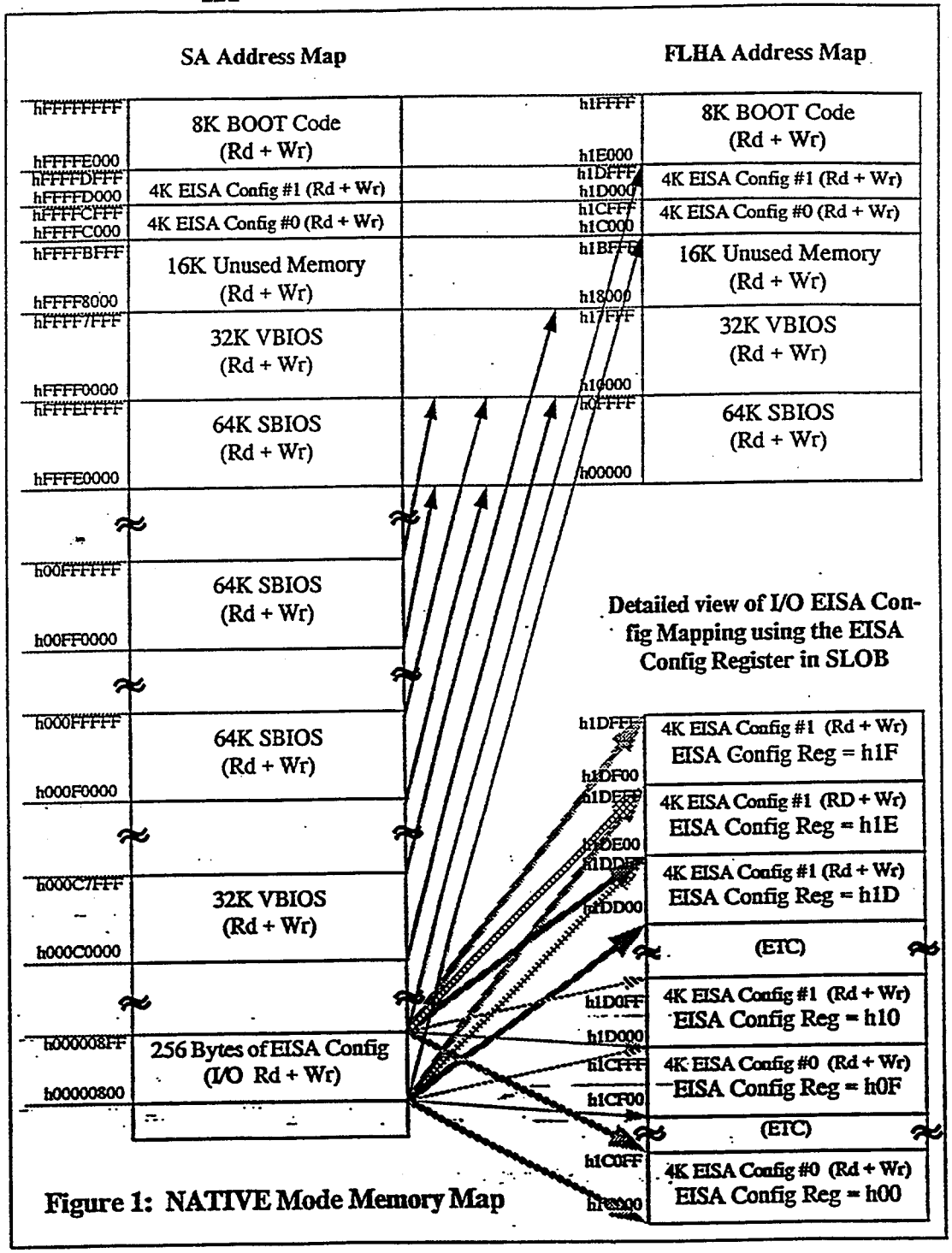
Figure 1: NATIVE Mode Memory Map

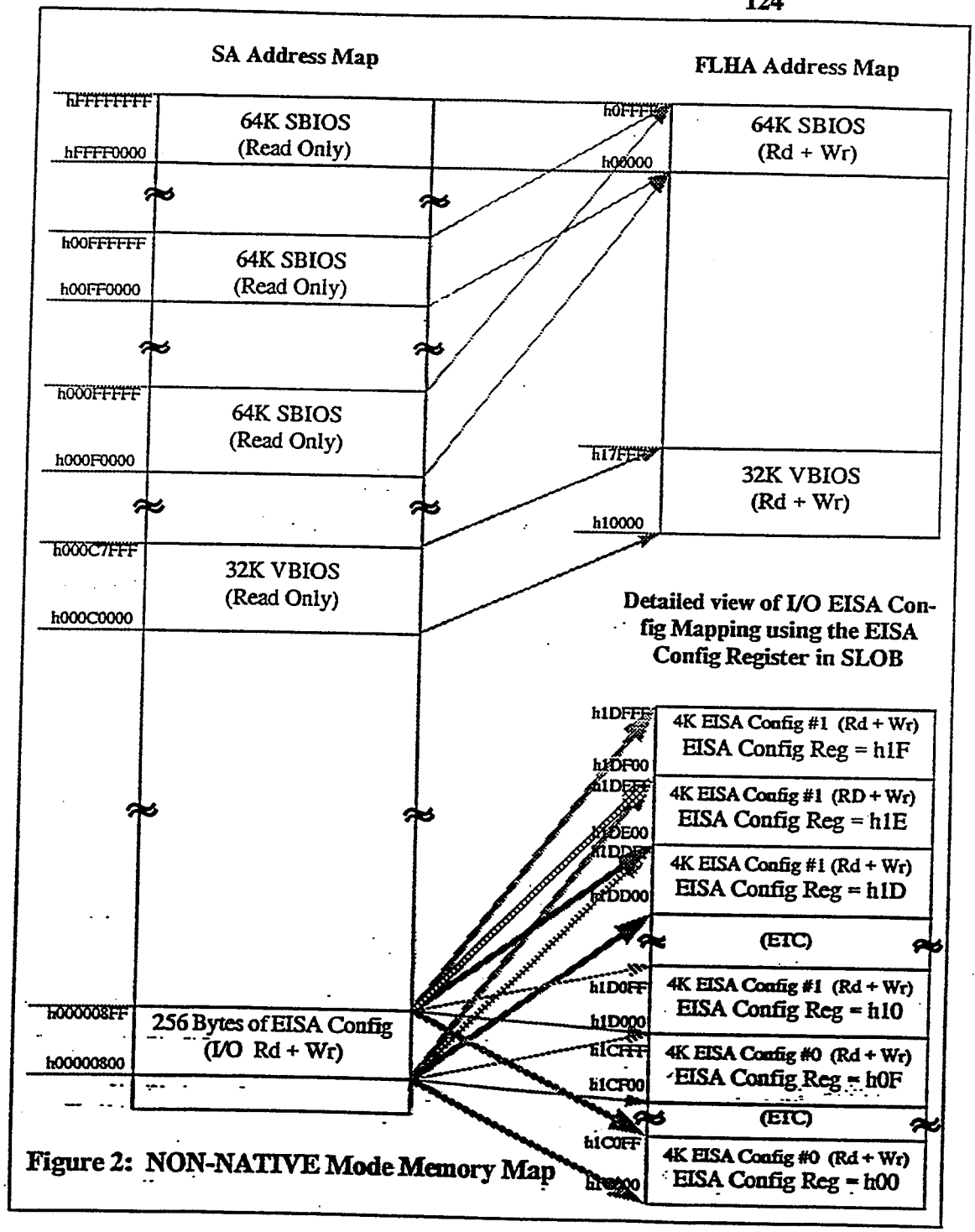
Figure 2: NON-NATIVE Mode Memory Map

SBIOS appears at the Top of Memory at hFFFF0000-hFFFFFFFF. For compatibility with AT mode software, (16M machine), and XT mode software, (1M machine), the SBIOS also appears at h00FF000-h00FFFFFF and h000F0000-h000FFFFF respectively.

VBIOS appears at h000C7FFF-h000C0000 only in Non-Native Mode.

The two sectors each of 4K EISA Config. are mapped in I/O space h000008FF-h00000800. The page is defined by the 5 bit "EISA Configuration Page Register". I/O reads and writes to these sectors in Non-Native Mode are performed by the same procedure described for EISA Config. in the Native Mode, *(section 1.1.1.1.1)*. *(See Non-Native Mode Memory Map, Figure 2)*.

1.1.1.2 Alternate External UVPROM

If an external UVPROM, (ROM), is installed in the system a DIP switch must be set so that the ROMIN~ pin on SLOB is held low. During power-up, (at the rising edge of POK), SLOB will enable the ROM and disable the FLASH by setting bit XD[1], ROMEN, of the External ROM Register, (ERR), at address h0CA4. (See section 1.2.3.7). The FLASH may be enabled while an external ROM is installed by writing a '0' to ROMEN in the ERR. This will also disable the external ROM. The values of the ROMIN~ and ROMEN can be read by software by reading the ERR. To enable ROM or ROM and FLASH the switch must be set so that ROMIN~ is LOW. Software can then set or clear the ROMEN bit to switch between ROM and FLASH. However, if (ROMIN~ = 1), then ROMEN is disabled and software can only access FLASH

| ROMIN~ Summary: |
|---|
| ROMIN~     => Sampled on rising POK<br>            => Readable @ Port h0CA4 bit XD[0]<br>ROMIN~ = 0 => External UVPROM installed<br>            => ROMEN =1 after POK reset<br>            => FLASH disabled (until writing ROMEN = 0)<br>       = 1 => FLASH enabled<br>            => ROMEN = 0 held cleared (cannot write to '1')<br>            => Disabled external UVPROM. |

TABLE 1: ROMIN~ Pin Summary

1.1.1.3 Alternate NVRAM (for EISA Configuration)

If an alternate NVRAM is to be used for the EISA Configuration Memory in place of the FLASH Memory, a resistor shunt must be installed on the board. This will set XD[5], NVRAMIN~, to '0' in configuration Register A, (CRA), at address h0CA2. *(See section 1.2.3.5)*. SLOB will then access NVRAM in place of the FLASH or UVPROM using the same procedure as described in the Native Mode description; *(Section 1.1.1.1.1)*.

1.1.1.4 Hammerhead Memory Decode Equations $\overline{\text{FLHCE-}}$ = (ROMEN * $\overline{\text{SBIOS-}}$ * NATIVE)
  + ($\overline{\text{ROMEN}}$ * $\overline{\text{SBIOS-}}$ * $\overline{\text{NATIVE}}$ * SA[16])
  + (ROMEN * $\overline{\text{VBIOS-}}$)
  + (ROMEN * NVRAMIN- * $\overline{\text{IOA8xx-}}$)

$\overline{\text{FLHWE-}}$ = ($\overline{\text{SBIOS-}}$ * $\overline{\text{MWTC-}}$ * NATIVE)
  + ($\overline{\text{VBIOS-}}$ * $\overline{\text{MWTC-}}$ * NATIVE)
  + ($\overline{\text{IOWC-}}$ * $\overline{\text{IOA8xx-}}$)

$\overline{\text{FLHOE-}}$ = ($\overline{\text{SBIOS-}}$ * NATIVE * $\overline{\text{MRDC-}}$)
  + ($\overline{\text{SBIOS-}}$ * $\overline{\text{NATIVE}}$ * $\overline{\text{MRDC-}}$ * SA[16])
  + ($\overline{\text{VBIOS-}}$ * $\overline{\text{MRDC-}}$)
  + (NVRAMIN- * $\overline{\text{IORC-}}$ * $\overline{\text{IOA8xx-}}$)

$\overline{\text{ROMCE-}}$ = (ROMEN * $\overline{\text{SBIOS-}}$ * NATIVE)
  + (ROMEN * $\overline{\text{SBIOS-}}$ * $\overline{\text{NATIVE}}$ * SA[16])
  + (ROMEN * $\overline{\text{VBIOS-}}$)
  + (ROMEN * NVRAMIN- * $\overline{\text{IOA8xx-}}$)

NVMCS- = NVRAMIN- + IOA8xx-

FLHA16 = (SA[16] * $\overline{\text{SBIOS-}}$ * NATIVE * $\overline{\text{A31-}}$)
  + ($\overline{\text{SA[16]}}$ * $\overline{\text{SBIOS-}}$ * A31-)
  + ($\overline{\text{SA[16]}}$ * $\overline{\text{SBIOS-}}$ * $\overline{\text{NATIVE}}$)
  + ($\overline{\text{SA[16]}}$ * $\overline{\text{VBIOS-}}$)
  + ($\overline{\text{SA[16]}}$ * $\overline{\text{IOA8xx-}}$)

FLHA15/14 = (SA[15/14] * $\overline{\text{SBIOS-}}$)
  + (SA[15/14] * $\overline{\text{VBIOS-}}$)
  + (SA[15/14] * $\overline{\text{IOA8xx-}}$)

FLHA[12:8] = (SA[12:8] * $\overline{\text{IOA8xx-}}$)
  + (ConfigPageRegXD[4:0] * $\overline{\text{IOA8xx-}}$)

$\overline{\text{IOA8xx-}}$ = (Addr[08xx] * $\overline{\text{AEN}}$ * $\overline{\text{IOcycle-}}$)

IOcycle- = [(IORC- * IOWC-) delayed on the rising edge]

Note: Add[08xx] indicates that bits 7:0 are "don't care"

1.1.2 X-Bus Control Logic

The X-Bus Control Logic drives the XBDIR and XBEN~ signals to control the external 74ALS245 X-Bus transceivers for all X-Bus accesses. In addition, the SLOB input pin EXTXEN~ may be used to enable the transceiver externally, for adding external, (to SLOB), X-Bus devices. It also can be used to disable SLOB's internal registers/ports if the need arises. The following will describe these functions in more detail:

1.1.2.1 X-Bus transceiver DIRection control, XBDIR

XBDIR controls the direction of the X-Bus transceivers. The default value of XBDIR is HIGH for writes to the X-Bus from the System Bus. XBDIR will go LOW only during an I/O Read cycle or a Memory Read cycle to the X-Bus. It will go LOW on the falling edge of IORC~ or MRDC~. In order to eliminate possible bus contention with the ISP or the TRANE chips, SLOB will delay XBDIR going HIGH until the next rising or falling edge of BCLK after the rising edge of the corresponding IORC~ or MRDC~.

1.1.2.2 X-Bus transceiver output ENable not, XBEN~

XBEN~ is driven low enabling the X-Bus Transceiver on Memory cycles and I/O cycles to valid X-Bus locations as decoded by SLOB. Those include all FLASH, UVPROM, and NVRAM accesses, *(see Figures 1 and 2)*, and all ports, chip selects, and registers defined below in *Table 2*. To prevent possible bus contention, XBEN~ going active, (the falling edge), will be delayed until the next rising or falling edge of BCLK after the fall of IORC~ or MRDC~. XBEN~ will go HIGH on the rising edge of MRDC~ or IORC~.

1.1.2.3 EXTernal X-Bus transceiver ENable not, EXTXEN~

Devices may be added to the X-Bus without having to add new transceivers onto the bus. This is achieved by using the EXTXEN~ function in SLOB as follows: The external device's desired address must be externally decoded. When this address is active for an I/O or Memory cycle, the EXTXEN~ input pin should be held LOW for the entire cycle. This indicates to SLOB that it should drive XBDIR and XBEN~ active for that cycle. SLOB determines the direction for XBDIR internally using IORC~, IOWC~, MRDC~, and MWTC~. When the signal EXTXEN~ is high, XBEN~ and XBDIR behave normally and only respond to SLOB X-Bus decodes.

The second feature of the EXTXEN~ pin is that it can also be used to disable internal SLOB ports and/or registers. This is achieved by externally decoding the SLOB address to be disabled. When this address is active for an I/O or Memory cycle, the EXTXEN~ input pin should be held LOW for the entire cycle. No data will be driven by SLOB onto the X-Bus, however, the transceiver control signals, XBDIR and XBEN~, will be active for that cycle. This gives the designer the capability to implement SLOB internal registers externally, (for whatever reason), without having to add further logic to control the transceivers. The table of SLOB X bus addresses follows on the next page:

| Address | Read and/or Write | Description | Relationship to SLOB |
|---|---|---|---|
| h0C00 | W only | EISA Config. Page | Internal |
| h0C80 | R + W | System ID Code | Internal |
| h0C81 | R + W | " | Internal |
| h0C82 | R + W | " | Internal |
| h0C83 | R + W | " | Internal |
| h0CA1 | R + W | PWROK Mask | Internal |
| h0CA2 | R + W | Configuration Register A | Rd Ext/Wr Int |
| h0CA3 | R + W | Configuration Register B | External |
| h0CA4 | R + W | External ROM Register | Internal |
| h0CA5 | R + W | Junk Register | Internal |
| h0CA6 | R + W | Port XX | Internal |
| h0CA7 | W only | VGA Register | External |
| h08xx | R + W | EISA Config. Memory | External |
| h0092 | R + W | Gate A20 | Internal |
| RTCALE | W only | Port 70 (RTC Index) | Internal |
| $\overline{8742\text{IN}}$ * (h0060) | R + W | Keyboard (8742) | Rd Ext/Wr Int+Ext |
| $\overline{8742\text{IN}}$ * (h0064) | R + W | " | Rd Ext/Wr Int+Ext |
| FLOPPYEN * (hx3F4/5)^ | R + W | Floppy I/O | External |
| FLOPPYEN * (hx3F2)^ | W only | " | External |
| FLOPPYEN * (hx3F7)^ | W only | " | External |
| FLOPPYEN * $\overline{\text{DACK2}}$ | R + W | Floppy DMA | External |

KEY: h = hexadecimal number
   OVERSTRIKE = signal is low
   'x' = nibble is "don't care" in the address
   "^" = Floppy addresses hx3F2/4/5/7 only decode bits SA[9:0]

TABLE 2: SLOB X Bus Map (less FLASH, NVRAM, etc.)

1.1.3 Reset Logic Block

1.1.3.1 Power-On Reset Sequence

On Power up the PORST- input will be low, PWROK will be low. RSTCPU from the EBC and RSTDRV from the ISP will be high. The POK output will be low and the BRSTDRV output will be high. The following is a description of the normal sequence of events from power on.

PORST- will go high. Sometime later, PWROK from the power supply will go high. Sixteen BCLK's later the POK output of SLOB will go high. After something like 90 BCLKs the EBC and ISP will drive RSTCPU and RSTDRV low. RSTCPU will be first, but the timing doesn't matter to SLOB. SLOB will continue to drive BRSTDRV high until BIOS clears Junk Register (h0CA5) bit 6. As soon as this bit is cleared, BRSTDRV output will go low.

In Systems with lower bay disk drives installed BIOS will set Junk Register bit 7 high so RLYPOK goes high before causing BRSTDRV to go low.

1.1.3.2 Hard Reset Sequence (SmartVu)

When the SmartVu button is depressed the debounced RSTIN- input will go low for a minimum of 100 nanoseconds. The RSTNMI output of SLOB will immediately be driven high. After approximately 10 milliseconds POK will be driven low, and one BCLK later RSTNMI will be driven back
low. POK low should cause the ISP and EBC to drive RSTCPU and RSTDRV high. This will cause BRSTDRV to go high.

Sixteen BCLKs after POK went low, it will go back high. This pulse width insures that the EBC and ISP drove RSTCPU and RSTDRV. After at least 90 BCLKs the ISP and EBC will drive RSTCPU and RSTDRV back low. BRSTDRV will immediately go back low if Junk Register bit 6 was low. This bit is reset by PORST- or PWROK so is not reset in this sequence.

1.1.3.3 Mask of FPWROK after RLYPOK HIGH

When RLYPOK is driven high, by writing a one to Junk Register bit 7, the hard drives in the lower bay will power up. This could cause glitches on the PWROK signal, so SLOB will mask that signal off to prevent it from resetting internal circuitry for a time period controlled by the Power Supply Good (PSG) Mask Register (h0CA1). This register will count down to zero using a 16 Hz clock starting when RLYPOK output goes high. (The 16Hz clock is generated in SLOB from BCLK). The default value in the PSG is h3F, which gives a 4 second time out. The value of the PSG register can be set to any value from 0 to 16 seconds. The low order bit gives 64 millisecond resolution in setting the time.

After the time-out period the PWROK signal going low will reset the registers in a normal fashion.

1.1.4 82C106 Enable Logic

The AEN82C106~ signal out of SLOB is directly connected to the AEN input of the 82C106 but is gated off under two conditions. First, I/O read and write cycles for RTC accesses, (address h0071), indexed at h38 - h3F are disabled when the password feature is enabled. Second, keyboard accesses are disabled if an external keyboard controller (80C8742) is installed.

In both cases AEN82C106~ is forced high during the I/O cycle to prevent the 82C106 from being accessed. SLOB timing ensures that the AEN82C106~ signal is set up a minimum of 55ns before the fall of IOWC~ or IORC~ in compliance with the 82C106 specification.

1.1.4.1 82C106 Password Enable

The password enable function is controlled by the Configuration Register A, bit XD[6]: PSWDEN~. On POK low, this bit is set to zero, and the password can be written. When PSWDEN~ is low, the circuitry in slob will NOT block 82C106AEN~ from going low on accesses to the RTC as described above. Once PSWDEN~ of the Configuration Register A is set high, it cannot be cleared except by POK low. When PSWDEN~ is a one, writes to address h0071 after a write to address h0070 with data patterns h38 - h3F will be disabled by SLOB holding AEN82C106~ high.

1.1.4.2 82C106 Keyboard Controller Enable

The keyboard controller enable function is controlled by bit XD[4] of the Configuration Register A, the 8742IN~ bit. On POK low, this bit is set low, (8742 installed is the default reset mode). In this mode, any access to address h0060 or h0064 will force AEN82C106~ high, disabling accesses to the 82C106 keyboard controller. The 8742IN~ bit is a true write once bit, so if it is ever written, it will retain that value until the next POK low. The value written will be set by a hard jumper on the board that must be properly set dependent on whether the 8742 is placed in the system or not. When this bit is a one, AEN82C106 is not forced high on accesses to address h0060 and h0064, so these will access the 82C106 chip.

1.1.5 Keyboard Command Block

If Junk Register bit 5, KA20CMDEN, is zero then the following I/O Writes are blocked to the 8742 and the 82C106 Keyboard Controllers:

1. Write to port h0064 with data = hD1 (A20 index)
2. Write to port h0064 with data = hFF (NOP)
3. Write to port h0060 if previous I/O Write to keyboard controller was to h0064 with data = hD1. (A20 data bit)

If K20CMDEN is one, no I/O Writes are blocked to the keyboard controllers.

This feature is used to disable accesses to the keyboard controllers when A20 is set high. When one of the three block cases is detected, the WR8742~ output goes high and is ORed externally with IOWC~ to create a KYBDWR~ signal to the 82C106 and the 8742 if installed. When WR8742WR~ is high, KYBDWR~ is prevented from going low which prevents the write from occurring. Reads are NOT blocked!

1.1.6 Gate A20 Logic (Fast Gate A20 Emulation)

The Gate A20 Logic generates the processor A20M# signal, and the 8742 port signal, KYBDA20. The A20 Mask output, A20M~, is active LOW when the following three items are all true:

1. Bit XD[1] of the Gate A20 Register, (h0092), is LOW.
2. Bit XD[4], the GA20 Bit, of the Junk Register, (h0CA5), is LOW.
3. KYBDA20 register is LOW.

The method for setting the value of the KYBDA20 register is described as follows:

An I/O write to the keyboard controller at address h0064 with the data pattern of hD1 sets a state bit in SLOB. When this state bit is set, enabling writes to the KYBDA20 register, the next I/O write to keyboard address h0060 will write KYBDA20 with the value of bit XD[1]. The state bit in SLOB is only cleared by an I/O Write to the keyboard controller at addresses h0060 OR an I/O write to address h0064 with any data pattern other than hD1.

The Gate A20 Register (h0092) bit 1 and the Junk Register (h0CA5) bit 4, GA20, can be used to disable the masking of A20. These bits are both readable and writable. Bit 1 of the Gate A20 Register is reset HIGH on RSTDRV. The GA20 bit of the Junk Register is reset HIGH on RSTCPU. The KYBDA20 register is reset HIGH on RSTDRV. All three of these registers are reset with A20M~ in the inactive state and must all be enabled with software to enable A20 masking.

1.1.7 SLOB MISCELLANEOUS FUNCTIONS

1.1.7.1 Coprocessor Error Decode

SLOB generates the outputs IGNore Numeric Error not, IGNNE~, and Numeric Error Interrupt Request (NEIRQ) based on the Floating point ERRor not input signal, FERR~, from the CPU. The following describes the functionality of these signals:

- NEIRQ: ORed externally with 4167INT to create IRQ13
- FERR~: Unmasked floating point error from the CPU
- IGNNE~: Input to CPU, when active low the processor continues executing non-control floating point instructions
- 4167INT: interrupt from the math coprocessor (4167)

On RSTCPU high           —> NEIRQ = 0 and IGNNE~ = 1

If FERR~ is inactive (high)   —> IGNNE~ = 1 and NEIRQ = 0
If FERR~ goes active (low)   —> NEIRQ = 1 setting IRQ13 = 1 also.

While FERR~ is active, (low):
        A write to port F0    —> NEIRQ = 0 clearing IRQ13 = 0 and IGNNE# = 0 active.
A rising edge of FERR~ input will deactivate the IGNNE# output (high).

NEIRQ is logic ORed externally with 4167INT from the WEITEK chip to generate IRQ13 if either input goes high.

1.1.7.2 Hard Drive Interrupt ReQuest, HDIRQ

SLOB generates the IRQ15 (secondary) and the IRQ14 (primary) interrupts based on the input HDIRQ and bits XD[2:1] of the Junk Register (h0CA5). The value on HDIRQ will be directly routed to the IRQ14 or IRQ15 when HDEN is enabled. IRQ14 is selected when HDPRIM is HIGH, and IRQ15 will be selected when HDPRIM is LOW.

- HDIRQ:       Hard Drive Interrupt ReQuest input pin to SLOB.
- HDEN:        Hard Drive ENable signal. Bit XD[1] of the Junk Register, h0CA5.
  - when LOW   —> Hard Drive Interrupts, IRQ14/15, are both disabled.
  - when HIGH   —> Hard Drive Interrupts, IRQ14 or IRQ15, are enabled dependant on HDPRIM as described below.
- HDPRIM:     Hard Drive PRIMary interrupt signal. Bit XD[2] of the Junk Register, h0CA5. This signal selects between the primary and secondary interrupts when HDEN is enabled.
  - when Low   —> Secondary Interrupt, IRQ(15), selected.
  - when High   —> Primary Interrupt, IRQ(14), selected.

1.1.7.3 82077 Floppy Verify Command Errata Workaround State Machine

There is a known, documented bug in the 82077 Floppy Controller Verify Command. (See Intel white paper, "Bus Arbitration Latency Concerns for Today's Floppy Disk Controllers in Multi-Master PC's", Stuart Mazor, Rev. 1, 1-22-90.) The Verify Command is used to verify data written onto the disk. The verify acts the same as the Read Data Command but no data is transferred to the host because DMA issues DACK2~ with no IORC~ or IOWC~. Data is read from the disk then the Cyclic Redundancy Count (CRC) bytes are computed and checked against the previously stored values. The bug involves the fact that with the FIFO enabled the 82077 will report a DMA overrun error in the result phase. This overrun error will result in an unsuccessful completion of the Verify Command. This error is caused because DACK2~ is no longer acknowledged as IOR by the 82077. The solution recommended in the white paper is to create a read (IORC~) pulse to the 82077 RD input during DMA Verify Cycles preventing the FIFO from overflowing.

There were two methods described in the white paper for detecting a Verify Command. First, the ISP State bits, ST2 and ST3, when both HIGH, will indicate a Verify Command. Second, IORC- and IOWC- both inactive for at least four BCLK periods after DACK2- goes active also indicate a Verify Command is underway.

The second approach was chosen for SLOB. Using this approach saves adding two more pins, the ISP state bits, to SLOB. A state machine was presented in the white paper that was implemented in SLOB for this bug fix. *(See Figure 3 for the Floppy State Machine Diagram.)* This state machine uses BCLK as the clock. It is reset to Idle, S0, by RSTDRV. It is kicked off by an DACK2- active, low. After the third and fourth clocks, if IORC- or IOWC- are active then it is NOT a Verify Command and the state machine will wait in state S5 until DACK2- goes inactive, HIGH, again, where it will go back to Idle. If after the fourth clock both IORC- and IOWC- are NOT active, (both are HIGH), then the state machine realizes that a Verify Command is underway. In state S7 the state machine will generate VIOR- active, LOW, for one cycle. This will clear the 82077 FIFO and prevent the overrun. The state machine will then wait three more clocks before returning to state S2. If DACK2- is still active, then it will proceed again to state S3 as described above. If DACK2- is inactive, then the state machine will return to Idle. The reason that the machine returns to state S2 after the three clocks rather than to Idle or to state S1 is because the first DMA Verify operation takes 9 BCLK cycles to complete and proceeding DMA Verify operations take only 8 BCLK cycles to complete. The reason to check for IORC- and IOWC- in both states S3 and S4 is because Type A, Type B, and ISA Write Cycles take three BCLK cycles to begin and ISA Read Cycles take four BCLK cycles. The following equation explains how VIOR- is used to generate the SLOB output, RD82077-, to the 82077 RD input:

$$\overline{RD82077\text{-}} = \overline{VIOR\text{-}} \parallel \overline{IORC\text{-}}$$

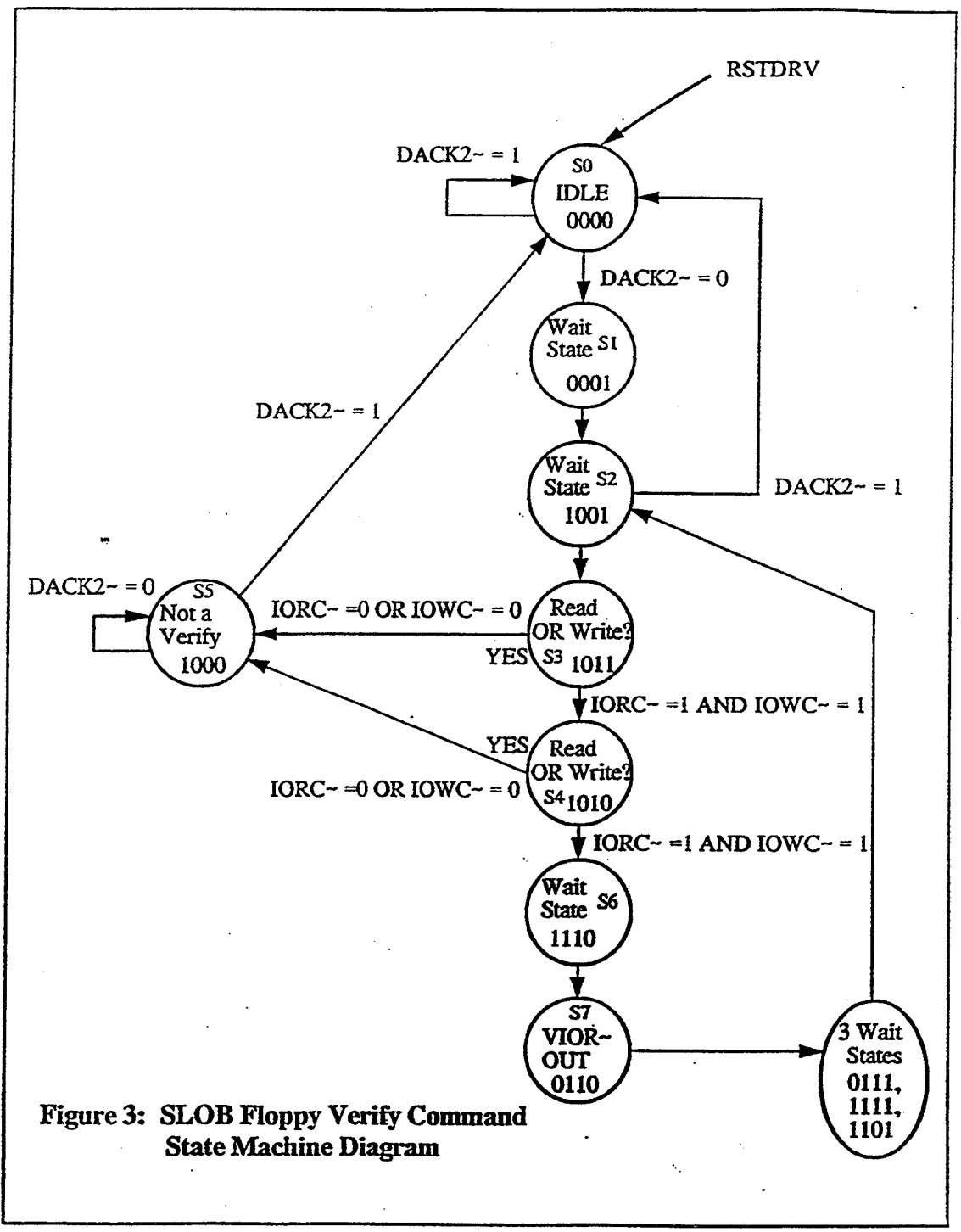
Figure 3: SLOB Floppy Verify Command State Machine Diagram

1.2 SLOB REGISTER, PORT, and CHIP SELECT DEFINITIONS

1.2.1 SLOB AT Registers and Port Decodes

- Gate A20 Register           (GA20)      h0092
- EISA Configuration Page     (ECP)       h0C00
- System EISA ID(4)           (SEI)       h0C80-h0C83
- Power Supply Good Mask      (PSG)       h0CA1
- Configuration Register A    (CRA)       h0CA2
- Configuration Register B    (CRB)       h0CA3
- External ROM Register       (ERR)       h0CA4
- Junk Register               (JR)        h0CA5
- Port XX Register            (PXX)       h0CA6
- VGA External Register       (VGA)       h0CA7
- Phantom Counter Control Reg. (PCCR)     h0CA0

1.2.2 SLOB Chip Selects

- Numerical Error Interrupt Clear  (NEIC)       h00F0
- CONFIGEN#                        (CONFIGEN#)  h0CA2, h0CA3
- VGAREG#                          (VGAREG#)    h0CA7
- EN82077#                         (EN82077#)   hx3F2, hx3F4, hx3F5, hx3F7
- EN8742#                          (EN8742#)    h0060, h0064

1.2.3 AT Bus Interface Registers

All SLOB registers and chip selects appear in the AT address space. The address in the table heading is the AT address.

1.2.3.1 Gate A20 Register (GA20): AT Address: h0092

| X X X X X X | Gate A20 | X |
|---|---|---|
| 7-2 | 1 | 0 |

The Gate A20 Register (GA20) contains the readable and writable Gate A20 bit. When this bit is a one the A20M~ (Gate A20 Mask output) is HIGH and A20 is not masked. When this bit is LOW then the A20M~ output is controlled by bit 4 of the Junk Register and the Keyboard A20 state machine. Only bit 1 is implemented. All other bits will be read as ones. Writing to bits 7-2 and 0 has no effect. On RSTDRV HIGH, this bit is set to one.

1.2.3.2 EISA Configuration Page (ECP): AT Address: h0C00

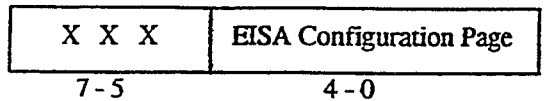

| X X X | EISA Configuration Page |
|---|---|
| 7 - 5 | 4 - 0 |

The EISA Configuration Page Register is a write only register in SLOB. This register is used to define the page during I/O accesses to NVRAM or FLASH memory. Bits [4:0] correspond to FLASH Address Bits FLHA[12:8] during I/O cycles to addresses h08xx. Only bits 4-0 are implemented. Writes to bits 5-7 will have no effect. All bits will be read as ones, (i.e. Not Readable). On RSTDRV HIGH, all bits are initialized to zeros. *(For more information on EISA Configuration, please see Section 1.1.1, "Memory Control Block".)*

1.2.3.3 System EISA ID Registers (SEI): AT Addresses: h0C80, h0C81, h0C82, h0C83

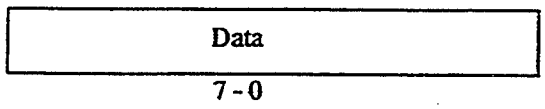

| Data |
|---|
| 7 - 0 |

The System EISA ID Registers are write once registers used to hold the EISA System ID and other information as defined by the BIOS. After the first write to one of these registers it will be read only and retain the data value of the first write to that address. These registers are set to all ones on RSTDRV high.

1.2.3.4 Power Supply Good Mask (PSG): AT Address: h0CA1

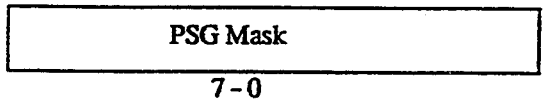

| PSG Mask |
|---|
| 7 - 0 |

The Power Supply Good Mask readable and writable register sets the time period in which the PWROK input will be ignored following a RLYPOK output of one. This prevents PWROK glitches caused by powering up the additional drives from resetting the system. The value contained in this register is the number of 64 msec periods that the PWROK input is masked. On PORST- low, this register is set to h3F which gives a time-out of 4 seconds.

1.2.3.5 Configuration Register A (CRA): AT Address: h0CA2

| Not used | PSWDEN~ | NVRAMIN~ | 8742IN~ | Not used |
|----------|---------|----------|---------|----------|
| 7 | 6 | 5 | 4 | 3 - 0 |

The Configuration Register A is a write once register in SLOB. The actual register is implemented elsewhere in the system but SLOB implements the indicated bits in order to avoid bringing them in as additional input pins. These bits are all write once after POK reset. BIOS will write this register to indicate to SLOB the system configuration. This register can be read, but it will be the external register, not SLOB, that drives the data. The external CPU Type Register has seven bits implemented. Only bits 4-1 can be read on the X-Bus in Configuration Register A bits 3-0 respectively. The external bit 0 defines the processor bus frequency. Bit 0 is set to zero for 25MHz and one for 33MHz. External bits 5 and 6 have yet to be defined. *(The CPU Types defined by bits 1-4 of the external CPU Type Register are given in Table 3 below):*

| CPU Type Chart ||
|---|---|
| CPU Type | Config. Reg. A Bits 3 - 0 |
| 486 25MHz No Cache | 0 0 0 0 |
| Not Defined yet | 0 0 0 1 |
| Not Defined yet | 0 0 1 0 |
| Not Defined yet | 0 0 1 1 |
| Not Defined yet | 0 1 0 0 |
| Not Defined yet | 0 1 0 1 |
| Not Defined yet | 0 1 1 0 |
| Not Defined yet | 0 1 1 1 |
| 486 33MHz Cache | 1 0 0 0 |
| Not Defined yet | 1 0 0 1 |
| Not Defined yet | 1 0 1 0 |
| Not Defined yet | 1 0 1 1 |
| 486 33MHz No Cache | 1 1 0 0 |
| Not Defined yet | 1 1 0 1 |
| Not Defined yet | 1 1 1 0 |
| Not Defined yet | 1 1 1 1 |

TABLE 3: Configuration Register A possible CPU Types

Bit 7 is implemented externally as CABLEIN# to indicate when lower bay drives are installed in a tower system. When CABLEIN# is zero, active, it indicates that lower bay drives are installed.

One indicates that it is a desk top system. Bits 7 and 3-0 are NOT implemented in SLOB.

PSWDEN~ ENables the PasSWord function when it is a zero, disables it when its a one. When PSWDEN~ is a one the RTC region h38-3F is blocked for I/O access in the 82C106. This bit is write once to one, but can be written many times to zero. It is reset to zero on POK, (SLOB output) low.

NVRAMIN~ determines where the EISA configuration information resides. When NVRAMIN~ is a zero it indicates that NVRAM or SRAM for EISA Configuration information is INstalled. NVRAMIN~ HIGH indicates that FLASH is installed and being used for the EISA Configuration. This bit is write once and is reset to zero with POK low.

8742IN~ low indicates that an 8742 keyboard controller is INstalled. If it is a one, the 82C106 keyboard controller is being utilized. This bit is write once and is reset to zero with POK low.

1.2.3.6 Configuration Register B (CRB): AT Address: h0CA3

| Undefined for future use |
|---|
| 7-0 |

The Configuration Register B is a readable and writable register EXTERNAL to SLOB. It is undefined for future processor configuration bits. SLOB decodes this register for the X-Bus Transceivers.

1.2.3.7 External ROM Register (ERR): AT Address: h0CA4

| PCCREN | X X X X X | ROMEN | ROMIN~ |
|---|---|---|---|
| 7 | 6-2 | 1 | 0 |

The External ROM Register contains two bits which control ROM accesses and an unrelated bit which controls access to the Phantom Counter Control Register.

ROMIN~ is not writable and will be read as the value of the ROMIN~ input pin.

The ROMEN readable and writable bit ENables either the FLASH ROM or the external ROM. A value of zero on this bit enables the FLASH ROM. A value of one enables external ROM. On POK LOW, this bit is set to the opposite of the ROMIN~ signal, that is, if ROMIN~ input is high, ROMEN bit is set low.

Bits 6-2 are not writable, and will be read as ones.

The PCCREN readable and writable bit ENables the Phantom Counter Control Register, a register used in testing internal counters. *This is described in the "Phantom Counter Control Register", Section 1.2.3.10 and the "Test/Testability Plan", Section 2.2.2.*

1.2.3.8 Junk Register (JR): AT Address: h0CA5

| RLYPOK | BRSTDRV | KA20CMDEN | GA20 | COL/MON- | HDPRIM | HDEN | FLOPPEN |
|---|---|---|---|---|---|---|---|
| 7 | 6 | 5 | 4 | 3 | 2 | 1 | 0 |

The Junk Register contains several unrelated control bits.

The FLOPPEN readable and writable bit indicates whether FLOPPy is ENabled or not. A One indicates enabled, a zero indicates disabled. FLOPPEN is cleared to zero on RSTDRV high. When FLOPPEN is high, I/O accesses to floppy addresses will cause the EN82077- pin to go low *(see EN82077- in "SLOB Chip Selects" Section 1.2.2).*

The HDEN readable and writable bit indicates whether the IDE Hard Drive interrupt is ENabled and controls the HDEN- output. When HDEN is zero, the IDE interrupt is disabled and HDEN- output is high. When HDEN is one, the IDE interrupt is enabled and HDEN- output is low. The HDEN bit is cleared to zero on RSTDRV. *(See "Hard Drive Request", Section 1.1.7.2).*

The HDPRIM readable and writable bit controls whether the IDE Hard Drive interrupt is PRIMary, IRQ[14] output, or secondary, IRQ[15] output. If HDPRIM is a one, IRQ[14] is used, if zero, IRQ[15] is used. HDPRIM is set to one on RSTDRV high. *(See "Hard Drive Request", Section 1.1.7.2).*

The COL/MON- readable and writable bit indicates whether a VGA should output COLor or MONochrome signals. A high value indicates color, a low value indicates monochrome. The COL/MON- output is controlled directly by this bit. COL/MON- is cleared to zero by RSTDRV.

The Gate A20 readable and writable bit, GA20, will disable A20M- from going low when GA20 is high. When GA20 is a zero, A20M- pin will be controlled by the Keyboard A20 state machine and the Gate A20 register bit 1. (The A20M- output is a logical OR of these three sources). GA20 is set to 1 by RSTCPU. *(See "Gate A20 Logic", Section 1.1.6).*

The KA20CMDEN readable and writable bit acts as the Keyboard A20 CoMmanD ENable. KA20CMDEN is initialized to one by RSTDRV. It is an input to the logic block which controls the WR8742- pin. When KA20CMDEN is a one, all write accesses to the 8742 are enabled (the write blocks are disabled). When KA20CMDEN is a zero the following write accesses are blocked or disabled, *(Also see "Keyboard Command Block", Section 1.1.5):*

1. Write to port h0064 with data = hD1 (A20 index)
2. Write to port h0064 with data = hFF (NOP)
3. Write to port h0060 if previous I/O Write to keyboard controller was to h0064 with data = hD1. (A20 data bit)

The BRSTDRV readable and writable bit is the BIOS controlled RSTDRV signal which controls the BRSTDRV output. When this bit is a one, the BRSTDRV output is driven to a one, resetting the system bus. When this bit is a zero the BRSTDRV output is driven to the state of the RSTDRV input signal. The BRSTDRV bit is reset to zero by PORST- or Filtered PWROK (filtered by the RLYPOK timed mask). *(See "Reset Logic Block", Section 1.1.3).*

The RLYPOK bit drives the Power OK to the ReLaYs for the lower bay hard drives directly through the SLOB output RLYPOK. When RLYPOK goes high, the relays are powered on. Also, the PWROK input is masked off for a time period controlled by the value in the PSG register to prevent glitches from the power surge. The RLYPOK bit is readable but only writable once to one. It is reset to 0 by PORST- or filtered PWROK (filtered by the RLYPOK timed mask). *(See "Reset Logic Block", Section 1.1.3).*

1.2.3.9 Port XX Register (PXX): AT Address: h0CA6

| FLSHBIT | MIRQEN- | HWRSTEN- | NATIVE | FLHPRG | VOL1 | VOL0 | RSTNMI- |
|---------|---------|----------|--------|--------|------|------|---------|
| 7       | 6       | 5        | 4      | 3      | 2    | 1    | 0       |

The Port XX register contains several miscellaneous unrelated control bits.

RSTNMI- is a read only bit reflecting the state of the RSTIN- SLOB input pin.

VOL0 and VOL1 directly go to SLOB output pins that control the speaker volume. On RSTDRV they are both cleared low. VOL0 and VOL1 are both readable and writable.

FLHPRG enables FLASH erase and PRoGramming when high. It directly drives the FLHPRG output pin from SLOB. It is cleared low by POK low. FLHPRG is readable and writable. *(See "Memory Control Block", Section 1.1.1).*

The NATIVE readable and writable bit, when high, places the Memory Mapping into NATIVE mode. When NATIVE is zero, then the mapping is in Non-Native Mode. *(See "Memory Control Block", Section 1.1.1).* The NATIVE bit is reset high on POK (output) low.

The HWRSTEN- readable and writable bit is the HardWaRe ReSeT ENable. It enables the Smart-VU debounced SLOB input, RSTIN-. A value of 0 enables RSTIN- and a value of 1 disables RSTIN-. This bit is cleared low on RSTDRV high. *(See "Reset Logic Block", Section 1.1.3).*

The MIRQEN- readable and writable bit directly controls the MIRQEN- output, which is the Mouse Interrupt ReQuest ENable. When MIRQEN- is low, the mouse interrupt is enabled (external to SLOB). When MIRQEN- is high, the mouse interrupt is disabled. MIRQEN- is reset low by RSTDRV.

The FLSHBIT readable and writable bit directly drives the FLSHBIT output of SLOB. When the FLSHBIT is one, the cache will be FLuSHed. The FLSHBIT bit is reset low by RSTDRV.

1.2.3.10 VGA External Register (VGA): AT Address: h0CA7

| Not Used | SLVACTEN | VIRQEN | VGARST- | VEN |
|----------|----------|--------|---------|-----|
| 7 - 4    | 3        | 2      | 1       | 0   |

The VGA Register is a write only register that is completely external to SLOB. SLOB only implements this register chip select, VGAREGWR-, and enables the X-Bus Transceivers (for writes only). (The pin description is for reference only.) These bits will all be initialized to zeroes with POK externally. If read, this register will always be read as hFF.

SLVACTEN controls whether the IDE interrupt is masked or active. Zero is masked.

VIRQEN controls whether VGA IRQ(9) is enabled or disabled. Zero is disabled

VGARST- is the VGA ReSeT; zero is reset one is inactive.

VEN is VGA ENable, zero is disabled, one is enabled.

1.2.3.11 Phantom Counter Control Register (PCCR): AT Address: h0CA0

| Control bits |
|--------------|
| 7-0          |

This is a write only register used for testing the time-out counters internal to SLOB. It can only be written when the PCCREN bit of the External ROM Register (h0CA4 bit 7) is a one and the TESTMODE- input is a zero. The seven bits in this register enable different stages of the counters. When the control bit is a zero, that stage in the counter is skipped, and the carry in to the low order bit of the stage is passed to the carry out of the high order bit of the stage. When the control bit is a one, that stage in the counter is enabled and functions normally. On PORST- low, the PCCR is set to hFF.

Bit 0 controls the lower 4 bits of the 13 bit continuous roll-over counter. Bit 1 controls the middle 4 bits of the 13 bit continuous roll-over counter. Bit 2 controls the high 5 bits of the 13 bit continuous roll-over counter. Bit 3 controls the 4 bit POK delay counter. Bit 4 controls the low three bits of the 6 bit FPWROK counter. Bit 5 controls the high 3 bits of the FPWROK counter. Bit 6 controls the low 4 bits of the 8 bit FPWROK counter. Bit 7 controls the high 4 bits of the 8 bit FPWROK counter. *(See "Counter Test Mode", Section 2.0.3.3, for a functional description).*

1.2.4 SLOB Chip Selects

All SLOB registers and chip selects appear in the AT address space. The address in the table heading is the AT address. Chip selects are defined here as I/O accesses to certain address ranges with certain data patterns which perform some function in SLOB.

1.2.4.1 Numerical Error Interrupt Clear (NEIC): AT Address: h00F0

This is not a true chip select, however, it does clear the IRQ[13] after a floating point error has occurred and activates the IGNNE~ signal. A write to this address with any data pattern will set the IGNNE~ output active (low) and the NEIRQ output inactive (low). (The IGNNE~ output is set high when the FERR~ input is high.) *(See "Coprocessor Error Decode", Section 1.1.7.1).*

1.2.4.2 Configuration Register Enable (CONFIGEN~): AT Address: h0CA2, h0CA3

An I/O read or write to either address with any data pattern will cause the CONFIGEN~ output to go active low. The X-Bus Transceivers will also respond.

1.2.4.3 VGA Register Write Enable (VGAREG~): AT Address: h0CA7

An I/O write (reads not supported) to this address with any data will cause the VGAREG~ output to go active low. The X-Bus Transceivers will also respond.

1.2.4.4 82077 Floppy Controller Enable (EN82077~): AT Address: hx3F2, hx3F4, hx3F5, hx3F7

When the FLOPPEN bit (Junk Register bit 0) is high, I/O reads to address hx3F4 and hx3F5 and writes to addresses hx3F2, hx3F4, hx3F5 and hx3F7 will cause the EN82077~ pin to go active low. The 'x' in the addresses indicates that address bits SA[15:10] are not decoded. The X-Bus Transceivers will also respond. *(See "X-Bus Control Logic", Section 1.1.2).*

1.2.4.5 8742 Keyboard Controller Enable (EN8742~): AT Address: h0060, h0064

An I/O read or write to either address with any data pattern will cause the EN8742~ pin to go active low. The X-Bus Transceiver will also respond.

2.0 SIMULATION AND VERIFICATION PLAN

2.0.1 SLOB Design Simulation and Verification

Due to the schedule constraints with the SLOB design, there will be no advanced system level simulation techniques employed in the SLOB simulation and verification plan. The test program will be developed using a structured framework at a very high level. A set of test cycles will be created that will drive all of the SLOB functional cycles. When the individual blocks of the SLOB tests are pulled together, this test framework and these test cycles will be used to verify the designs as well as be utilized for the VLSI Technology, Inc. production test program.

2.0.2 SLOB Production Test Program and Fault Grading Plan

The VLSI Technology Inc. production test program will be developed starting with the Test Framework and Cycles described in the Simulation Plan above. As fault grading on the MACH 1500 progresses, more Cycles and FunctionTests will be added if necessary. The engineers must work together early in the test development phase to format their test programs within the Framework using the same Timing Generators and Cycles. This test program will be released to VLSI Technology Inc. at chip release time.

2.0.3 Test/Testability Plan

The SLOB chip will feature two testability modes and provisions for testing internal counters. The two test modes are:

1. Tri-state Mode - All outputs tri-stated
2. In-Circuit Test Mode (ICT) - Direct path flow through from inputs to outputs
3. Counter Test Mode - Internal breakup of counter for verification Built in self test and/or scan path testing were not considered for SLOB due to the tight schedule and low complexity and high modularity of the SLOB logic.

All test modes are controlled by the TESTMODE- input. For normal operation this input will be pulled up to a one on the planar.

2.0.3.1 Tri-state Test Mode

To enter the first test mode, Tri-state Mode, the TESTMODE- input should be driven low. While TESTMODE- is low, all outputs will then be tri-stated.

2.0.3.2 In-Circuit Test Mode (ICT)

To enter the second test mode, ICT Mode, the TESTMODE- input should be held low and latched with the rising edge of PWROK. On the following rising edge of TESTMODE-, SLOB will enter the ICT Mode and map all input pins to output pins as *shown in Table 4*. Whenever TESTMODE- is low, the outputs remain tri-stated. PORST- low will release the ICT Mode by clearing the TESTMODE- latch.

In the ICT Mode, the tester can verify continuity by driving the SLOB inputs and observing changes on the SLOB outputs. Note that since PORST- is used to reset the ICT Mode, the PORST- input and its corresponding output, VOL0, cannot be tested in this manner. PWROK to HDEN- cannot be tested either, due to the fact that a rising edge on PWROK will latch TESTMODE- high which will disable the flow-through test mode

SLOB FLOW THROUGH MODE
Input -> Output Mapping

| INPUT | -> | OUTPUT |
|---|---|---|
| ROMADR- | -> | VOL1 |
| LA31- | -> | MIRQEN |
| RSTCPU | -> | IRQ15 |
| AEN | -> | NEIRQ |
| RSTDRV | -> | POK |
| RTCALE | -> | RSTNMI |
| SA[0] | -> | FLSHBIT |
| SA[1] | -> | RLYPOK |
| SA[2] | -> | ROMCE- |
| SA[3] | -> | FLHPRG |
| SA[4] | -> | FLHCE- |
| SA[5] | -> | FLHOE- |
| SA[6] | -> | FLHWE- |
| SA[7] | -> | KYBA20 |
| SA[12:8] | -> | FLHA[12:8] |
| SA[13] | -> | COL/MON- |
| SA[16:14] | -> | FLHA[16:14] |
| BALE | -> | WR8742- |
| DACK2- | -> | CS8742- |
| IORC- | -> | AEN82C106- |
| IOWC- | -> | CONFIGEN- |
| BCLK | -> | BRSTDRV |
| MRDC- | -> | XBDIR |
| MWTC- | -> | XBEN- |
| XD[3:0] | -> | XD[7:4] |
| VBIOS- | -> | VGAREGWR- |
| ROMIN- | -> | NVMCS- |
| RSTIN- | -> | EN82077- |
| EXTXEN- | -> | RD82077- |
| HDIRQ | -> | IRQ14 |
| PWROK | -> | HDEN- |
| FERR- | -> | A20M- |
| TMODE- | -> | IGNNE- |

Table 4: SLOB Flow Through Mapping

2.0.3.3 Counter Test Mode

In order to test the internal counters of slob without waiting for long time-outs, the Phantom Counter Control Register, (PCCR), is used. Each bit of this register controls one stage of the SLOB time-out counters *as described in the PCCR Register Description, Section 1.2.3.11*. In order to write to this register, one must first set the PCCREN bit, (External ROM Register, (ERR), bit 7), to a one. Then the TESTMODE~ input must be driven low. Then I/O write cycles may be performed to the PCCR register at address h0C00.

The method for testing the counters is to disable all but one stage of the counter and then initiate one of the two time-outs and observe the period of the timeout. The first time-out is RSTIN~ to POK low and the second is RLYPOK to PWROK not masked. After verifying each stage, disable the current stage and enable the next stage and repeat the test. In this way each stage of the counter can be shown to be working without waiting for the full time-out each time. *(Figure 4 shows which counter stages control which functions)*. The subscript numbers indicate how many bits are in each stage of the counters. The internal numbers indicate which bit in the PCCR controls that stage of the counter

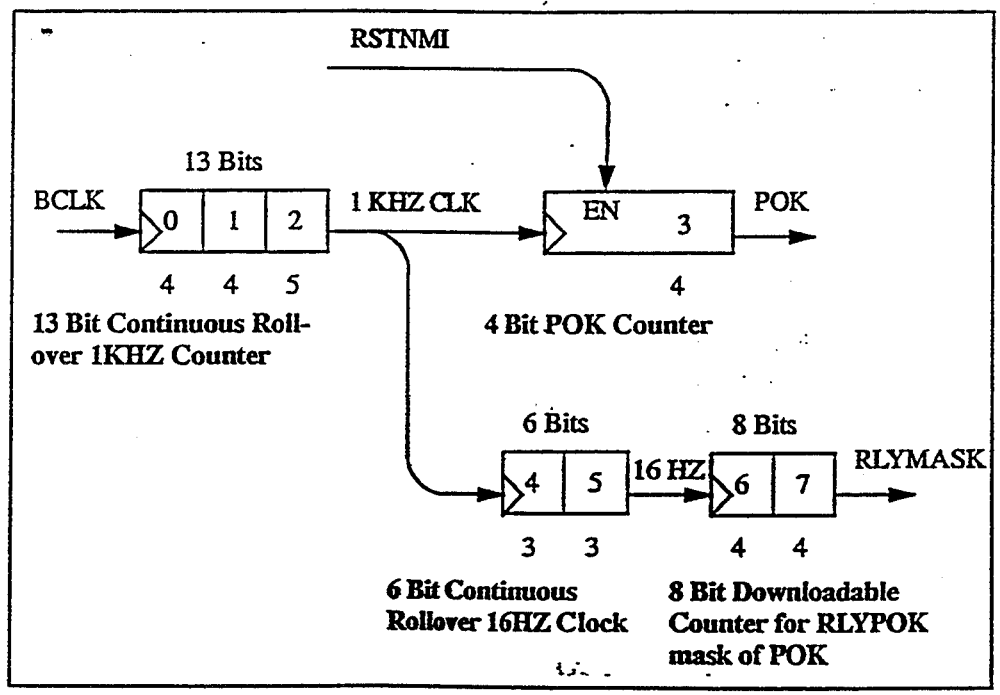

Figure 4: Counter Stages

3.0 SLOB BRINGUP and HARDWARE VERIFICATION PLAN

3.1 Hardware Verification Procedure 3.1.1 ROM Reads
1. Boot from ROM
2. In Native Mode, read all locations of ROM in all three regions: BOOT, VBIOS, SBIOS and in all three ROM mapping regions: 4G, 16M, 1M.
3. Repeat 2. in NON-Native Mode.

3.1.2 Verify SMARTVU operation 3.1.3 NVRAM Read and Writes (EISA Configuration)
1. Perform I/O Reads and Writes to all NVRAM locations in all three regions, mappings and both modes as described in ROM Reads, Section 3.1.1 above.
2. Perform Memory Reads and Writes to all NVRAM locations in 4G, HIGH BIOS, region only.

3.1.4 I/O Port Reads and Writes
1. Read all SLOB registers to verify initialized, reset states
2. Write and Read all SLOB ports and registers.

3.1.5 Verify 82C106AEN
1. Reads and Writes to RTC, (h38-h3F), should be enabled (when password is disabled)
2. Write a '1' to port h0CA2 bit XD[6] to disable password
3. Reads and Writes to RTC should be disabled (when password is enabled)
4. Reads and Writes to 8742 should be disabled to the C105
5. Remove 8742 jumper form board
6. Reads and Writes to 8742 should NOT be disabled to the 82C106.

3.1.6 Verify Coprocessor Error Decode
1. Install 4167 Math Coprocessor
2. Create Floating Point Error (divide by 0) -> IRQ[13] goes active.
3. Write to port h00F0 -> IRQ[13] goes inactive and IGNEE- goes active.
4. Floating Point Error goes inactive -> IGNNE- goes inactive.

3.1.7 Verify HD IRQ
1. Enable IRQ[14] and IRQ[15] with HDIRQ
2. Select between Primary and Secondary IRQs.

3.1.8 Verify 82077 Floppy Controller bug fix
1. Enable 82077 FIFO
2. Execute 82077 DMA Verify commands back to back
3. Execute the following I/O cycles types to the Floppy: three and four BCLK Type A and B ISA Reads/Writes.

3.1.9 Reset Test
1. Hit SmartVU Reset Button
2. Ignore NMI
3. Hit SmartVU Reset Button 4. Respond to NMI
5. Hit SmartVU Reset Button
6. Respond to NMI but disable reset prior to POK going active.

3.1.10 Verify 8742 keyboard write command block

3.1.11 Verify Fast Gate A20 Logic

3.1.12 Verify FLASH with NVRAM
1. Replace ROM With 128k FLASH
2. Same Read test executed in ROM Reads, Section 3.1.1 above.
3. Erase, Write, and Read all three sectors of FLASH, in all three mapping modes in Native Mode: 4G, 16M, 1M.
4. Repeat NVRAM verification as in Section 3.1.3 above.
5. Remove 8k Boot protection jumper.
6. Erase, Write, and Read 8k Boot region in Native 4G Mode only.

3.1.13 Verify FLASH without NVRAM
1. Remove shunt to disable NVRAM.
2. Same Read test executed for the ROM in Section 3.1.1 above.
3. Erase, Write, and Read all three sectors of FLASH, in all three Native mapping modes: 4G, 16M, and 1M.
4. Write only EISA Config, sectors 2 and 3, in all of the following modes: (NON-Native): 4G, 16M, 1M.

3.1.14 Verify External X-Bus Enable (no additional BIOS necessary for this test)
1. Single step mode
2. Set EXTXEN- pin and watch on scope

3.1.15 Verify RLYPOK operation (Reset)
1. Add an AND gate With RLYPOK and a clk like BCLK.
2. OR this result with PWROK and drive that into the SLOB PWROK input pin.
3. Observe time between resets.

4.0 MISCELLANEOUS SLOB INFORMATION

4.1 SLOB PIN LIST DESCRIPTION

4.1.1 AT bus interface          36 pins

- SA[16:0], INPUT, 17 bit ISA System Address bus
- XD[7:0], BIDI, 8 bit X Data bus
- AEN, INPUT, ISA Address ENable
- IOWC~, INPUT, ISA I/O Write Control signal
- IORC~, INPUT, ISA I/O Read Control signal
- BCLK, INPUT, 8 MHz ISA System Clock
- MRDC~, INPUT, ISA Memory ReaD Control signal
- MWTC~, INPUT, ISA Memory WriTe Control signal
- DACK2~, INPUT, DMA aCKnowledge signal
- BALE, INPUT, Bus Address Latch Enable
- XBDIR, OUTPUT, X Bus DIRection control
- XBEN~, OUTPUT, X Bus buffer ENable
- LA31~, INPUT, Latched Address 31

4.1.2 FLASH ROM interface      13 pins

- FLHA[16:14], OUTPUT, High order address bits to FLASH ROM
- FLHA[12:8], OUTPUT, Low order address bits to FLASH ROM
- FLHPRG, OUTPUT, FLASH ROM PRoGram control signal
- FLHCE~, OUTPUT, FLASH ROM Chip Enable control signal
- FLHOE~, OUTPUT, FLASH ROM Output Enable control signal
- FLHWE~, OUTPUT, FLASH ROM Write Enable control signal
- ROMIN~, INPUT, low if external 128K ROM is installed

4.1.3 RESET Logic              9 pins

- RSTCPU, INPUT, Reset Input from EBC
- RSTDRV, INPUT, Reset Input from ISP
- RSTIN~, INPUT, Debounced Reset Input from SmartVu push button
- PORST~, INPUT, Power On ReSeT from RC network
- PWROK, INPUT, PoWeR OK input from power supply
- BRSTDRV, OUTPUT, BIOS controlled RSTDRV output
- RLYPOK, OUTPUT, ReLaY Power OK output to lower bay disk drives
- RSTNMI, OUTPUT, ReSeT Non Maskable Interrupt to CPU
- POK, OUTPUT, Power OK to TRANE and EBC

4.1.4 Miscellaneous Logic    42 pins

- EXTXEN~, INPUT, EXTernal X-Bus ENable
- ROMADR~, INPUT, ROM ADdRess from TRANE
- VBIOS~, INPUT, Video BIOS
- HDIRQ, INPUT, Hard Disk Interrupt ReQuest
- FERR~, INPUT, Floating point ERRor
- TESTMODE~, INPUT, TEST Mode
- RTCALE, INPUT,
- VOL0, OUTPUT, speaker VOLume control bit 0
- VOL1, OUTPUT, speaker VOLume control bit 1
- MIRQEN, OUTPUT, Mask Interrupt ReQuest ENable
- IRQ14, OUTPUT, Interrupt ReQuest 14
- IRQ15, OUTPUT, Interrupt ReQuest 15
- NEIRQ, OUTPUT, Numeric Error Interrupt ReQuest
- IGNNE~, OUTPUT, IGNore Numeric Error
- FLSHBIT, OUTPUT, cache FLuSH BIT to TRANE
- ROMCE~, OUTPUT, 128K ROM Chip Enable
- KYBA20, OUTPUT, KeYBoard controller masks A20 control
- COL_MON~, OUTPUT, COLor or MONochrome control
- WR8742~, OUTPUT, WRite control for 8742 (Keyboard Controller)
- CS8742~, OUTPUT, Chip Select for 8742 (Keyboard Controller)
- AEN82C106~, OUTPUT
- CONFIGEN~, OUTPUT
- VGAREGWR~, OUTPUT, VGA REGister WRite
- NVMCS~, OUTPUT, Non Volatile Memory Chip Select
- EN82077~, OUTPUT, ENable 82077 (Floppy Controller)
- RD82077~, OUTPUT, ReaD 82077 (Floppy Controller)
- HDEN~, OUTPUT, Hard Disk ENable
- A20M~, OUTPUT, A20 Mask
- VSS, 8 pins.
- VDD, 6 pins.

4.1.5 Total number of SLOB Pins:    100 pins

*(See Figure 5, (next 3 pages), for the SLOB Pin List, aka: "VLSI Technology Inc. Pad Placement File".)*

Figure 5: SLOB Pin Placement File

```
#cell2 * slob_ppf txt * 6 any 0 v8r1.6
# "9-Nov-90 GMT" "16:52:15 GMT" "9-Nov-90 GMT" "16:52:15 GMT" kocis *
VGT200017
   PAD PLACEMENT FORM Page 1 of 3

Customer Project Name   SLOB      Customer Part Number    22183
                        -------                           --------
VLSI Project Name DSLOB VLSI Part Number G8001-4066 Date 11/09/90
                  -----                  ----------      --------
```

| SIGNAL NAME | PKG PIN # | DIE PAD # | INPUTS CMOS | TTL | SCH | PR UE IM ID | H I - S D | S L D | OUTPUTS TS HT RA ET EE | BD II RE TC | OD PR EA NI N | MACRO NAME |
|---|---|---|---|---|---|---|---|---|---|---|---|---|
|  |  | # 1 |  |  |  | ********** VSSE ONLY ********** |  |  |  |  |  |  |
| VSSI | 28 | # 2 |  |  |  |  |  |  |  |  |  | PC6VS1 |
| VSSE | 27 | # 3 |  |  |  |  |  |  |  |  |  | PC6VS2 |
| IRQ14 | 26 | # 4 |  |  |  |  |  |  | X |  |  | PT6002 |
| IRQ15 | 25 | # 5 |  |  |  |  |  |  | X |  |  | PT6002 |
| RSTCPU | 24 | # 6 |  | X |  |  |  |  |  |  |  | PC6D00 |
| AEN | 23 | # 7 |  | X |  |  |  |  |  |  |  | PC6D00 |
| RSTDRV | 22 | # 8 |  | X |  |  |  |  |  |  |  | PC6D00 |
| RTCALE | 21 | # 9 |  | X |  |  |  |  |  |  |  | PC6D00 |
| RSTNMI | 20 | # 10 |  |  |  |  |  |  | X |  |  | PT6002 |
| SA[0] | 19 | # 11 |  | X |  |  |  |  |  |  |  | PC6D00 |
|  |  | # 12 |  |  |  |  |  |  |  |  |  |  |
| SA[1] | 18 | # 13 |  | X |  |  |  |  |  |  |  | PC6D00 |
| SA[2] | 17 | # 14 |  | X |  |  |  |  |  |  |  | PC6D00 |
| SA[3] | 16 | # 15 |  | X |  |  |  |  |  |  |  | PC6D00 |
| SA[4] | 15 | # 16 |  | X |  |  |  |  |  |  |  | PC6D00 |
| SA[5] | 14 | # 17 |  | X |  |  |  |  |  |  |  | PC6D00 |
| SA[6] | 13 | # 18 |  | X |  |  |  |  |  |  |  | PC6D00 |
|  |  | # 19 |  |  |  |  |  |  |  |  |  |  |
| SA[7] | 12 | # 20 |  | X |  |  |  |  |  |  |  | PC6D00 |
| SA[8] | 11 | # 21 |  | X |  |  |  |  |  |  |  | PC6D00 |
| SA[9] | 10 | # 22 |  | X |  |  |  |  |  |  |  | PC6D00 |
| SA[10] | 9 | # 23 |  | X |  |  |  |  |  |  |  | PC6D00 |
| SA[11] | 8 | # 24 |  | X |  |  |  |  |  |  |  | PC6D00 |
| SA[12] | 7 | # 25 |  | X |  |  |  |  |  |  |  | PC6D00 |
| SA[13] | 6 | # 26 |  | X |  |  |  |  |  |  |  | PC6D00 |
| SA[14] | 5 | # 27 |  | X |  |  |  |  |  |  |  | PC6D00 |
| VDDE | 4 | # 28 |  |  |  |  |  |  |  |  |  | PC6VD2 |
| SA[15] | 3 | # 29 |  | X |  |  |  |  |  |  |  | PC6D00 |
|  |  | # 30 | ********** VDDE ONLY ********** |  |  |  |  |  |  |  |  |  |
|  |  | # 31 | ********** VDDI ONLY ********** |  |  |  |  |  |  |  |  |  |
| VDDI | 2 | # 32 |  |  |  |  |  |  |  |  |  | PC6VD1 |
| SA[16] | 1 | # 33 |  | X |  |  |  |  |  |  |  | PC6D00 |
|  |  | # 34 |  |  |  |  |  |  |  |  |  |  |
|  |  | # 35 |  |  |  |  |  |  |  |  |  |  |
| BALE | 100 | # 36 |  | X |  |  |  |  |  |  |  | PC6D00 |
| DACK2- | 99 | # 37 |  | X |  |  |  |  |  |  |  | PC6D00 |
| IORC- | 98 | # 38 |  | X |  |  |  |  |  |  |  | PC6D00 |
| IOWC- | 97 | # 39 |  | X |  |  |  |  |  |  |  | PC6D00 |
| BCLK | 96 | # 40 |  | X |  |  |  |  |  |  |  | PC6D00 |

Figure 5 (cont.): SLOB Pin Placement File

PAD PLACEMENT FORM Page 2 of 3

| SIGNAL NAME | PKG PIN # | DIE PAD # | INPUTS C M O S | INPUTS T T L | INPUTS S C H M T | INPUTS P R U E + S I P D | INPUTS R E S L D | INPUTS H O L D | INPUTS S T D | OUTPUTS T S H T R A E T E E | OUTPUTS B D I I R E C | OUTPUTS O D P R E A I N | D N I N | MACRO NAME |
|---|---|---|---|---|---|---|---|---|---|---|---|---|---|---|
| DDI | 95 | # 41 | | | | | | | | | | | | PC6VD1 |
| RSTDRV | 94 | # 42 | | | | | | | | X | | | | PT6002 |
| RDC- | 93 | # 43 | | X | | | | | | | | | | PC6DC0 |
| WTC- | 92 | # 44 | | X | | | | | | | | | | PC6D00 |
| D[0] | 91 | # 45 | | | | | | | | | X | | | PT6042 |
| D[1] | 90 | # 46 | | | | | | | | | X | | | PT6042 |
| D[2] | 89 | # 47 | | | | | | | | | X | | | PT6042 |
| D[3] | 88 | # 48 | | | | | | | | | X | | | PT6042 |
| SSE | 87 | # 49 | | | | | | | | | | | | PC6VS2 |
| D[4] | 86 | # 50 | | | | | | | | | X | | | PT6042 |
| D[5] | 85 | # 51 | | | | | | | | | X | | | PT6042 |
| D[6] | 84 | # 52 | | | | | | | | | X | | | PT6042 |
| D[7] | 83 | # 53 | | | | | | | | | X | | | PT6042 |
| BEN- | 82 | # 54 | | | | | | | | X | | | | PT6002 |
| BDIR | 81 | # 55 | | | | | | | | X | | | | PT6002 |
| | | # 56 | | | | | | | | | | | | |
| | | # 57 | | | | | | | | | | | | |
| BIOS- | 80 | # 58 | | X | | | | | | | | | | PC6D0C |
| SSI | 79 | # 59 | | | | | | | | | | | | PC6VS1 |
| | | # 60 | ············ VSSI ONLY ············ | | | | | | | | | | | |
| | | # 61 | ············ VSSE ONLY ············ | | | | | | | | | | | |
| GAREGWR- | 78 | # 62 | | | | | | | | X | | | | PT6002 |
| SSE | 77 | # 63 | | | | | | | | | | | | PC6VS2 |
| ONFIGEN- | 76 | # 64 | | | | | | | | X | | | | PT6002 |
| EN82C106- | 75 | # 65 | | | | | | | | X | | | | PT6002 |
| S8742- | 74 | # 66 | | | | | | | | X | | | | PT6002 |
| R8742- | 73 | # 67 | | | | | | | | X | | | | PT6002 |
| OL_MON- | 72 | # 68 | | | | | | | | X | | | | PT6002 |
| YBA20 | 71 | # 69 | | | | | | | | X | | | | PT6002 |
| DDE | 70 | # 70 | | | | | | | | | | | | PC6VD2 |
| SSE | 69 | # 71 | | | | | | | | | | | | PC6VS2 |
| | | # 72 | | | | | | | | | | | | |
| LHA[16] | 68 | # 73 | | | | | | | | X | | | | PT6002 |
| LHA[15] | 67 | # 74 | | | | | | | | X | | | | PT6002 |
| LHA[14] | 66 | # 75 | | | | | | | | X | | | | PT6002 |
| LHA[12] | 65 | # 76 | | | | | | | | X | | | | PT6002 |
| LHA[11] | 64 | # 77 | | | | | | | | X | | | | PT6002 |
| LHA[10] | 63 | # 78 | | | | | | | | X | | | | PT6002 |
| | | # 79 | | | | | | | | | | | | |
| LHA[9] | 62 | # 80 | | | | | | | | X | | | | PT6002 |
| SSE | 61 | # 81 | | | | | | | | | | | | PC6VS2 |
| LHA[8] | 60 | # 82 | | | | | | | | X | | | | PT6002 |
| LHWE- | 59 | # 83 | | | 1 | | | | | X | | | | PT6002 |
| LHOE- | 58 | # 84 | | | | | | | | X | | | | PT6002 |
| LHCE- | 57 | # 85 | | | | | | | | X | | | | PT6002 |

Figure 5 (cont.): SLOB Pin Placement File

PAD PLACEMENT FORM Page 3 of 3

| SIGNAL NAME | PKG PIN # | DIE PAD # | \multicolumn{7}{c}{FUNCTION INPUTS} | \multicolumn{5}{c}{OUTPUTS} | MACRO NAME |
|---|---|---|---|---|---|---|---|---|---|---|---|---|---|---|
| | | | C M O S | T T L | S C H M T | P R U E +S P D | H O L D | S T D | T S H T R A E T E E | S B T I R E C | B D I R E | O P R E A N I N | |
| LHPRG | 56 | # 86 | | | | | | | X | | | | PT6002 |
| OMCE- | 55 | # 87 | | | | | | | X | | | | PT6002 |
| DDE | 54 | # 88 | | | | | | | | | | | PC6VD2 |
| DDI | 53 | # 89 | | | | | | | | | | | PC6VD1 |
| | | # 90 | \multicolumn{11}{c}{••••••••••• VDDE ONLY •••••••••••} | |
| | | # 91 | \multicolumn{11}{c}{••••••••••• VDDI ONLY •••••••••••} | |
| OMIN- | 52 | # 92 | | X | | | | | | | | | PC6D00 |
| VMCS- | 51 | # 93 | | | | | | | X | | | | PT6002 |
| | | # 94 | | | | | | | | | | | |
| | | # 95 | | | | | | | | | | | |
| D82077- | 50 | # 96 | | | | | | | X | | | | PT6002 |
| N82077- | 49 | # 97 | | | | | | | X | | | | PT6002 |
| STIN- | 48 | # 98 | | | X | | | | | | | | PC6D00 |
| XTXEN- | 47 | # 99 | | X | | | | | | | | | PC6D00 |
| DIRQ | 46 | # 100 | | X | | | | | | | | | PC6D00 |
| EIRQ | 45 | # 101 | | | | | | | X | | | | PT6002 |
| IRQEN | 44 | # 102 | | | | | | | X | | | | PT6002 |
| DEN- | 43 | # 103 | | | | | | | X | | | | PT6002 |
| OL1 | 42 | # 104 | | | | | | | X | | | | PT6002 |
| OL0 | 41 | # 105 | | | | | | | X | | | | PT6002 |
| SSI | 40 | # 106 | | | | | | | | | | | PC6VS1 |
| WROK | 39 | # 107 | | | X | | | | | | | | PC6D00 |
| ORST- | 38 | # 108 | | | X | | | | | | | | PC6D00 |
| OK | 37 | # 109 | | | | | | | X | | | | PT6002 |
| LYPOK | 36 | # 110 | | | | | | | X | | | | PT6002 |
| LSHBIT | 35 | # 111 | | | | | | | X | | | | PT6002 |
| GNNE- | 34 | # 112 | | | | | | | X | | | | PT6002 |
| 20M- | 33 | # 113 | | | | | | | X | | | | PT6002 |
| ERR- | 32 | # 114 | | X | | | | | | | | | PC6D00 |
| TESTMODE- | 31 | # 115 | | X | | | | | | | | | PC6D00 |
| | | # 116 | | | | | | | | | | | |
| | | # 117 | | | | | | | | | | | |
| OMADR- | 30 | # 118 | | X | | | | | | | | | PC6D00 |
| A31- | 29 | # 119 | | X | | | | | | | | | PC6D00 |
| | | # 120 | \multicolumn{11}{c}{••••••••••• VSSI ONLY •••••••••••} | |

4.2 CLOCK FREQUENCY

The SLOB chip has internal state machines which will run off the AT Bus CLocK. This clock will be running at 8 MHz.

4.3 TECHNOLOGY SELECTION

4.3.1 Package Selection

SLOB will fit into a 100 pin PQFP package. This will be the production package unless further functionality is added. SLOB fit into the VGT200017 gate array base, and utilized 2470 gates.

4.3.2 Technology Selection

SLOB will be fabricated using 1.5 micron double layer metal CMOS technology. The speed of this process should be easily fast enough for the functionality of this chip.

4.3.3 Vendor Selection

VLSI Technology Inc., (VTI), was selected on the basis of minimal risk. The Dell VLSI Design Group is most familiar with the VTI tools and library, and has never before done a chip with another vendor.

4.3.4 Power Calculations

*(Please reference Figure 6 (next page) the preliminary "VTI POWER CALCULATIONS WORKSHEET", for a full explanation of the calculation).* The maximum power consumption for SLOB should be 252 mW. This translates to a current of 57 mA at 4.75 volts.

Figure 6: VLSI Power Calculations Worksheet cell2 * pcalc txt * 1 any 1024 v8r1.6; AS Beta 17-Sep-90
"17-Nov-58 GMT" "8:00:00 GMT" "17-Nov-58 GMT" "8:00:00 GMT" deanh * .
    AC/DC SPECIFICATION FORM   Page 1 of 3

Project Name   SLOB         Customer Part Number 22183

VLSI Part Number G8001-4066  Date 11/15/90

| | | |
|---|---|---|
| VGT200 SERIEW MILLIWATTS/GATE | P = 0.015 mW/MHZ/GATE | |
| AVG. OPERATING FREQUENCY (F) | F = 8.33 | MHZ |
| EST. FRACTION OF GATES SWITCHING SIMULTANEOUSLY (TYPICALLY 0.20) | S = 0.20 | |
| AMBIENT OPERATING TEMPERATURE | TA = 45 | C |
| NUMBER OF GATES | G = 2403 | |
| NUMBER OF OUTPUT PINS | B = 47 | |
| AVG. OUTPUT LOAD CAPACITANCE | C = 70 | |
| INTERNAL POWER DISSIPATION PINT = P * F * S * G | PINT = 60.05 | mW |
| EXTERNAL POWER DISSIPATION PEXT = 0.035 * F * B * .2 * C | PEXT = 191.84 | mW |
| TOTAL POWER DISSIPATION PTOT = 0.001 * (PINT + PEXT) | PTOT = 0.252 | W |
| PACKAGE TYPE (INCL. # PINS) | 100pqfp | |
| THETA JA OF PACKAGE | 100 | deg. C/W |
| JUNCTION TEMPERATURE | TJ = 70.2 | C |
| REPORT GENERATED BY: | Keith Matteson | |
| REPORT VERIFIED BY: | Amjad Qureshi | |

4.4 REFERENCES

- ISA and EISA Bus Specifications
- VLSI Technology, Inc. 82C106 I/O Chip Specification
- Intel 8742 Keyboard Controller Specification
- Intel FLASH Memory Specification
- Memory and SIMM Specifications
- Dell HammerHead and Mako Specifications
- Dell TRANE Memory Controller Specification
- Intel 4167 Math Co-processor Specification
- Intel 486 Processor Specification
- Intel IPC and EBC Specifications
- Intel 82077 Floppy Controller Specification
- Intel White Paper, "Bus Arbitration Latency Concerns for Today's Floppy Disk Controllers in Multi-Master PC's"
- Etc., etc., etc....

4.5 SLOB PART NUMBERS

The following are the Dell official product/part numbers for the SLOB gate array:

SLOB Dell Part # 22183
        SLOB VTI Part # G8001-4066

5.0 SLOB Bug List

At press time, only two known bugs exist in the SLOB design:

1. The Password Enable Logic is not decoded correctly. The RTCALE indexed addresses of h38-h3F should have also been aliased at hB8-hBF. This must be fixed if a re-spin of SLOB is ever needed. Because this function is not considered critical to system operation, a re-spin of SLOB to repair only this bug will not be required.

2. In the X-Bus Transceiver control logic, Floppy DMA Compatible, Type A, and Type B Writes do not work. A fundamental DMA cycle characteristic was overlooked during the design and review of SLOB. During these DMA Writes, MRDC- will be active while IOWC- is also active. Anytime SLOB decodes an active MRDC-, LOW, it will set the X-Bus Transceiver for a read. Therefore, during DMA Write Cycles, data was not getting to the X-Bus and bus contention on the SD Bus results.

The workaround involves adding logic externally on the board. It includes isolating four existing pins and adding five jumpers. The result is to block MRDC- input to SLOB when DACK2- is active, LOW, (i.e. during a Floppy DMA Write Cycle).

Another consequence of this bug is that Floppy DMA writes from VBIOS or SBIOS will not work. If we require BIOS to be shadowed, then these cycles will work correctly. In the unlikely event that someone tries this with BIOS NOT shadowed, then this workaround will NOT respond with the correct results.

If a SLOB re-spin is ever required, this bug must be fixed at that time. Since the external workaround is not extremely extensive, then we believe it is not a necessity to re-spin SLOB for this and the Password Enable bugs alone.

6.0 SLOB Specification Distribution List

The following people are on the SLOB specification distribution list. If an addition/deletion is required, please contact Andy Jonardi, x3210, AR3.

| | | |
|---|---|---|
| Amjad Qureshi | Keith Matteson | Jen-Ming Chai |
| Andy Jonardi | Joel Davidson | Tom Kocis |
| Byron Jarratt | Richard Chan | Eric Scheive |
| Gary Abbott | Tom Holman | Joe Vivio |
| Victor Pecone | David Collier | Julie Jenkins |
| Jeff Buchle | | |

APPENDIX C

1.0 Summary of Amendments

1.0.1 Version 0.1
first release

1.0.2 Version 0.2
Many issues solidified. Reread entire document.

1.0.3 Version 0.3
Update to design "freeze". Details added.

1.0.4 Version 0.4
Minor corrections.

1.0.5 Version 0.5
Update for pre release design review.

1.0.6 - Version 1.0
Final update for Trane 1.0. Added appendix

2.0 Open Issues
None.

3.0 Introduction

Trane is a dynamic memory controller engineered to work within 25, 33, 50, and 66 MHz 486 EISA systems. It will support a direct attached 486 (at 25 or 33 MHz) or a processor module (at 25, 33, 50, and 66 MHz). It is intended to be used in the Hammerhead products. Trane offers higher performance, lower cost, lower power consumption, and higher integration than other alternatives.

The Trane chip features the following:

Interface to the 486 processor or processor module to provide:

- Burst load from memory for cache line reload
- Zero waitstate pagehit writes (in data latch mode)

Interface to EISA bus

- Zero wait state burst cycles
- Zero wait state non-burst cycles

Interface to ISA bus

- Default one waitstate cycles

Controls up to 128 Megabytes of dynamic RAM

- Supports 1, 2, 4, 8, 16, and 32 Megabyte SIMMs.
- Supports single and double sided SIMMs
- Supports up to 16 SIMM sides of RAM
- SIMMs sizes can be mixed
- 2 interleave
- Page mode accesses matching the selected SIMMs page size.
- Parity will be supported

4.0 Performance

Trane expects to interface with three potential memory masters: the processor, the EISA bus, and the ISA bus. These three masters share the host bus during memory cycles. The arbitration for bus mastership is handled externally by the processor and the EISA bus controller. Trane is passive. Trane's performance is optimized for each master.

4.0.1 Processor Master

Trane is similiar in concept to the PAL based Honeymooners/Shark/Morray/Baracuda memory controller designs. Trane will function with 486 (25 or 33 MHz) microprocessor or a 486 based processor module (25, 33, 50, or 66 MHz). The interface to Trane for the 50 and 66 MHz modules will be at half speed, 25 and 33 MHz respectively. The processor complex may include a cache and a Weitek. If a cache is present the Weitek must be strapped for 3 cycle reads.

4.0.1.1 Processor Performance

Waitstates for various types of DRAM accesses will be programmable. Thus they can be varied as required for different processor speeds. The following tables list the number of waitstates simulated for each processor and cycle permutation. The system environment which was simulated is described in the appendix. The first number indicates the waitstates for a system without a secondary cache with data latch mode inactive. The number in ()'s following reads indicates the number of waitstates required when a secondary cache is present. The number in []'s following writes indicates the number of waitstates when data latch mode is active. Note that when data latch mode is active, reads immediately following writes (with no clocks in between) will have an additional waitstate.

25 MHz

- read page miss    4-0-0-0 (5-0-0-0)
- read page miss (no precharge time)   3-0-0-0 (4-0-0-0)
- read page hit    1-0-0-0 (1-0-0-0)
- write page miss  3 [2]
- write page miss (no precharge time) 2 [2]
- write page hit   1 [0]

33 MHz

- read page miss   6-0-1-0  (7-0-1-0)
- read page miss (no precharge time)   4-0-1-0 (5-0-1-0)
- read page hit   2-0-1-0 (2-0-1-0)
- write page miss   5 [4]
- write page miss (no precharge time)   3 [2]
- write page hit   2 [0]

4.0.2 Data Latch Mode

Data latch mode allows the end of a write cycle to complete in the t1 phase of the next cycle. Trane latches all the required information except the data. The data must be latched and held by other elements in the system.

This mode allows Trane to complete write cycles initiated by the host processor in fewer waitstates than a conventional design. This mode is estimated to be very useful in high speed cached systems where most of the cycles processed by Trane will be writes. This feature will enable Trane to keep up with 486 processors that run at frequencies of 33 MHz or greater, although it will work at lower frequencies as well.

4.0.3 EISA Master

EISA master performance will be exemplary. Trane treats all non-burst EISA cycles as page misses yet it still achieves zero wait states. Burst mode cycles are zero waitstate once page mode is established.

ISA Master

ISA cycles are equally high performance. Once the processor grants the ISA master control of the Host bus all cycles are performed with no added wait states (adheres to the default 1 waitstate ISA timing).

5.0 Functionality
Trane interfaces the microprocessor, ISA bus and EISA bus to DRAM as described in the figure below.
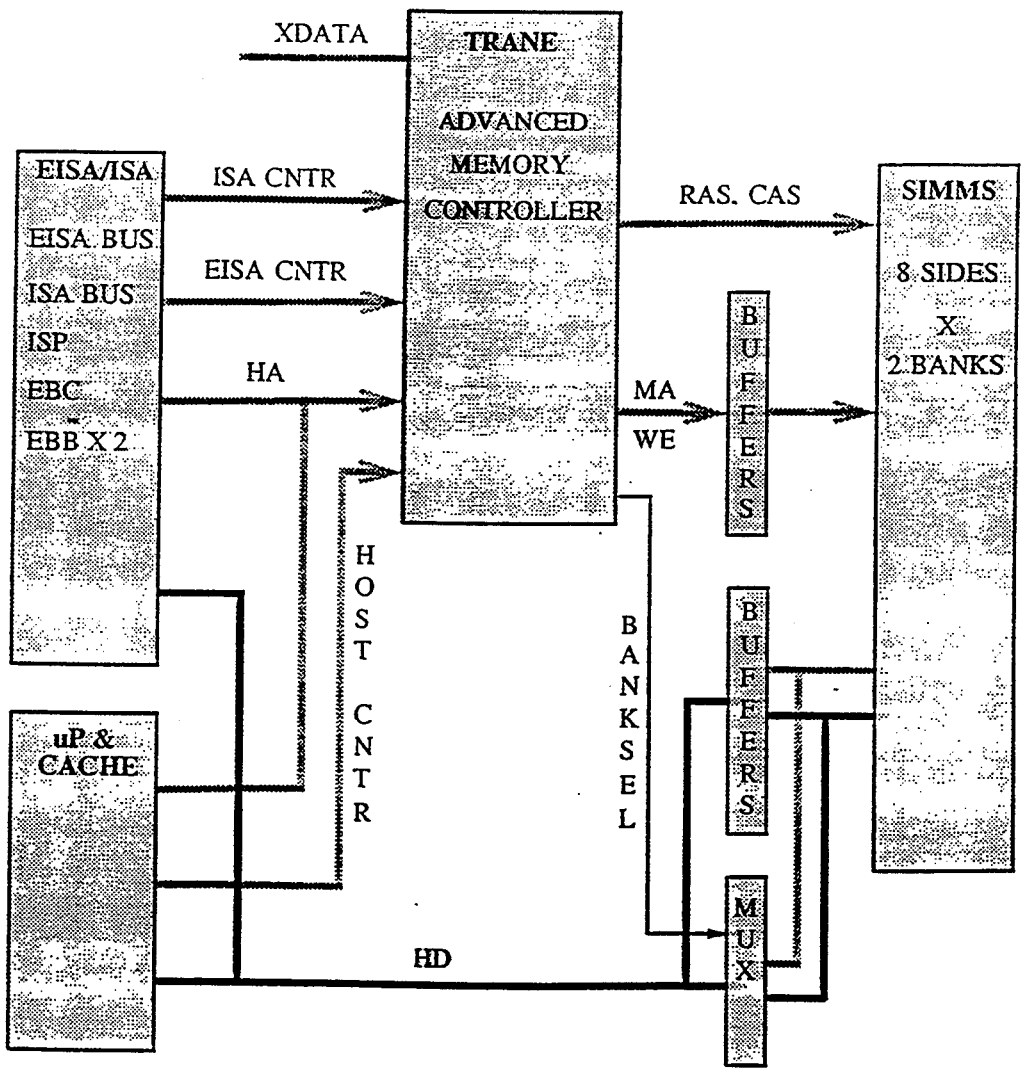
Figure1: SYSTEM BLOCK DIAGRAM

5.1 Host Processor, EISA, ISA Interface

See state diagrams in the appendix.

5.2 ISP/EBC/EBB Interface

5.2.1 I/O Recovery Time Control

The LIOWAIT- signal is driven to the EBC to provide greater control over ISA I/O recovery time. I/O recovery time is defined as the time between I/O cycles. Through the LIOWAIT register different length recover times can be selected.

5.3 Memory Interface

5.3.1 SIMMS

The following SIMM sizes are supported:

- 256K X 36 X 1 parity
- 256K X 36 X 2 parity
- 1MEG X 36 X 1 parity
- 1MEG X 36 X 2 parity
- 4MEG X 36 X 1 parity
- 4MEG X 36 X 2 parity A specification for the 4MEG SIMMs was not available at the time this design was developed. It is hoped that the Trane will work with these SIMMs when they are available, but realize this is little more than a shot in the dark.

Tranes supports up to 4 rows of double sided SIMMs times 2 banks. SIMMs must be installed in pairs because of the 2 way interleaved architecture. Each pair constituits a row. Any mix of row sizes may be installed in a system. A maximum of 128 MBytes can be controlled by Trane even though it may be possible to install more memory than this in a system.

5.3.2 Address

Buffering on the memory address lines will be done external with high performance SSI logic. The following table shows which address lines from the processor map to the MA[11:0] address lines output from TRANE for the different memory configurations. The refresh adrress is driven by the ISP via the HA bus to Trane. MA[1] and MA[0] are actually driven for each bank by Trane as B1MA1, B0MA1, B1MA0, and B0MA0.

| MA[11:0]    | 10 | 9  | 8  | 7  | 6  | 5  | 4  | 3  | 2  | 1  | 0  |
|-------------|----|----|----|----|----|----|----|----|----|----|----|
| Row 1MB/side |    |    |    | 13 | 12 | 20 | 19 | 18 | 17 | 16 | 15 | 14 |
| Row 4MB/side |    |    | 13 | 22.| 21 | 20 | 19 | 18 | 17 | 16 | 15 | 14 |
| Row 16MB/side| 24 | 23 | 22 | 21 | 20 | 19 | 18 | 17 | 16 | 15 | 14 |
| Col 1MB/side |    |    |    | 11 | 10 | 9  | 8  | 7  | 6  | 5  | 4  | 3  |
| Col 4MB/side |    |    | 12 | 11 | 10 | 9  | 8  | 7  | 6  | 5  | 4  | 3  |
| Col 16MB/side| 13 | 12 | 11 | 10 | 9  | 8  | 7  | 6  | 5  | 4  | 3  |
| Refresh      | 12 | 11 | 2  | 10 | 9  | 8  | 7  | 6  | 5  | 4  | 3  |

5.3.3 Delay Lines

Delay lines control various timing parameters. The taps should be selected as described in the signal defintion section. Different delays may be required if simms other than 80 ns are used.

5.4 Miscellany

5.4.1 Memory Bandwidth

Memory bandwidth is paramount. Trane is optimized for 80 nanosecond DRAMs. Because of its programmability it may be configured to support other drams speeds.

To minimize the affect of board propagation delays Trane integrates almost all of the memory subsystem. Only the memory addresses and we's are buffered externally.

5.4.2 SELF TEST

Trane has a build_in_self_test (BIST) logic that test the RCR and registers automatically. To run the self test, assert the TESTMODE~ during reset (PWROK asserted), then deassert the reset, run the BCLK at 8MHz for more than 1024 cycles and deassert the TESTMODE~. The BIST result will be stored in the bit 0 of register 7F. Bit0 equals to one indicates a good logic in the RCR and registers.

6.0 Programmable Registers

6.0.1 Software Interface

Registers can be accessed with an indexing scheme similiar to that developed for Shiva.

The I/O space for Trane is 8 bytes in length. This 8 byte region is defined as the site of the first I/O write following the deassertion of system reset. This I/O write must be dword aligned. Trane actually uses only 2 of these bytes. the first and the fifth. The first is an index register. The fifth is a data register. To simplify programming the index register auto increments.

Following the first I/O write executed to establish the I/O address for Trane. another I/O write should be performed to initialize the index register.

The register file within Trane is 128 words in length. The word size is 5 bits (4:0) for the first 64 words and 6 bits (5:0) for the last 64 words. The first 112 words are undefined after reset. The last 16 words are set to 111111 when PWROK~ = 1.

6.0.2 Index Map (part 1)

| INDEX | REGISTER | INDEX | REGISTER |
|-------|----------|-------|----------|
| 00 H  | RCR0M    | 20 H  | RCR64M   |
| 01 H  | RCR2M    | 21 H  | RCR66M   |
| 02 H  | RCR4M    | 22 H  | RCR68M   |
| 03 H  | RCR6M    | 23 H  | RCR70M   |
| 04 H  | RCR8M    | 24 H  | RCR72M   |
| 05 H  | RCR10M   | 25 H  | RCR74M   |
| 06 H  | RCR12M   | 26 H  | RCR76M   |
| 07 H  | RCR14M   | 27 H  | RCR78M   |
| 08 H  | RCR16M   | 28 H  | RCR80M   |
| 09 H  | RCR18M   | 29 H  | RCR82M   |
| 0A H  | RCR20M   | 2A H  | RCR84M   |
| 0B H  | RCR22M   | 2B H  | RCR86M   |
| 0C H  | RCR24M   | 2C H  | RCR88M   |
| 0D H  | RCR26M   | 2D H  | RCR90M   |
| 0E H  | RCR28M   | 2E H  | RCR92M   |
| 0F H  | RCR30M   | 2F H  | RCR94M   |
| 10 H  | RCR32M   | 30 H  | RCR96M   |
| 11 H  | RCR34M   | 31 H  | RCR98M   |
| 12 H  | RCR36M   | 32 H  | RCR100M  |
| 13 H  | RCR38M   | 33 H  | RCR102M  |
| 14 H  | RCR40M   | 34 H  | RCR104M  |
| 15 H  | RCR42M   | 35 H  | RCR106M  |
| 16 H  | RCR44M   | 36 H  | RCR108M  |
| 17 H  | RCR46M   | 37 H  | RCR110M  |
| 18 H  | RCR48M   | 38 H  | RCR112M  |
| 19 H  | RCR50M   | 39 H  | RCR114M  |
| 1A H  | RCR52M   | 3A H  | RCR116M  |
| 1B H  | RCR54M   | 3B H  | RCR118M  |
| 1C H  | RCR56M   | 3C H  | RCR120M  |
| 1D H  | RCR58M   | 3D H  | RCR122M  |
| 1E H  | RCR60M   | 3E H  | RCR124M  |
| 1F H  | RCR62M   | 3F H  | RCR126M  |

Figure 2: Index Map, (continued next page)

6.0.3 Index Map (part 2)

| INDEX | REGISTER | INDEX | REGISTER |
|---|---|---|---|
| 40 H | CD0BR0 | 60 H | CD5BR2 |
| 41 H | CD0BR1 | 61 H | CD5MR0 |
| 42 H | CD0BR2 | 62 H | CD5MR1 |
| 43 H | CD0MR0 | 63 H | CD5MR2 |
| 44 H | CD0MR1 | 64 H | CD6BR0 |
| 45 H | CD0MR2 | 65 H | CD6BR1 |
| 46 H | CD1BR0 | 66 H | CD6BR2 |
| 47 H | CD1BR1 | 67 H | CD6MR0 |
| 48 H | CD1BR2 | 68 H | CD6MR1 |
| 49 H | CD1MR0 | 69 H | CD6MR2 |
| 4A H | CD1MR1 | 6A H | CD7BR0 |
| 4B H | CD1MR2 | 6B H | CD7BR1 |
| 4C H | CD2BR0 | 6C H | CD7BR2 |
| 4D H | CD2BR1 | 6D H | CD7MR0 |
| 4E H | CD2BR2 | 6E H | CD7MR1 |
| 4F H | CD2MR0 | 6F H | CD7MR2 |
| 50 H | CD2MR1 | 70 H | HSMCR0* |
| 51 H | CD2MR2 | 71 H | HSMCR1* |
| 52 H | CD3BR0 | 72 H | HSMCR2* |
| 53 H | CD3BR1 | 73 H | HSMCR3* |
| 54 H | CD3BR2 | 74 H | HSMCR4* |
| 55 H | CD3MR0 | 75 H | HSMCR5* |
| 56 H | CD3MR1 | 76 H | MEMCR0* |
| 57 H | CD3MR2 | 77 H | MEMCR1* |
| 58 H | CD4BR0 | 78 H | MEMCR2* |
| 59 H | CD4BR1 | 79 H | MEMCR3* |
| 5A H | CD4BR2 | 7A H | MEMCR4* |
| 5B H | CD4MR0 | 7B H | LIOWREG* |
| 5C H | CD4MR1 | 7C H | SPARE* |
| 5D H | CD4MR2 | 7D H | SPARE* |
| 5E H | CD5BR0 | 7E H | SPARE* |
| 5F H | CD5BR1 | 7F H | SELFTEST* |

Figure 2 (continued): Index Map

* these registers are set to 111111 binary with PWROK~ = 1.

6.0.4 RCR Registers (00H - 3FH)

The RCR registers map the address space to RASes which inturn select the active SIMM pair. Each RCR register maps 2 Megabytes. For example RCR22M maps the address space from 22 - 24 Megabytes. Remember, a region of DRAM may also be disabled by the memory mapper.

bit 4:3 - SIMM size

- 00 - 1 Megabytes per side SIMMs, page size = 4,096 bytes
- 01 - 4 Megabytes per side SIMMs, page size = 8,192 bytes
- 10 - 16 Megabytes per side SIMMs, page size = 16,384 bytes
- 11 - region disabled bit 2:0 - RAS select

- 000 RASA0 select
- 001 RASA1 select
- 010 RASB0 select
- 011 RASB1 select
- 100 RASC0 select
- 101 RASC1 select
- 110 RASD0 select
- 111 RASD1 select bit 5 - (Not Defined)

6.0.5 Cacheability Descriptor Registers (40H - 6FH)

There are eight cacheability descriptors, zero through seven. Memory is cacheable by default. A descriptor may be used to define a noncacheable region. The minimum noncacheable region is 16K. The theoretical maximum is the entire 8G of address space. Each additional masked bit doubles the region size. With no bits masked, the region will be 16K, with bit 14 masked only, the region will be 32K, with both bits 14 and 15 masked, the region will be 64K, etc. (Note: Alternate regions derived from the base address can be made noncacheable using different combinations of higher mask bits without the lower ones set. However, this feature does not appear to have any applicable use in the system.) Each descriptor has six registers associated with it. Three for the base address, and three for bit masks. The base address defines the beginning of the region. The mask defines which bits are compared when looking for a match. These registers together determine where a region starts and its length. The circuit XORs HA[31:14] with the base address. NANDs that with the mask bits, then NANDs that result to cause NCA to go active. (Note: MEMCR1, in the Memory Mapping Register section, can also be used to define certain blocks as noncacheable.)

A descriptor cannot be turned "off" directly. I suggest that unused descriptor be setup to make the 16K region at the top of memory noncacheable.

6.0.5.1 Cacheablitiy Register Definition

| | | |
|---|---|---|
| CD0BR0 | - Descriptor 0 Base Address Bits (19:14) | (40H) |
| CD0BR1 | - Descriptor 0 Base Address Bits (25:20) | (41H) |
| CD0BR2 | - Descriptor 0 Base Address Bits (31:26) | (42H) |
| CD0MR0 | - Descriptor 0 Mask Address Bits (19:14) | (43H) |
| CD0MR1 | - Descriptor 0 Mask Address Bits (25:20) | (44H) |
| CD0MR2 | - Descriptor 0 Mask Address Bits (31:26) | (45H) |
| CD1BR0 | - Descriptor 1 Base Address Bits (19:14) | (46H) |
| CD1BR1 | - Descriptor 1 Base Address Bits (25:20) | (47H) |
| CD1BR2 | - Descriptor 1 Base Address Bits (31:26) | (48H) |
| CD1MR0 | - Descriptor 1 Mask Address Bits (19:14) | (49H) |
| CD1MR1 | - Descriptor 1 Mask Address Bits (25:20) | (4AH) |
| CD1MR2 | - Descriptor 1 Mask Address Bits (31:26) | (4BH) |

. . .

| | | |
|---|---|---|
| CD7BR0 | - Descriptor 7 Base Address Bits (19:14) | (6AH) |
| CD7BR1 | - Descriptor 7 Base Address Bits (25:20) | (6BH) |
| CD7BR2 | - Descriptor 7 Base Address Bits (31:26) | (6CH) |
| CD7MR0 | - Descriptor 7 Mask Address Bits (19:14) | (6DH) |
| CD7MR1 | - Descriptor 7 Mask Address Bits (25:20) | (6EH) |
| CD7MR2 | - Descriptor 7 Mask Address Bits (31:26) | (6FH) |

6.0.6 Host State Machine Registers (70H - 75H)

The host state machine is programmable. This allows Trane the flexability to work in various system configurations and speeds. These registers must be programmed before attempting to access memory controlled by Trane. For misses a value of 0 = 2 waitstates. For hits a value of 0 = 1 waitstate.

6.0.6.1 HSMCR0 (70H)

- bit 3:0 - MISS 4

Read MISS with precharge wait state value, 0 - 9, minimum = 0

- bit 4 - BSTWS

BurST Wait State control

- BSTWS = 0  ==>  No burst wait state
- BSTWS = 1  ==>  1 clock wait state after every second DBRDY during burst reads

- bit 5 - PCHGEN

PreCHarGe control ENable

- PCHGEN = 0  ==>  Disable early precharge logic (always precharge)
- PCHGEN = 1  ==>  Enable early precharge logic (precharge only when necessary)

6.0.6.2 HSMCR1 (71H)

- bit 3:0 - MISS 3

Read MISS with no precharge wait state value, 0 - 9, minimum = 0

- bit 4 - CACHE

CACHE Ras strobe delay control for cached systems

- CACHE = 0  ==>  Don't delay ras strobe
- CACHE = 1  ==>  Delay start of ras strobe 1 clock on reads

- bit 5 - Data Latch Mode, 0 = on.

6.0.6.3 HSMCR2 (72H)

- bit 3:0 - MISS 2

Write MISS with precharge wait state value, 0 - 9

- bit 5:4 - krstb control, 00 - 25 MHz, 01 - 33 MHz.

6.0.6.4 HSMCR3 (73H)

- bit 3:0 - MISS 1

Write MISS with no precharge wait state value, 0 - 9

- bit 5:4 - (Not Defined)

6.0.6.5 HSMCR4 (74H)

- bit 2:0 - HT4

Read Hit with n+1 address match wait state value, 0 - 7

- bit 5:3 - HT3

Read Hit wait state value, 0 - 7

6.0.6.6 HSMCR5 (75H)

- bit 2:0 - HT2

Write Hit with n + 1 address match wait state value. 0 - 7

- bit 5:3 - HT1

Write Hit wait state value. 0 - 7

6.0.7 Memory Mapping Registers (76H - 7AH)

The memory map of Trane is highly programmable especially in the region below 1 megabyte. This mapping scheme is partially configured by a system reset so that the system ROM can be accessed. These registers should be programmed early enough on boot such that they do not cause ramdom failures.

6.0.7.1 MEMCR0 (76H)

This register enables or disables the memory block defined by the bit description below. (ENABLE = 0; DISABLE = 1) *(See Figure 3 for Partial Memory Map.)*

- bit 0 - Blk89
- bit 1 - BlkA
- bit 2 - BlkB
- bit 3 - BlkC0
- bit 4 - BlkC8
- bit 5 - BlkD

6.0.7.2 MEMCR1 (77H)

This register defines as Cacheable or Non-cacheable the memory block defined by the bit description below. *(See Figure 3 for Partial Memory Map.)* (CACHEABLE = 0; NON-CACHEABLE = 1)

- bit 0 - Blk89
- bit 1 - BlkA
- bit 2 - BlkB
- bit 3 - BlkC0
- bit 4 - BlkC8
- bit 5 - BlkD

6.0.7.3 MEMCR2 (78H)

This register enables or disables the memory block defined by the bit description below. (ENABLE = 0; DISABLE = 1) *(See Figure 3 for Partial Memory Map.)*

- bit 0 - XMA
- bit 1 - Blk14_16M

- bit 2 - Blk16M64K
- bit 3 - BlkE
- bit 4 - BlkF
- bit 5 - (Not Defined)

6.0.7.4  MEMCR3            (79H)

This register defines as Cacheable or Non-cacheable the memory block defined by the bit description below. *(See Figure 3 for Partial Memory Map.)* (CACHEABLE = 0; NON-CACHEABLE = 1)

- bit 0 - XMA
- bit 1 - Blk14_16M
- bit 2 - Blk16M64K
- bit 3 - BlkE
- bit 4 - BlkF
- bit 5 - NCA SET - when this bit = 1, NCA will always be driven high.

6.0.7.5  MEMCR4            (7AH)

This register defines as Write Protected or Not Write Protected the memory block defined by the bit description below. *(See Figure 3 for Partial Memory Map.)* (WRITE PROTECTED = 0; NOT WRITE PROTECTED = 1)

- bit 0 - BlkC0
- bit 1 - BlkF
- bit 2:5 - (Not Defined)

| Partial Memory Map | | |
|---|---|---|
| Block Name | Starting Address | Ending Address |
| XMA | 00040000 | 0007FFFF |
| Blk89 | 00080000 | 0009FFFF |
| BlkA | 000A0000 | 000AFFFF |
| BlkB | 000B0000 | 000BFFFF |
| BlkC0 | 000C0000 | 000C7FFF |
| BlkC8 | 000C8000 | 000CFFFF |
| BlkD | 000D0000 | 000DFFFF |
| BlkE | 000E0000 | 000EFFFF |
| BlkF | 000F0000 | 000FFFFF |
| Blk14_16M | 00E00000 | 00FFFFFF |
| Blk16M64K | 00FF0000 | 00FFFFFF |
| ROMADR | 000F0000 | 000FFFFF |
| | FFFE0000 | FFFFFFFF |
| | 00FF0000 | 00FFFFFF |

Figure 3: Partial Memory Map Block Definitions

6.0.8  LIOWAIT          (7BH)

This register controls the pulse width of LIOWAIT- which in turn control recovery time between host initiated ISA I/O cycles. If HOLDA is high l WAIT- is forced low. *(See Figure 4 for decode.)*

- bit 3:0 - LIOWAIT
- bit 5:4 - (Not Defined)

| LIOWAIT Register Decode BCLK's Between ISA I/O (IOWC~, IORC~) ||  |
|---|---|---|
| LIOWAIT | 16 Bit ISA I/O | 8 Bit ISA I/O |
| 0000 | 2.5 | 2.5 |
| 0001 | 3.5 | 3.5 |
| 0010 | 4.5 | 4.5 |
| 0011 | 4.5 | 5.5 |
| 0100 | 4.5 | 6.5 |
| 0101 | 4.5 | 7.5 |
| 0110 | 4.5 | 8.5 |
| 0111 | 4.5 | 9.5 |
| 1000 | 4.5 | 10.5 |
| 1001 | 4.5 | 12.5 |
| other | 4.5 | 12.5 |

Figure 4: LIOWAIT Register Decode

6.0.9 SPARE REGISTERS (7CH - 7FH)

These registers are not defined at this time. They are readable and writeable.

7.0 Signal Definitions

Signal Breakdown

| | |
|---|---|
| Signal Outputs | 53 |
| Signal Inputs | 69 |
| Signal Bidirectional | 8 |
| Signal Total | 130 |
| PG | 30 |
| Total Pins | 160 |
| Spare | 0 |

7.0.1 PROCESSOR INTERFACE

CLK1 (input) Processor CLK1.

RSTCPU (input) 486 reset signal.

HA[31:2] (input) Host address bus.

HBE~[3:0] (input) Host byte enables indicate which bytes of the data bus have or are requesting data. The byte enables are decoded from the low order two bits of the address bus and the operand length.

HBE~[0] D0 - D7

HBE~[1] D8 - D15

HBE~[2] D16 - D23

HBE~[3] D24 - D31

HADS~ (input) The falling edge of the address strobe indicates a valid address on the address and control busses.

HWR~ (input) Write or Read cycle indication.

HMIO~ (input) Memory or I/O cycle indication.

BLAST~ (input) BLAST indicates that the next time BRDY is returned the burst cycle is complete.

HOLDA (input) HOLDA indicates to Trane that the 486 CPU is not the current bus master.

DBRDY~ (output, 8 mA) DBRDY is asserted active (low) when a cycle to DRAM is complete.

CPURDY~ (input) Same as the cpurdy to the 486.

7.0.2 EISA INTERFACE

BCLK (input) BCLK is used for synchronizing events with the EISA bus. BCLK operates at a frequency between 8.33 and 6 MHz, with a nominal duty cycle of 50%. The BCLK period is sometimes extended for compressed cycles in which the low to high transition is held off for 1/2 clock. BCLK is always synchronous with the trailing edge of START- and the leading edge of CMD-. BCLK may not be synchronous with the leading edge of START- or the trailing edge of CMD-.

DBCLK (input) BCLK delayed by 20 ns.

START- (input) The START- signal provides timing control at the start of an EISA cycle. The CPU or EISA bus master asserts START- after the address and EM/IO- become valid and negates START- on the rising edge of BCLK after one BCLK cycle time. Warning: BE-[3:0] and thus HBE[3:0], and W-R may not be valid at the leading edge of START-.

CMD- (input) The system board holds CMD- asserted until the end of the cycle. The end of a cycle is normally synchronized with the rising edge of BCLK, but in certain cases is asynchronous.

EW_R- (input) The status signal, EW_R-, identifies the cycle as write (high) or read (low). EW_R- becomes valid after the assertion of START- and before the assertion of CMD-. EW_R- is driven from the same edge of BCLK that activates the START- signal. HW_R- cannot be used here because the EBC chip takes to long to perform the translation.

REFRESH- (input) REFRESH- is used to indicate (when low) a refresh cycle in progress. REFRESH- causes HA[15:2] to drive the row address for the refresh cycle. When CMD- is asserted DRAM may be RASed to refresh it.

MSBURST- (input) An EISA CPU or bus master asserts MSBURT- to indicate to the slave (typically main memory) that it can provide burst cycles. MSBURT- is asserted with address for the second and all subsequent cycles of the burst and is sampled on the rising edge of BCLK by the slave.

RSTDRV (input) Assertion of RSTDRV causes a hardware reset of all ISA and EISA expansion boards. RSTDRV is asserted by the reset controller during power-up and after a bus time-out. Software may cause the assertion of RSTDRV by controlling a bit in I/O port 461H. RSTDRV has a minimum pulse width of 9 BCLK periods. All devices that can prevent operation of the CPU, memory, or system board I/O must use RSTDRV for hardware reset.

7.0.3 ISA INTERFACE

MRDC- (input) The system board or ISA bus master asserts MRDC- to indicate that the addressed ISA memory slave should drive its data onto the system data bus. MRCD- is also asserted during refresh cycles.

MWTC- (input) The system board or ISA bus master asserts MWRC- to indicate that the addressed ISA memory slave should latch data for the system data bus.

IORC- (input) The system board or ISA bus master asserts IORC- to indicate that the addressed ISA I/O slave should drive its data onto the X data bus.

IOWC- (input) The system board or ISA bus master asserts IOWC- to indicate that the addressed ISA I/O slave should latch data from the X data bus.

AEN (input) AEN qualifies the I/O address so trane does not respond during DMA cycles.

7.0.4 XBUS INTERFACE

XDATA[7:0] (bidirectional, 4 mA) - I/O data bus.

TRANECS- (output, 4 mA) - select used by the system board to enable the X bus 245 for Trane.

7.0.5 CACHE INTERFACE

CACHEHIT- (input) This signal when acrrive indicates that the current read cycle is a cache hit. Trane reacts by terminating its access to DRAM. This signal must be driven active from T2 till the end of the line fill. DBRY- to the processor may be used if the cache is zero ws and the cache is the only device aside from Trane which drives DBRDY-. The cache should only drive CACHEHIT- (DBRY-) for reads.

WRTPROT- (output, 4mA) WRTPROT- when active indicates that the current address is write protected. This may be conditioned by the system board and used to invalidate a cache line. This feature allows ROM to be cached as well as shadowed.

NCA (output, 8 mA) indicates a region is noncacheable. Driven high all io or write cycles. Set active on PWROK reset. Driven active for Weitek space.

7.0.6 ISP/EBC/EBB INTERFACE

HLOCMEM- (output, 8 mA) HLOCMEM- asserted (low) when a host bus slave is the selected slave for the current address. This signal is an input to the EBC. This signal is driven by Trane during when the cache-hit- input is active.

EMSTR16- (input) EMSTR16- is an output of the ISP. When asserted (low) it indicates that the current bus master is an ISA 16-bit Master.

DLY_ADS- (output, 4 mA) ADS- delayed by one clock. Masked off for Weitek cycles.

LIOWAIT- (output, 4 mA) LIOWAIT- controls how many BCLKs are provided for recovery time between host initiated ISA I/O cycles

7.0.7 MISCELLANEOUS INTERFACE

PRES4167- (input) Weiteck 4167 coprocessor presence detect signal.

ROMADR- (output, 4 mA) ROMADR- is an address decode for the BIOS ROM. It is latched with BALE externally and used as a chip select for the ROM. HW_R- is not included in this decode.

PWROK (input) PWROK is the primary reset for the system. It is asserted on power-up or a hard system reset. Must be held for at least 10 clk1's.

TE-(input) The signal when asserted tristates all the output and bidirectional pins.

TESTMODE-(input) This signal when asserted puts Trane in a test mode to aid in testing the registers, RCR mapping decode, and other stuff.

7.0.8 MEMORY INTERFACE

MA[10:2] (output, 16 mA) Multiplexed memory address bus. The signals are buffered externally before driving the SIMMs.

B1MA1 (output, 16 mA) Multiplexed memory address bus. This signal is buffered externally before driving the SIMMs.

B0MA1 (output, 16 mA) Multiplexed memory address bus. This signal is buffered externally before driving the SIMMs.

B1MA0 (output, 16 mA) Multiplexed memory address bus. This signal is buffered externally before driving the SIMMs.

B0MA0 (output, 16 mA) Multiplexed memory address bus. This signal is buffered externally before driving the SIMMs.

BANKSEL, BANKSEL2 (output, 16 mA) BANKSEL controls external F257's to select either the even or odd memory data bus to drive the host data bus. When BANKSEL is high the odd side is selected. When BANKSEL is low the even side is selected. 2 identical signals are provided for due to timing requirement and load.

RASA0~ (output, 16 mA) Active low Row Address Strobe for row A side 0.

RASA1~ (output, 16 mA) Active low Row Address Strobe for row A side 1.

RASB0~ (output, 16 mA) Active low Row Address Strobe for row B side 0.

RASB1~ (output, 16 mA) Active low Row Address Strobe for row B side 1.

RASC0~ (output, 16 mA) Active low Row Address Strobe for row C side 0.

RASC1~ (output, 16 mA) Active low Row Address Strobe for row C side 1.

RASD0~ (output, 16 mA) Active low Row Address Strobe for row D side 0.

RASD1~ (output, 16 mA) Active low Row Address Strobe for row D side 1.

CASAB0~[3:0] (output, 16 mA) Active low Column Address Strobe for rows A and B, even side, bytes 3:0.

CASAB1~[3:0] (output, 16 mA) Active low Column Address Strobe for rows A and B, odd side, bytes 3:0.

CASCD0~[3:0] (output, 16 mA) Active low Column Address Strobe for rows C and D, even side, bytes 3:0.

CASCD1~[3:0] (output, 16 mA) Active low Column Address Strobe for rows C and D, odd side, bytes 3:0.

WE_0~ (output, 16 mA) Write enable for the even side SIMMs. This signal is buffered externally before driving the SIMMs.

WE_1~ (output, 16 mA) Write enable for the odd side SIMMs. This signal is buffered externally before driving the SIMMS.

GDMEMRD~ (output, 8 mA) GDMEMRD is used to enable the memory to host bus data path.

7.0.9 DELAY LINE INTERFACE

RSTB~ (output, 8 mA) Intermediate RAS-like signal used for several purposes...

RSTB_20~ (input) RSTB delayed by 20 ns by an external delay line.

RSTB_40~ (input) RSTB delayed by 40 ns by an external delay line.

RSTB_60~ (input) RSTB delayed by 60 ns by an external delay line.

RSTB_70~ (input) RSTB delayed by 60 ns (yes 60 and not 70) by an external delay line. Controls the pas precharge intreval.

PROWSEL~ (output, 4 mA) Intermediate RAS-like signal used for several purposes including creating the following 2 inputs.

PROWSEL_ADD~ (input) PROWSEL~ delayed by 15 ns by an external delay line. It is used to time the switch from row to column address.

PROWSEL_CAS~ (input) PROWSEL~ delayed by 30 ns by an external delay line. It is used to time the assertion of CAS on a page miss.

7.0.10   PARITY INTERFACE

PARITY~ (output, 4 mA) PARITY~ is a status signal to the ISP. When active it indicates that a parity error has occured.

PE_SUM~ (input) This input from the EBB indicates the parity sum. It is used by Trane during EISA or ISA bus master reads of DRAM to determine if a parity error has occured.

PCHK~ (input) This input indicates that the microprocessor has detected a parity error.

8.0 Mechanical Specifications

8.0.1 Package

Trane is packaged in a 160 pin PQFP and may need a heatsink.
See VTI PPF for pinout.

8.0.2 Die

The design will fit into VTI's VGT300046 1 micron gate array. Trane uses about 10,500k gates.

9.0 Part Number

Dell part#     21748
VTI part#      G8204C4063

What is claimed is:

1. A method booting of a computer system including a CPU, a first rewritable nonvolatile boot memory storing basic system software, a second nonvolatile boot memory, and a third memory, having a predetermined data location storing a value which indicates whether a user has requested an upgrade of said basic system software, the method comprising the computer implemented steps of:

the CPU performing a hard reset;

the CPU executing software from one of either the first rewritable nonvolatile boot memory or the second nonvolatile boot memory, depending on a predetermined indicator, wherein (1.A) If said CPU is executing software from the first rewritable nonvolatile boot memory, then:

(1.A.i) performing a checksum operation on the basic system software in said first rewritable nonvolatile boot memory, and, if a checksum error is found, then:

(1.A.i.a) prompting the user to provide a data source for the basic system software, and thereafter (1.A.i.b) reprogramming said first rewritable nonvolatile boot memory from the data source provided by the user;

(1.A.ii) Reading said value from said predetermined data location in said third memory to determine if a user has requested an upgrade of said basic system software, and, if said value indicates that the user has requested an upgrade of said basic system software, then:

(1.A.ii.a) prompting the user to provide a data source for the basic system software, and thereafter (1.A.ii.b) reprogramming said first rewritable nonvolatile boot memory from the data source provided by We user;

(1.B) If said CPU is executing software from the second nonvolatile boot memory which is not the same as said first rewritable nonvolatile boot memory and if said first rewritable nonvolatile memory is not currently write-protected, then writing the contents of said second nonvolatile boot memory into said first rewritable nonvolatile memory.

2. The method of claim 1, wherein said first rewritable nonvolatile boot memory consists essentially of a Flash EPROM.

3. The method of claim 1, wherein said first rewritable nonvolatile boot memory consists essentially of an electrically erasable programmable-read-only-memory.

4. The method of claim 1, wherein said second nonvolatile boot memory consists essentially of a programmable-read-only-memory which is not electrically erasable.

5. The method of claim 1, wherein first rewritable nonvolatile boot memory is write-protected in sectors, and said core software is write-protected independently of other portions of the contents of said rewritable nonvolatile boot memory.

6. The method of claim 1, wherein said data source is a floppy disk drive.

7. The method of claim 1, wherein said step (1.B) copies the entire contents of said second boot memory to overwrite the contents of said first rewritable nonvolatile boot memory.

8. The method of claim 1, wherein said CPU is a microprocessor.

9. The method of claim 1, wherein said step of reading said value from said predetermined data location in said third memory comprises reading said value from said predetermined, data location in a batter-backed static memory.

10. The method of claim 1, wherein said first rewritable nonvolatile boot memory includes a portion storing core software and wherein said core software performs said steps 1.A, 1.A.i, 1.A.ii, and 1.B, and wherein said first rewritable nonvolatile boot memory is write-protected in sectors, and said core software is write-protected, independently of other portions of the contents of said rewritable nonvolatile boot memory, by a hardware electrical connection which must be manually changed in order to overwrite said core software.

11. A method of booting a computer system including a CPU, a first rewritable nonvolatile boot memory storing basic system software, a second nonvolatile boot memory, and a third memory having a predetermined data location storing a value which indicates whether a user has requested an upgrade of said basic system software, the method comprising the computer. implemented steps of:

the computer system undergoing a power-up transition to change from a non-powered state to a powered state the computer system executing a software from one of either the first rewritable nonvolatile boot memory or the second nonvolatile boot memory depending on a predetermined indicator ( 11.A) ascertaining whether said CPU is currently executing boot software from the first rewritable nonvolatile boot memory or from the second nonvolatile boot memory which is not the same as said first rewritable boot memory but which is mappable onto the same address as said first rewritable boot memory;

(11.B) If said CPU is executing software from said first rewritable boot memory, then:

(11.B.i) performing a checksum operation on the basic system software in said first rewritable nonvolatile boot memory, and, if a checksum error is found, then:

(11.B.i.a) prompting the user to provide a data source for the basic system software, and thereafter (11.B.i.b) reprogramming said first rewritable nonvolatile boot memory from the data source provided by the user;

(11.B.ii) Reading said value from said predetermined data location in said third memory to determine if a user has requested an upgrade of said basic system software, and, if said value indicates that the user has requested an upgrade of said basic system software, then:

(11.B.ii.a) prompting the user to provide a data source for the basic system software, and thereafter (11.B.ii.b) reprogramming said first rewritable boot memory from the data source provided by the user, and thereafter prompting the user to reboot the system;

(11.B.iii) and otherwise executing a power-on-self-test routine from said first rewritable boot memory;

(11.C) If said microprocessor is executing software from said second boot memory and if said first rewritable nonvolatile memory is not currently write-protected, then copying the entire contents of said second boot memory to overwrite the contents of said first rewritable nonvolatile boot memory, and thereafter prompting the user to reboot the system;

and otherwise executing a power-on-self-test routine from said second boot memory.

12. The method of claim 11, wherein said first rewritable nonvolatile boot memory consists essentially of a Flash EPROM.

13. The method of claim 11, wherein said second nonvolatile boot memory consists essentially of a programmable-read-only-memory which is not electrically erasable.

14. The method of claim 11, wherein said first rewritable nonvolatile boot memory is write-protected in sectors, and said core software is write-protected independently of other portions of the contents of said rewritable nonvolatile boot memory.

15. The method of claim 11, further comprising the additional step, after said step (11.B.iii), of launching execution of a predetermined operating system software.

16. A method of booting up a computer system, the computer system comprising a first rewritable boot memory including first boot instructions and a second boot memory including second boot instructions, comprising the computer implemented steps of:

determining whether boot operations are occurring from the first boot memory or the second boot memory;

determining if the first boot instructions from the first boot memory are operational if the boot operations are occurring from the first boot memory;

updating the first boot instructions in the first boot memory if the first boot instructions are not operational; and performing a power on self test if the first boot instructions are operational.

17. The method of claim 16, further comprising:

determining if an upgrade is requested if the first boot instructions from the first boot memory are operational, said step of determining if an upgrade is requested occurring prior to said step of performing a power on self test, wherein said step of updating is performed if an upgrade is requested.

18. The method of claim 17, wherein said step of updating comprises:

prompting a user for an external data source comprising an upgrade of the first boot instructions;

transferring the upgrade of the first boot memory instructions from the external data source to the first boot memory.

19. The method of claim 18, further comprising:

determining if said step of updating was successful after said step of updating;

displaying an error code if said step of updating was not successful; and rebooting the system if said step of updating was successful.

20. The method of claim 19, further comprising:

resetting an upgrade bit in a nonvolatile memory if said step of updating was successful.

21. The method of claim 16, further comprising:

determining if the first boot memory exists if boot operations are occurring from the second boot memory;

determining if programming of the first boot memory is requested;

transferring said second boot instructions from the second boot memory to the first boot memory if programming of the first boot memory is requested; and performing a power on self test if programming of the first boot memory is not requested.

22. The method of claim 21, further comprising:

determining if said step of updating was successful after said step of updating;

displaying an error code if said step of updating was not successful; and rebooting the system if said step of updating was successful.

* * * * *